US012321323B1

(12) United States Patent
Underwood, Jr. et al.

(10) Patent No.: US 12,321,323 B1
(45) Date of Patent: Jun. 3, 2025

(54) DATA MIGRATION FACTORY

(71) Applicant: THE PNC FINANCIAL SERVICES GROUP, INC., Pittsburgh, PA (US)

(72) Inventors: Bobby Melvin Underwood, Jr., Shawnee, KS (US); Patrick David O'Connor, Rocky River, OH (US); Sujit Ghosh, Pittsburgh, PA (US); Dave Blackett, Pittsburgh, PA (US); Avneet Buttar, Pittsburgh, PA (US); Kelly Drake Winters, Pittsburgh, PA (US); Megan Dahlinger, Pittsburgh, PA (US); Andy Fedigan, Pittsburgh, PA (US); Marie Hoge, Pittsburgh, PA (US); Amit Shrivastava, Pittsburgh, PA (US); Mark Martonchik, Pittsburgh, PA (US); Brian Klein, Pittsburgh, PA (US); David Solomon, Pittsburgh, PA (US); Aaron Krocker, Pittsburgh, PA (US); Shaun Lineberry, Pittsburgh, PA (US); Rahul Gaikwad, Pittsburgh, PA (US); Robert Depasquale, Pittsburgh, PA (US); John Lysowski, Pittsburgh, PA (US); Matthew Lehn, Pittsburgh, PA (US); Suhail Hasham, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 0 days.

(21) Appl. No.: 18/582,301

(22) Filed: Feb. 20, 2024

Related U.S. Application Data

(60) Provisional application No. 63/486,225, filed on Feb. 21, 2023.

(51) Int. Cl.
*G06F 16/21* (2019.01)
*G06F 16/25* (2019.01)

(52) U.S. Cl.
CPC .......... *G06F 16/214* (2019.01); *G06F 16/254* (2019.01)

(58) Field of Classification Search
CPC ............................. G06F 16/214; G06F 16/254
USPC ........................................................ 707/602
See application file for complete search history.

(56) References Cited

U.S. PATENT DOCUMENTS

| 2004/0039972 | A1* | 2/2004 | Chung ................... G06Q 40/00 705/37 |
| 2005/0192881 | A1* | 9/2005 | Scannell ................ G06Q 10/02 705/35 |
| 2022/0188721 | A1* | 6/2022 | Swan ............... G06Q 10/06393 |
| 2024/0086379 | A1* | 3/2024 | Corrigan ............... G06F 16/215 |

* cited by examiner

*Primary Examiner* — Joshua Bullock
(74) *Attorney, Agent, or Firm* — Finnegan, Henderson, Farabow, Garrett & Dunner, LLP

(57) ABSTRACT

Systems and methods for migrating and integrating data from one or more external locations to an internal location are disclosed. The system comprises multiple temporary locations to sort, transform, or store the data in the migration process. During the process, the data could be assigned various attributes, which are determined based on metadata associated with the original data. The system will track these attributes as the data moves through the various temporary locations.

25 Claims, 34 Drawing Sheets

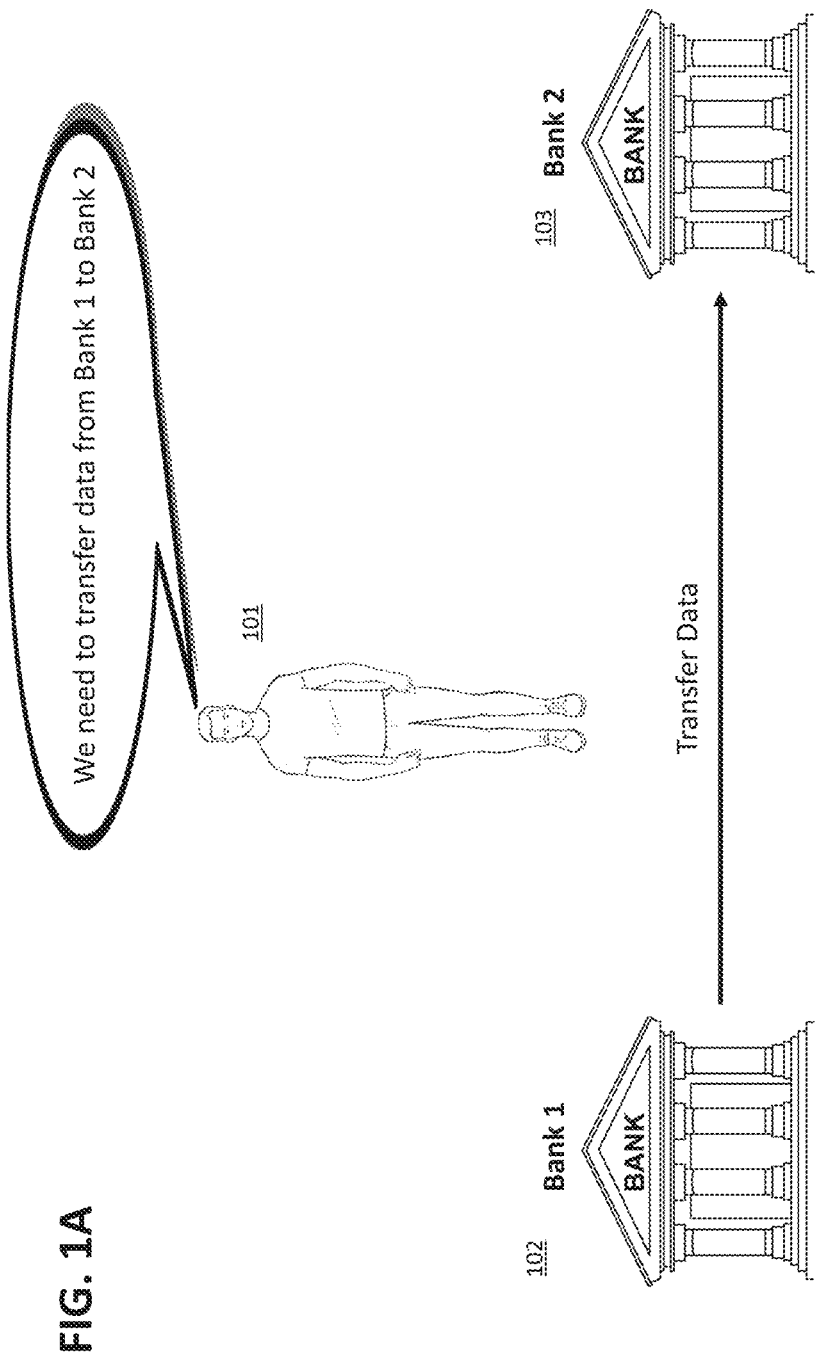

DATA MIGRATION FACTORY

CROSS-REFERENCE TO RELATED APPLICATION

This application claims the benefit of priority of U.S. Provisional Patent Application No. 63/486,225, filed on Feb. 21, 2023, the entire contents of which are incorporated herein by reference.

TECHNICAL FIELD

The present disclosure relates to the field of data migration, and more particularly to methods and systems for data migration and integration.

BACKGROUND

In the banking industry, data migration refers to the process of transferring data from one banking system to another. This may be a result of a merger or acquisition, or the replacement of legacy systems with modern ones. During a data migration project in the banking industry, usually significant amounts of data may need to be transferred, including customer information, account information, transaction information, and other financial data, from a source system to a target system. The data migration process often involves a number of steps, such as data load, transformation, and validation of the migrated data. The extensive steps and regulation involved help data migration provide a degree of security in data transfer not seen in simple and conventional data transfers between banks.

The objective of the present disclosure is to use a novel data migration system, called Data Migration Factory ("DMF") to migrate the data from a source system (or external system) to a target system (or internal system) with a high level of accuracy to ensure that no data is lost or compromised during the migration. With an elaborate checkpoint system, data migration protects data being transferred between banks and makes sure the security expected in bank-to-bank data transfers remains up-to-par.

Some of the challenges involved in data migration may comprise: (1) planning an efficient conversion process that ensures data completeness and verification; (2) managing data from legacy systems for audit trail and validation; (3) reducing overhead needed for data conversion to target systems; (4) increasing downstream application involvement during conversion; (5) the magnitude of data that requires conversion, which may adversely impact schedule and budget; (6) integrating a broad scope of historical data migration requirements with an existing process; (7) requiring adequate time and attention spent on data analysis, structures, and relationships; and (8) defining a reusable process that may be used for future acquisitions/conversions. The current disclosure provides a migration approach that is quite flexible in that data from any legacy system may be migrated to data from any target system. In addition, the disclosed migration approach is a repeatable process that is systematic, scalable, and metadata-driven. The disclosed migration approach ensures data consistency using standard tools, metadata definitions, and an audit trail and centralizes reuse of functional conversion, data quality, and governance rules. The disclosed migration approach is associated with risk mitigation due to an applied experience with complex data migration processes and implements a scalable process and tools to manage complex conversion efforts with high accuracy and control. And the disclosed migration approach automates a conversion audit trail to facilitate business communication, minimize issues and defects, and provide data conversion transparency, knowledge transfer, and a conversion road map.

The benefits of the disclosed data migration factory may comprise: (1) standardized and consistent transformation of data for all data sources; (2) data obfuscation of key data elements; (3) centralized communication related to and visibility of the data migration process; (4) defining a reusable process for future data acquisitions; (5) scalability to any number of legacy and target systems enabling migration of any data type to any location; (6) centralized data audit capability; (7) a centralized approach that exposes data gaps and enables conformance with downstream applications and business processes of the target system; (8) a reduction in legacy system resource requirements; and (9) generalized data treatment with respect to data quality rules and execution and reference data generation. Other advantages may comprise a data dictionary of definitions and options derived through experience with prior projects; standardized nomenclature of a data subject area and standardized processing options; validated completeness of legacy system datasets; reference data alignment options based on a standard data model and standard data definitions; and consistent data gap analysis and product requirement analysis performed on any data source. Moreover, data migration from a legacy system and integration into a target system may occur while operations within both systems remain ongoing. Operations need not be paused for data migration and conversion to occur.

SUMMARY

The foregoing and following examples are provided for the convenience of the reader to provide a basic understanding of such embodiments and do not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later.

Embodiments consistent with the present disclosure provide a system for migrating data from a legacy system to one or more target systems. The system may comprise a data request feature whereby data from the legacy system is requested by the one or more target systems. The system may additionally comprise a data packaging feature whereby the requested data is packaged and moved to a first landing zone specific to the legacy system. The system may additionally comprise a second landing zone specific to the one or more target systems which receives a copy of the packaged data in the first landing zone and generates control counts and balances related to the packaged data. The system may additionally comprise a staging layer that ingests the packaged data from the second landing zone, maps the packaged data received from the second landing zone to data expected to be migrated to the one or more target systems, establishes data transformation rules for transforming the packaged data into data that is complaint with the data requirements of the one or more target systems, loads general enterprise reference data and line-of-business reference data (or reference data specific to the one or more target systems) to facilitate the data transformation process, and performs a completeness check against the originally requested data to confirm all requested data remains present.

The system may additionally comprise a transformation layer that transforms the packaged data, if determined to be complete, to data that is compliant with the data requirements of the one or more target systems and runs data quality and identification rules to identify any data gaps at the transformation stage. The system may additionally comprise a first loading feature whereby, if no data gaps are identified, the transformed data is loaded into applications specific to the one or more target systems. The system may additionally comprise a validation feature whereby the loaded data is validated to confirm it is both complete and accurate. The system may additionally comprise a second loading feature that loads the data, if determined to be complete and accurate, to such downstream systems as an enterprise data storeroom or advanced analytical systems. And the system may additionally comprise a migration reconciliation dashboard that publishes the status of the data as it is migrated from the legacy system to the one or more target systems.

Embodiments consistent with the present disclosure provide a system for migrating data from a legacy system to one or more target systems. The system may comprise at least one processor. The at least one processor may execute a first application that serves as a first landing zone for receiving packaged data from the legacy system and copies and moves the received data to a second application operating as a second landing zone. The first landing zone may be specific to the legacy system, and the second landing zone may be specific to the one or more target systems. The first and second landing zones may facilitate migration of the data from the legacy system to the one or more target systems.

Embodiments consistent with the present disclosure provide a system for migrating data from a legacy system to one or more target systems. The system may comprise at least one processor. The at least one processor may execute an application having a data packaging feature that packages and moves data requested by the one or more target systems from the legacy system to a first landing zone specific to the legacy system. The data packaging feature may facilitate migration of the data from the legacy system to the one or more target systems.

Embodiments consistent with the present disclosure provide a system for migrating data from a legacy system to one or more target systems. The system may comprise at least one processor. The at least one processor may execute an application having a migration reconciliation dashboard that publishes the status of the data as it is migrated from the legacy system to the one or more target systems. The migration reconciliation dashboard may facilitate migration of the data from the legacy system to the one or more target systems.

Embodiments consistent with the present disclosure provide a system for transferring and integrating data from one or more external locations into an internal location. The system may comprise at least one processor. The at least one processor may be configured to transfer external data from the one or more external locations to a first temporary location. Additionally, the at least one processor may be configured to sort the external data in the first temporary location into one or more defined categories. The at least one processor may also be configured to write a first defined category of the sorted external data to a second temporary location. In the second temporary location, the at least one processor may be configured to convert the first defined category of external data into internal data using at least one data conversion rule. The data conversion rule may be associated with enabling compatibility between the internal data and at least one internal application. The at least one processor may be configured to deposit the internal data to the internal location.

Embodiments consistent with the present disclosure provide a method. The method may comprise transferring data to a first location. The method may additionally comprise assigning the transferred data to a first data type or a second data type. The assignment of the transferred data may depend on the data. Responsive to assigning the transferred data to the first data type, the method may further comprise enabling migration of the first data type to a second location via a first path. Responsive to assigning the transferred data to the second data type, the method may additionally comprise enabling migration of the second data type to the second location via a second path.

Embodiments consistent with the present disclosure provide a system for converting data. The system may comprise at least one memory. In addition, the system may comprise at least one processor. The at least one processor may be configured to maintain a platform that stages and modifies data. The at least one processor may additionally be configured to accept raw data to the platform. The raw data may include a first bookkeeping. The at least one processor may be configured to save the first bookkeeping of the raw data. The at least one processor may be configured to load reference data. The at least one processor may be configured to establish modification rules. The modification rules may depend on the reference data. The at least one processor may be configured to modify the raw data into application data. The modification may be based on the modification rules. The application data may include a second bookkeeping. The at least one processor may be configured to save the second bookkeeping of the application data to the at least one memory.

Embodiments consistent with the present disclosure provide a system for transferring and integrating custom data from one or more external locations to an internal location. The system may comprise at least one processor. The at least one processor may be configured to define rules established by a user of the system for identifying custom data. The at least one processor may additionally be configured to access external data. The at least one processor may also be configured to transfer the external data to a temporary location. The at least one processor may be configured to identify the external data as custom data, using the defined rules. The at least one processor may be configured to load the custom data to a target application. The at least one processor may be configured to send the target application to an internal location. The custom data may be at least one of vendor data, provider data, and Government, Risk, and Compliance data.

Embodiments consistent with the present disclosure provide a computer-implemented method. The computer-implemented method may comprise maintaining a platform that classifies documents. The computer-implemented method may additionally comprise acquiring, by at least one processor, image data from an external location. The acquisition of the image data may include transferring the image data to a temporary location within the platform. The computer-implemented method may comprise converting the image data to a readable form. The computer-implemented method may comprise performing a look up in a repository. The look up may compare the readable form with signature card data stored in the repository. The computer-implemented method may classify the image data based on the look up. The computer-implemented method may send the image data to a final location associated with the classification.

Embodiments consistent with the present disclosure provide a system for transferring and integrating data from one or more external locations to a target location. The system may comprise at least one processor. The at least one processor may be configured to initiate a connection between a source platform and a target platform. The source platform may have a source location. The target platform may have a first location, a second location, and a target location. The at least one processor may be configured to transfer source data over the connection from the source location to the first location. The at least one processor may be configured to load first parameters to the first location. At the first location, the at least one processor may be configured to apply the first parameters to the source data. The first parameters may grant the source data first privileges. The at least one processor may be configured to transfer the source data over the connection from the first location to the second location. The transfer may depend on the first privileges. The at least one processor may be configured to load second parameters to the second location. At the second location, the at least one processor may be configured to apply the second parameters to the source data. The second parameters may grant the source data second privileges. The at least one processor may be configured to transfer the source data over the connection from the second location to the target location. The transfer may depend on the second parameters. The first parameters may comprise the mean or average of the source data. The second parameters may comprise the median of the source data. The first privileges may comprise permission to reorganize the source data into a format that is more easily readable or analysable. The second privileges may comprise permission for the source data to be transformed to comply with the data format of the target location.

Embodiments consistent with the present disclosure provide a system for migrating and integrating a database from one or more external servers to a target server. The system may comprise at least one processor. The at least one processor may be configured to access the database located on a storage platform. The storage platform may be located on the one or more external servers. The at least one processor may be configured to load the database from the storage platform to an in-memory platform associated with the target server. The at least one processor may be configured to transfer the database stored on the in-memory platform to an intermediate location. The at least one processor may be configured to store the database to an internal platform. The internal platform may be located on the target server.

Embodiments consistent with the present disclosure provide a system for migrating and integrating a database from one or more external storage architectures to a target store architecture. The system may comprise at least one processor. The at least one processor may be configured to access the database located on the one or more external storage architectures. The at least one processor may be configured to move the database from the one or more external storage architectures to a memory platform. The at least one processor may be configured to transfer the database to a target storage architecture via the memory platform. The transfer may depend on user defined rules.

Embodiments of the present disclosure provide a system for migrating and integrating data files. The system may comprise at least one processor. The at least one processor may be configured to extract the data files from a source. The at least one processor may be configured to request a permission to access an account on a target system. The at least one processor may be configured to access the account and calculate a first capacity upon a grant of the permission. The first capacity may be associated with the target system. The at least one processor may be configured to convert the data files to an archive file. The at least one processor may be configured to calculate a second capacity associated with the archive file. The at least one processor may be configured to identify a location on the target system based on a comparison of the first capacity and the second capacity. The at least one processor may be configured to enable an input of metadata. The metadata may be associated with the archive file. The at least one processor may be configured to transfer the archive file to the location on the target system.

Embodiments of the present disclosure provide a system for controlling the migration and integration of data. The system may comprise at least one processor. The at least one processor may be configured to access data from a source. The at least one processor may be configured to assign first control parameters to the data. The at least one processor may be configured to provide the first control parameters to a reconciliation dashboard. The at least one processor may be configured to transfer the data to a first location. The at least one processor may be configured to assign second control parameters to the transferred data. The at least one processor may be configured to provide the second control parameters to the reconciliation dashboard. The at least one processor may be configured to transform the data at the first location. The transformation may be based on transformation rules. The at least one processor may be configured to assign third control parameters to the transformed data. The at least one processor may be configured to provide the third control parameters to the reconciliation dashboard. The at least one processor may be configured to load the data from the first location to a second location The at least one processor may be configured to assign fourth control parameters to the loaded data. The at least one processor may be configured to provide the fourth control parameters to the reconciliation dashboard. The at least one processor may be configured to compare the first control parameters, the second control parameters, the third control parameters, and the fourth control parameters. The at least one processor may be configured to establish a first control associated with data. The at least one processor may be configured to accept the data to a first location. The at least one processor may be configured to record a second control associated with the data at the first location. The at least one processor may be configured to enable a first comparison. The enablement may be based on the first control and the second control. The at least one processor may be configured to transform the data. The at least one processor may be configured to record a third control associated with the transformed data. The at least one processor may be configured to enable a second comparison. The enablement may be based on the second control and the third control. The at least one processor may be configured to move the transformed data to storage. The at least one processor may be configured to record a fourth control associated with the transformed data in storage. The at least one processor may be configured to enable a third comparison. The enablement may be based on the third control and the fourth control. The at least one processor may be configured to display a reporting of the first comparison, the second comparison, and the third comparison.

Embodiments of the present disclosure provide a system for monitoring data migration and integration. The system may comprise at least one processor. The at least one processor may be configured to move data from a first location to a second location. The at least one processor may be configured to display a dashboard. The dashboard may contain at least one option corresponding to the data. The at least one processor may be configured to enable a first selection of the at least one option. The first selection may cause the dashboard to present a first set of information related to the data and the selection. The at least one processor may be configured to enable a second selection of at least one detail. The at least one detail may be associated with the presented information. The second selection may cause the dashboard to present a second set of information. The second set of information may be related to the at least one detail. The at least one processor may be configured to allow a third selection of at least one filter. The at least one filter may cause the presentation of information to change.

Embodiments of the present disclosure provide a system for data migration and integration. The system may comprise at least one processor. The at least one processor may be configured to transfer data from an external location to a temporary location. The at least one processor may be configured to sort the data. The at least one processor may be configured to transform the sorted data in a transformation. The transformation may enable the transformed data to apply to an application. The at least one processor may be configured to enter the transformed data into the application. The at least one processor may be configured to store the transformed data in a memory. Alternatively, the at least one processor may be configured to access data at a first location. The at least one processor may be configured to record the data at the first location. The at least one processor may be configured to transfer the data from the first location to a second location. The second location may restrict access to the data. The at least one processor may be configured to record the data at the second location. The at least one processor may be configured to load the data to a third location. The third location may restrict access to the data. The at least one processor may be configured to transform the data in a transformation. The transformation may enable the data to implement to an application. The at least one processor may be configured to record the data at the third location. The at least one processor may be configured to store the data in a memory. The at least one processor may be configured to record the data at a warehouse. Alternatively, the at least one processor may be configured to extract historical data from a source location. The at least one processor may be configured to load the historical data to a cluster location. The at least one processor may be configured to analyze the historical data in the cluster location. Analyzing the cluster data may include comparing reference data to the historical data. Analyzing the cluster data may additionally include enabling the historical data to correspond to at least one application. The at least one processor may be configured to add the historical data to the at least one application.

Embodiments of the present disclosure provide a system for tracking data migration and integration. The system may comprise at least one processor. The at least one processor may be configured to record source data at a source location. The at least one processor may be configured to move the source data from the source location to a target location. Moving the source data may cause the source data to change to transformed data. The at least one processor may be configured to record the transformed data at the target location. The at least one processor may be configured to load target data. The at least one processor may be configured to compare the source data with the transformed data. The at least one processor may be configured to compare the target data with the transformed data. The at least one processor may be configured to extract raw data from a source. The at least one processor may be configured to determine a size of the raw data. The at least one processor may be configured to identify a destination for the raw data. The destination may have sufficient capacity to accommodate the determined size of the raw data. The at least one processor may be configured to package the raw data. The packaged raw data may include a control. The control may be added to the raw data. The at least one processor may be configured to transfer the packaged data to a target. The at least one processor may be configured to maintain a dashboard for tracking data. The at least one processor may be configured to define rules within the dashboard. The rules may correspond to data quality. The at least one processor may be configured to enable a first reporting of the data at a first location to the dashboard. The at least one processor may be configured to transfer the data to a second location. The at least one processor may be configured to enable a second reporting of the data at the second location to the dashboard. The at least one processor may be configured to transfer the data to a third location. The at least one processor may be configured to enable a third reporting of the data at the third location to the dashboard. The at least one processor may be configured to transfer the data to a fourth location. The at least one processor may be configured to enable a fourth reporting of the data at the fourth location to the dashboard. In response to the first reporting, the second reporting, the third reporting, and the fourth reporting, the at least one processor may be configured to apply the rules to process a result. The result may compare the data quality at the first reporting, the second reporting, the third reporting, and the fourth reporting. The at least one processor may be configured to maintain a dashboard for tracking data movement. The at least one processor may be configured to access source data. The at least one processor may be configured to enable an input of a control file. The control file may be based on the source data. The at least one processor may be configured to link the control file to the source data to create linked data. The at least one processor may be configured to transmit the linked data to the dashboard. Alternatively, the at least one processor may be configured to maintain a dashboard for tracking source data movement from at least a first location to a second location. The at least one processor may be configured to access the source data. The at least one processor may be configured to create a control file. The control file may be based on a template. The control file may be associated with the source data. The at least one processor may be configured to load the source data to the first location. Upon completion of the load to the first location, the at least one processor may be configured to transmit the control file to the dashboard. The transmission may be based on a first write. The at least one processor may be configured to load the source data to the second location. Upon completion of the load to the second location, the at least one processor may be configured to transmit the control file to the dashboard. The transmission may be based on a second write. Alternatively, the at least one processor may be configured to maintain a dashboard for tracking attributes. The at least one processor may be configured to access source data. The at least one processor may be configured to define at least one attribute associated with the source data. The at least one processor may be configured to track, at a first time, the at least one attribute. The at least one processor may be configured to transfer the source data to a landing zone. The at least one processor may be configured to track, at a second time, the at least one attribute of the transferred source data. The at least one processor may be configured to transform the source data into transformed data. The at least one processor may be configured to track, at a third time, the at least one attribute of the transformed source data. The at least one processor may be configured to load the transformed source data into a target application. The at least one processor may be configured to track, at a fourth time, the at least one attribute of the transformed source data in the target application. The at least one processor may be configured to compare the at least one attribute at the first time, the second time, the third time, and the fourth time. The at least one processor may be configured to display the comparison via the dashboard. The at least one processor may be configured to maintain a dashboard for tracking attributes. The at least one processor may be configured to access source data. The at least one processor may be configured to define at least one attribute associated with the source data. The at least one processor may be configured to track, at a first time, the at least one attribute. The at least one processor may be configured to transfer the source data to a landing zone. After transferring the source data, the at least one processor may be configured to track, at a second time, the at least one attribute. The at least one processor may be configured to transform the source data into transformed data. Upon transformation, the at least one processor may be configured to track, at a third time, the at least one attribute. The at least one processor may be configured to load the transformed data into a target application. Upon loading, the at least one processor may be configured to track, at a fourth time, the at least one attribute. The at least one processor may be configured to compare the at least one attribute at the first time, the second time, the third time, and the fourth time. The comparison may be via the dashboard. Alternatively, the at least one processor may be configured to establish a connection between a source database and a destination. Over the connection, the at least one processor may be configured to access data in the source database. The at least one processor may be configured to assign an identifier to the data based on unique parameters. The unique parameters may be assigned based on the data, the source database, and the destination. The at least one processor may be configured to transmit the data with the identifier to the destination. The at least one processor may be configured to store the data in distributed storage at the destination.

BRIEF DESCRIPTION OF DRAWINGS

The accompanying drawings, which are incorporated in and constitute a part of this disclosure, illustrate various disclosed embodiments. In the drawings:

FIGS. 1A-E are an exemplary illustration of a successful transfer of data between banks involving the data migration process, consistent with disclosed embodiments.

DETAILED DESCRIPTION

Figure 1B:
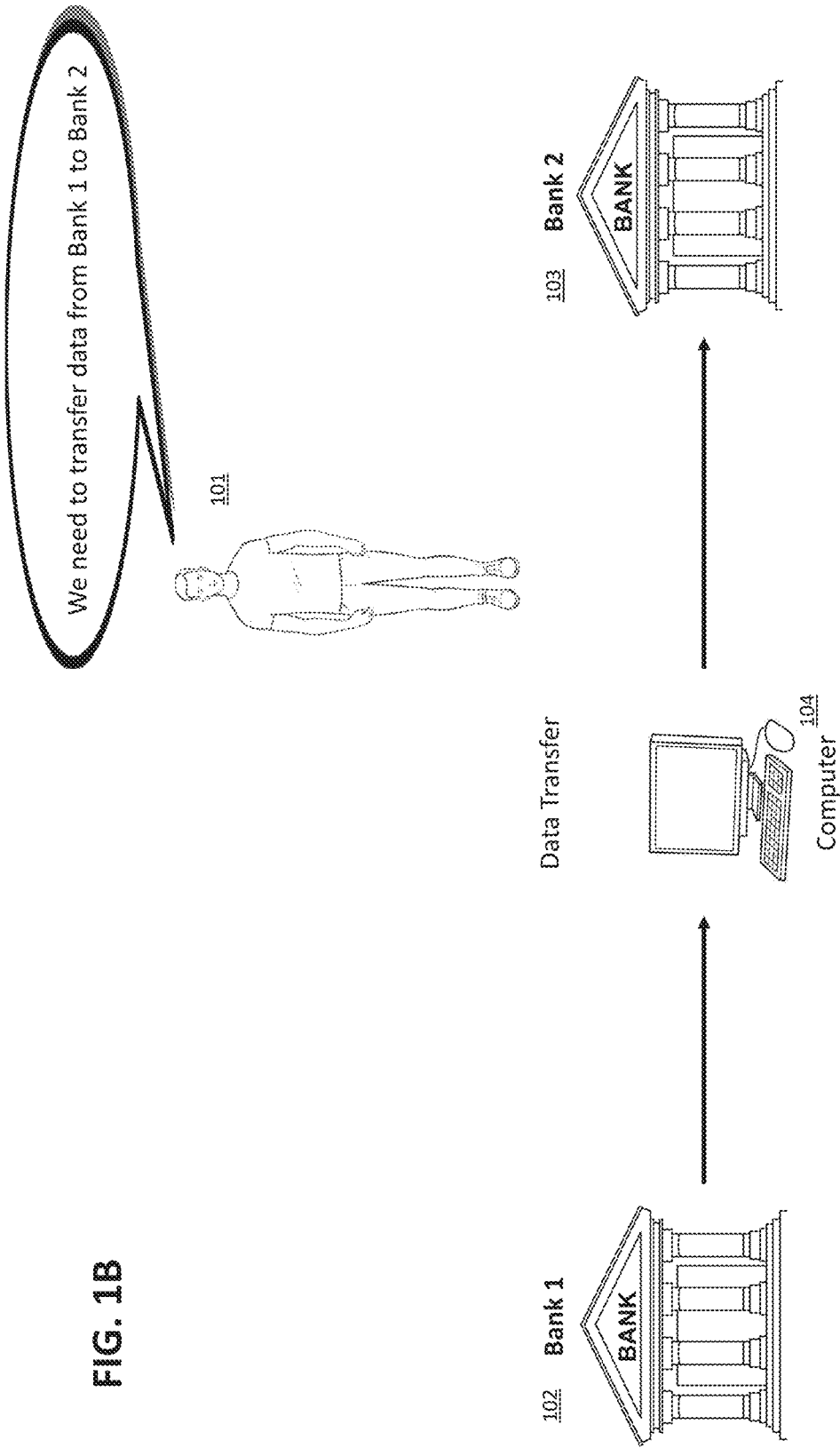

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. The words "comprising," "having," "containing," and "including," and other similar forms are intended to be equivalent in meaning and are open ended in that an item or items following any one of these words is not meant to be an exhaustive listing of such item or items or meant to be limited to only the listed item or items. It should also be noted that as used in the present disclosure and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

This disclosure employs open-ended permissive language, indicating for example, that some embodiments "may" employ, involve, or include specific features. The use of the term "may" and other open-ended terminology is intended to indicate that although not every embodiment may employ the specific disclosed feature, at least one embodiment employs the specific disclosed feature.

Unless specifically stated otherwise, and as apparent from the following description, throughout the specification, terms such as "processing," "calculating," "computing," "determining," "generating," "setting," "configuring," "selecting," "defining," "applying," "obtaining," "monitoring," "providing," "identifying," "segmenting," "classifying," "analyzing," "associating," "extracting," "storing," "receiving," "transmitting," or the like, include actions and/or processes of a computer that manipulate and/or transform data into other data, the data represented as physical quantities, and/or electronic quantities. The terms "computer," "processor," "controller," "processing unit," "computing unit," and "module" should be expansively construed to cover any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate array (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

As used herein, the phrase "for example," "such as," "for instance," and variants thereof describe non-limiting embodiments of the presently disclosed subject matter. Various terms used in the specification and claims may be defined or summarized differently when discussed in connection with differing disclosed embodiments. It is to be understood that the definitions, summaries and explanations of terminology in each instance apply to all instances, even when not repeated, unless the transitive definition, explanation or summary would result in inoperability of an embodiment.

Throughout, this disclosure mentions "disclosed embodiments," which refer to examples of inventive ideas, concepts, and/or manifestations described herein. Many related and unrelated embodiments are described throughout this disclosure. The fact that some "disclosed embodiments" are described as exhibiting a feature or characteristic does not mean that other disclosed embodiments necessarily share that feature or characteristic.

The drawings in this document may not be to any scale. Different figures may use different scales and different scales can be used even within the same drawing, for example different scales for different views of the same object or different scales for the two adjacent objects.

Figure 1C:
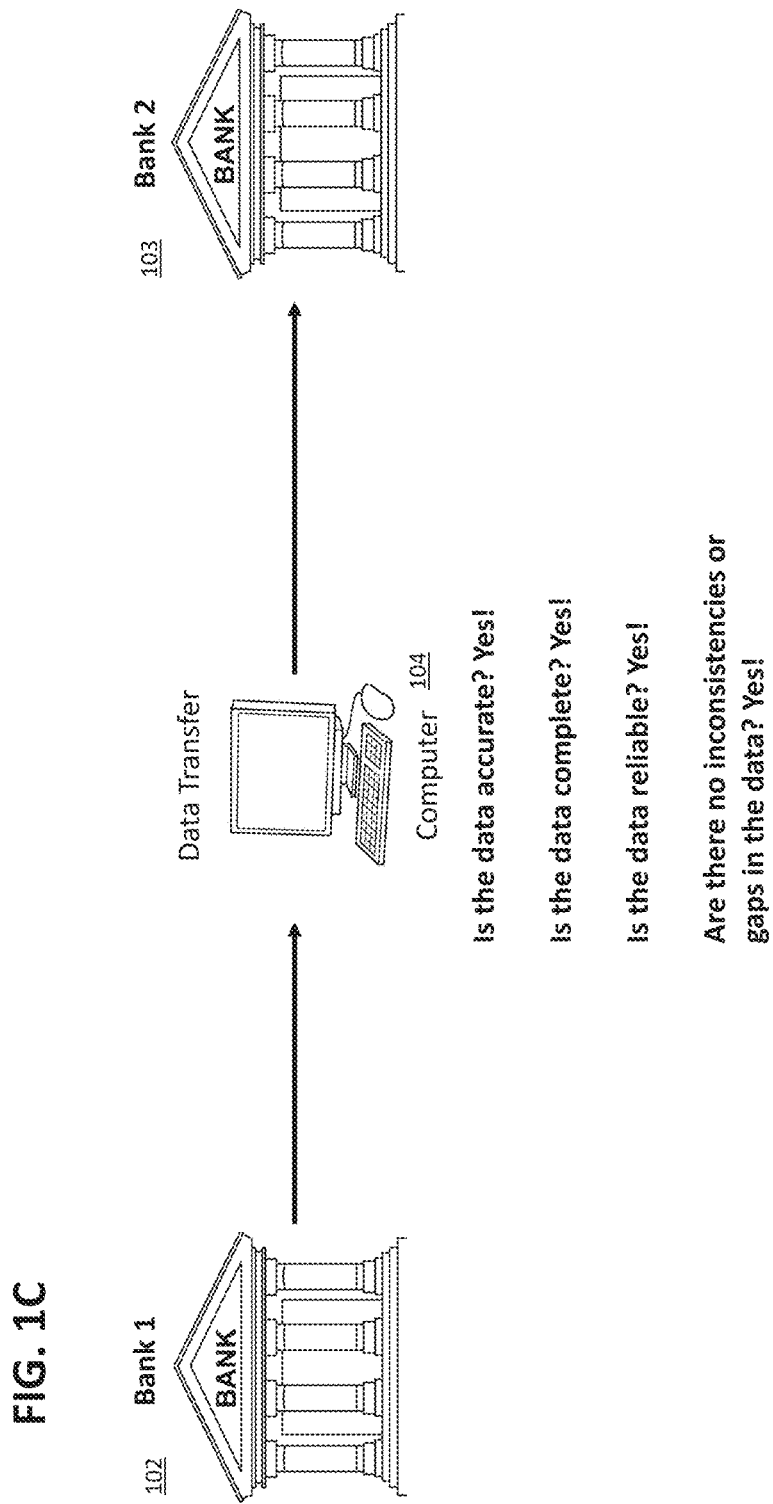
Figure 1D:
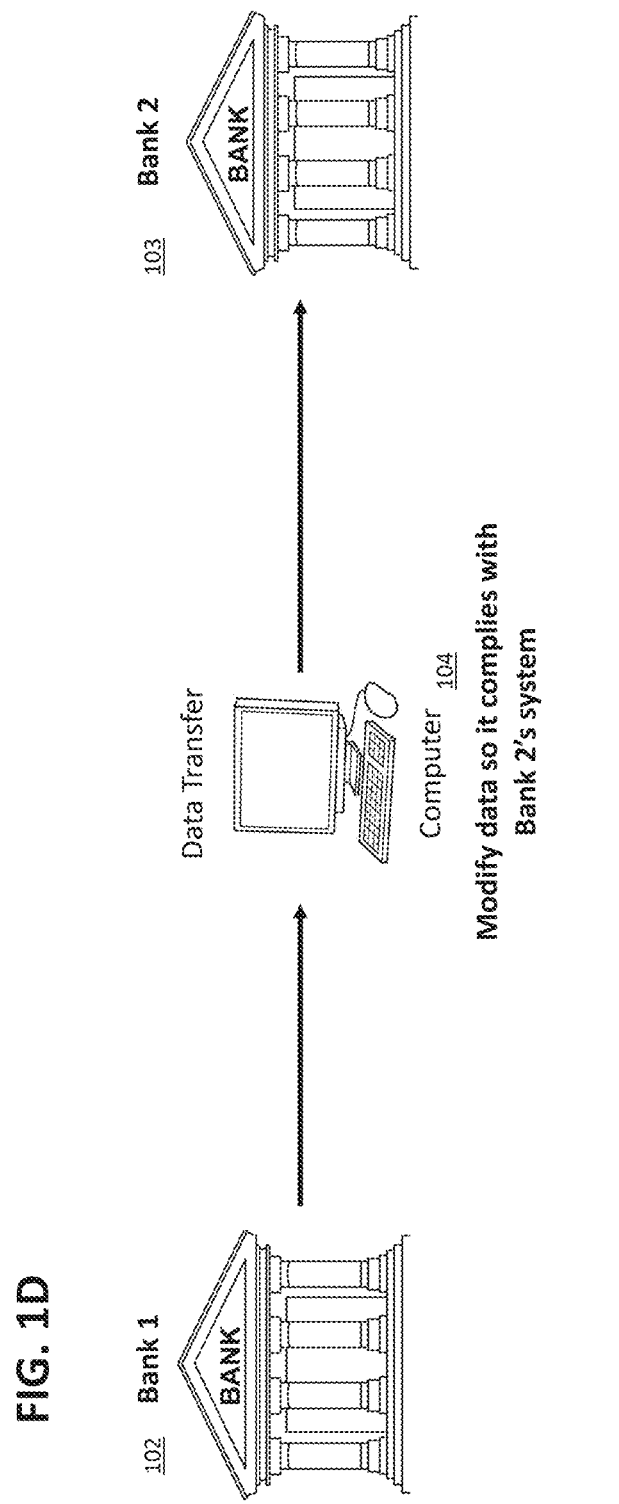
Figure 1E:
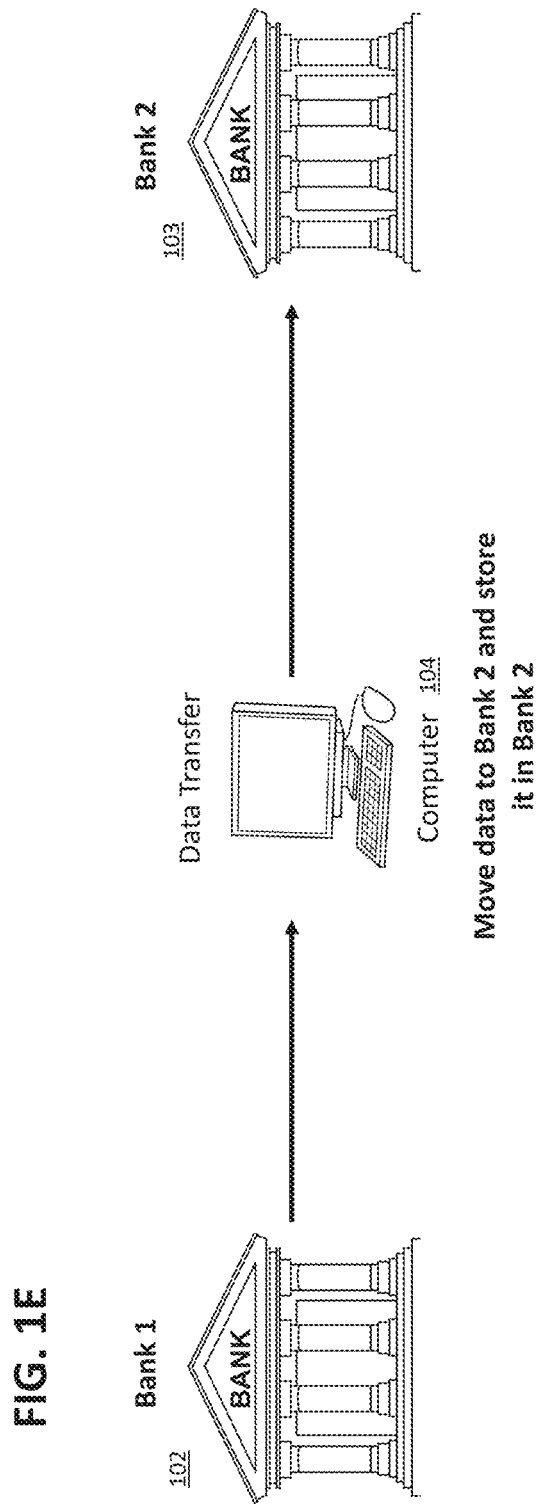

FIGS. 1A-E depict an exemplary illustration of transfer of data between banks via the data migration process. Briefly, as shown in FIG. 1A, a consumer 101 requests transfer of data from a first Bank 102 to a second Bank 103. As depicted in FIG. 1B, transfer of this data occurs through a computer processor 104. As FIG. 1C shows, the computer processor 104 runs through certain checkpoints to ensure the data may be properly and securely transferred from first Bank 102 to second Bank 103, such as confirming that the data is, among other things, accurate, complete, and reliable, and that the data has no inconsistencies or gaps. If the data does not satisfy any of these checks, it is retained and remedied. Once all checks are satisfied, the computer processor 104 modifies the data from first Bank 102 so that it is compatible with second Bank 103's system, as shown in FIG. 1D. Once properly modified and compatible, as illustrated in FIG. 1E, the data is moved to and stored in second Bank 103.

Figure 2:
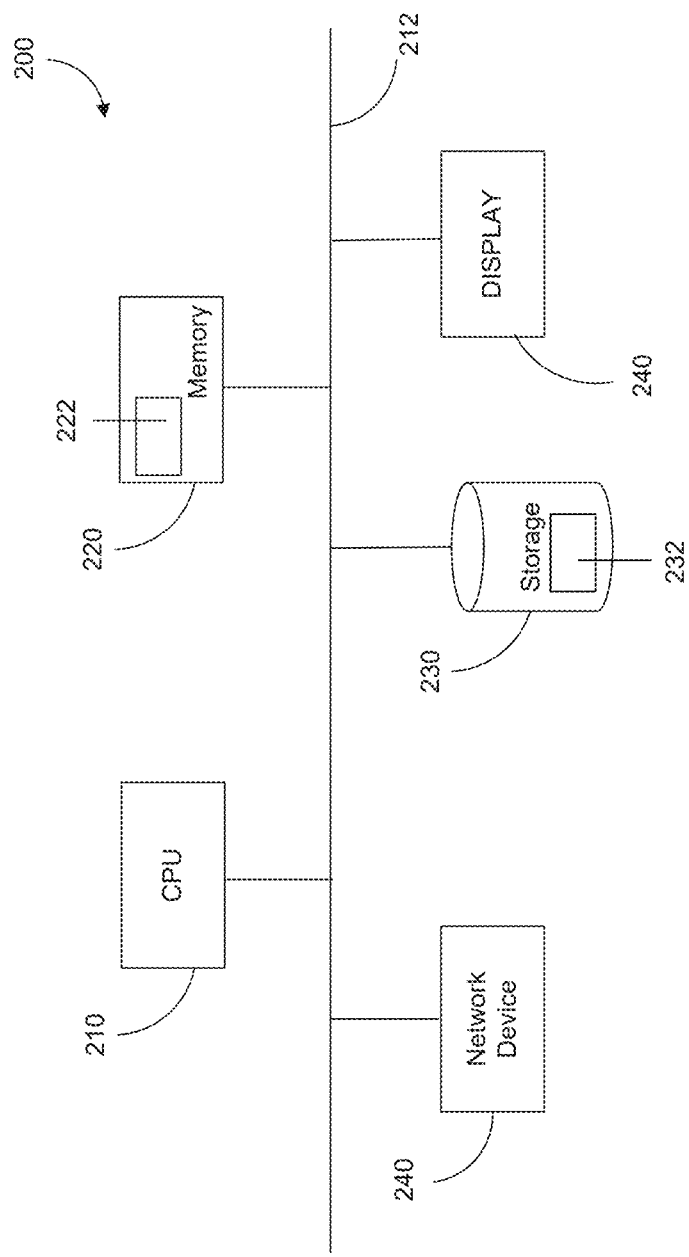
FIG. 2 is an exemplary schematic diagram of a computing device, consistent with some disclosed embodiments.

FIG. 2 shows a schematic diagram of an exemplary computing device 200 on which data, among other things, may be transferred, tracked, monitored, integrated, enabled, assigned, migrated, modified, identified, loaded, converted, classified, stored, moved, extracted, sorted, recorded, analyzed, compared, packaged, or maintained, consistent with some disclosed embodiments. In some embodiments, computing device 200 may include one of a laptop computer, a desktop computer, a tablet, a small form, a smart watch, an augmented reality device, a virtual reality device, smart glasses, or any other device capable of performing one or more computations and displaying one or more animated or in animate graphical images. Computing device 200 may include at least one processor 210, as discussed elsewhere in this disclosure. Processor 210 may be coupled via bus 212 to memory 220. Processor 210 and/or the memory 220 may also include non-transitory computer or machine readable media for storing software. As used herein, a non-transitory computer-readable storage medium refers to any type of physical memory on which information or data readable by at least one processor can be stored. Examples include Random Access Memory (RAM), Read-Only Memory (ROM), volatile memory, nonvolatile memory, hard drives, CD ROMs, DVDs, flash drives, disks, any other optical data storage medium, any physical medium with patterns of holes, markers, or other readable elements, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within an input unit or at a remote location. Additionally, one or more computer-readable storage mediums can be utilized in implementing a computer-implemented method. Accordingly, the term computer-readable storage medium should be understood to include tangible items and exclude carrier waves and transient signals.

Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Bus 212 may refer to a physical connection between processor 210 and memory 220 that may allow exchange of electrical signals representing commands or data between processor 210 and memory 220. Memory 220 may refer to a memory device as discussed elsewhere in this disclosure. In some embodiments, memory 220 may include memory portion 222 that may contain instructions that when executed by processor 210 performs one or more methods described in more detail herein. Memory 220 may be further used as a working scratch pad for processor 210, a temporary storage, and others, as the case may be. Processor 210 may be further connected to a network device 240, such as a network interface card, for providing connectivity between computing device 200 and a network, such as a network 210, discussed in more detail with respect to FIG. 3 below. Processor 210 may be further coupled with storage 230. In some embodiments, storage 230 may be used to store database 232, which may include single data type column-oriented data structures, data elements associated with the data structures, and so on.

A data structure consistent with the present disclosure may include any collection of data values and relationships among them. The data may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an array, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example, MongoDB, Redis, Couchbase, Datastax Enterprise Graph, Elastic Search, Splunk, Solr, Cassandra, Amazon DynamoDB, Scylla, HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

Computing device 100 may include or be connected to display 140. Display 140 may include an LCD or LED display, a touchscreen display, an augmented reality (AR) device, a virtual reality (VR) device, a projection system, or any other type of display device capable of displaying graphical representations of the multidimensional map and associated features (e.g., character, awards, reels) for viewing by the player.

Figure 3:
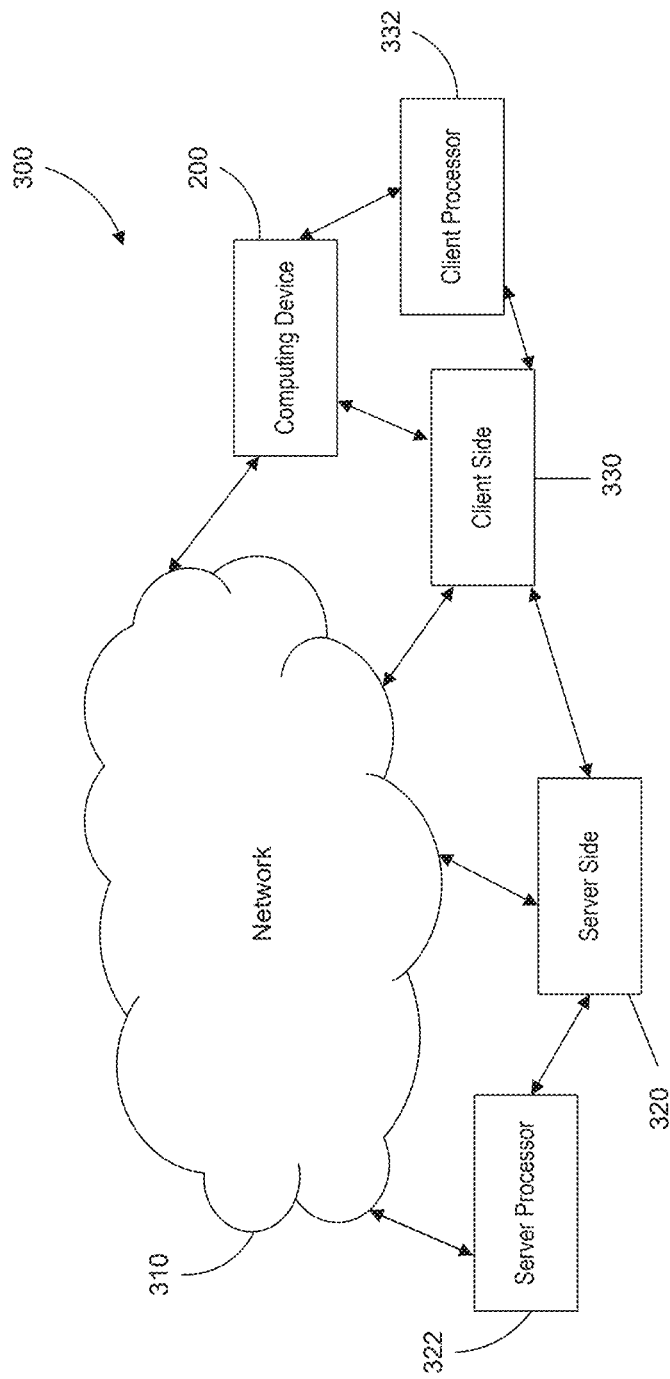
FIG. 3 is an exemplary network diagram of a system in which various disclosed embodiments are implemented.

FIG. 3 is a network diagram of an exemplary environment in which various disclosed embodiments are implemented. Computing architecture 300 may include computing device 200 that may be coupled to a network 310. Network 310 may enable communication between different elements that may be communicatively coupled with the computing device 200, as further described herein below. A network may include any type of physical or wireless computer networking arrangement used to exchange data. For example, a network may be the Internet, a private data network, a virtual private network using a public network, a Wi-Fi network, a LAN or WAN network, a combination of one or more of the forgoing, and/or other suitable connections that may enable information exchange among various components of the system. In some embodiments, a network may include one or more physical links used to exchange data, such as Ethernet, coaxial cables, twisted pair cables, fiber optics, or any other suitable physical medium for exchanging data. A network may also include a public switched telephone network ("PSTN") and/or a wireless cellular network. A network may be a secured network or unsecured network. In other embodiments, one or more components of the system may communicate directly through a dedicated communication network. Direct communications may use any suitable technologies, including, for example, BLUETOOTH™, BLUETOOTH LE™ (BLE), Wi-Fi, near field communications (NFC), or other suitable communication methods that provide a medium for exchanging data and/or information between separate entities.

One or more client-side devices 330 may be communicatively coupled with computing device 200 and client processor 332 via network 310. Client-side device 330 may be configured to send to and receive from the computing device 200 data. Both client-side device 330 and computing device 300 may communicate with network 310. One or more server-side devices 320 may be communicatively coupled with server processor 322 and client-side device 330 via network 310.

In accordance with the present disclosure, there is provided a DMF system for migrating data from one or more source systems (or outside locations) to a target system (or internal location). For purposes of this disclosure, a source system may also be known as a legacy system. A source system—or outside location—may comprise any location or entity from which data originates. By way of example, a source system may include an external business, company, or organization. For example, a source system may comprise Google Suites, a database, a server or a User network attached storage ("NAS"), etc. Examples of NAS devices include but are not limited to Isilon, Unity or NetApp. A target system—or internal location—may comprise any location or entity for which data is targeted or intended. Examples of a target system include a business, company, or organization.

The DMF system may comprise at least one location to sort, transform, or store the data in the migration process. Alternatively, the DMF system may comprise multiple memory, software, or physical locations to sort, transform, or store data in the migration process. In some embodiments, a DMF system may comprise a first location, a second location, and a target location. Locations may refer to the various destinations in the data migration path. DMF system locations may be either entirely temporary, entirely permanent, or both a combination of temporary and permanent. A temporary location may be one where data is sorted, transformed, or stored for a finite amount of time. A permanent location may be one where data is sorted, transformed, or stored for a continuing or perpetual amount of time. Locations may function to assess data quality, modify or convert data so that it complies with target destinations, or store data. In certain embodiments, the locations may be different. Different locations may comprise, for example, locations that are not the same but, rather, dissimilar or unalike. By way of example, different locations may comprise locations that are not located in the same physical location, or, alternatively, locations that correspond to different functions. Alternatively, locations may be different in form such that some may be physical while others may be software- or memory-based. In other embodiments, different locations may be located at the same physical location but may correspond to different functions. For example, some locations may be responsible for data storage while, in others, data analysis, conversion, or modification may take place.

In some embodiments, a system for migrating data from a legacy system to one or more target systems comprises: a data request feature whereby data from the legacy system may be requested by the one or more target systems; a data packaging feature whereby the requested data may be packaged and moved to a first landing zone specific to the legacy system; a second landing zone specific to the one or more target systems which may receive a copy of the packaged data in the first landing zone and may generate control counts and balances related to the packaged data; a staging layer that may: ingest the packaged data from the second landing zone; map the packaged data received from the second landing zone to data expected to be migrated to the one or more target systems; establish data transformation rules for transforming the packaged data into data that is compliant with the data requirements of the one or more target systems; load general enterprise reference data and reference data specific to the one or more target systems to facilitate the data transformation process; and perform a completeness check against the originally requested data to confirm all requested data remains present; a transformation layer that may transform the packaged data, if determined to be complete, to data that is compliant with the data requirements of the one or more target systems and run data quality and identification rules to identify any data gaps at the transformation stage; a first loading feature whereby, if no data gaps are identified, the transformed data may be loaded into applications specific to the one or more target systems; a validation feature whereby the loaded data may be validated to confirm it is both complete and accurate; a second loading feature that may load the data, if determined to be complete and accurate, to such downstream systems as an enterprise data storeroom or advanced analytical systems; and a migration reconciliation dashboard that may publish the status of the data as it is migrated from the legacy system to the one or more target systems.

In some embodiments, the conceptual architecture of and steps associated with the data migration factory may comprise the following: legacy system to target system mapping in which correlative data between the legacy system and target system are compared to ensure all data from a particular migration event has been properly converted; the generation of product-specific files and data control counts and balances by users of the legacy system, along with the obfuscation of data prior to data migration; a staging layer that ingests raw data, facilitates data mapping between legacy and target system data, establishes data transformation rules, loads target application-specific reference data, loads enterprise reference data changes, and performs data completeness checks; a transformation layer that transforms data from product-specific files to target system application-specific files, generates target system application-specific files, and runs data quality and profiling rules to identify any data gaps; loading data files in target system applications and validating the data loads; and loading target system application data to the target system enterprise data warehouse and publishing data migration results on a viewable dashboard.

In some embodiments, a landing zone may acquire and safely transfer various categories of legacy system data to a target system. A landing zone may be a file server (i.e., a Linux file server) that catches files transferred from a legacy system landing zone. In some embodiments, data may be organized by mnemonic system identifiers associated with the legacy system and data files captured in their inventory. A landing zone is a key feature of the data migration factory. Data may be transmitted from the legacy system to the landing zone either directly through physical transfer or, alternatively, over a wire. Data may be written directly into destination folders using an applicable tool or process. Data file naming conventions may be unique to mitigate unintended deletion or overwrites. By way of example, data files may be named using a legacy system-specific mnemonic, a brief description of the data file, a date that data content was added or updated within a particular file, or by file extensions. Alternatively, data file naming may depend on the control file name or control file schema. A mnemonic identifier system may facilitate organization and mapping between legacy and target systems. Rules for migration may comprise data packaging rules, transformation rules, or other data migration rules.

In some embodiments, the staging layer may comprise a particular location in the data migration factory downstream of a landing zone. The staging layer may be employed to perform data completeness checks. By way of example, the staging layer may function to confirm all customer records have a social security number, date of birth, address, and phone number. A staging layer may comprise a combination of databases and file systems, including a cloud analytics database, mainframe, and/or distributed storage. The staging layer of the disclosed data migration factory may support each step in data acquisition, data transfer, and data staging. It may be composed of four NAS volumes shared across migration factory Linux servers using Network File System (NFS) mounts. It may be employed to support any image or document data or unstructured data sources from legacy system applications. Folder-naming conventions for the staging layer may employ legacy system-specific codes. Any affiliated ZIP Archives, listings, and control file names may adhere to standard naming conventions. And metadata may persist in repository tables and be harvested for presentation on a dashboard. In some embodiments, the staging layer may comprise a mainframe staging layer or, alternatively, a midrange staging layer. A staging layer may comprise a combination of databases and file-based data structures.

The migration factory dashboard may comprise a Data Controls Panel that will be built and employed to provide transparency to users regarding all data controls, identified defects, and remediation progress among all layers or stages of the data migration factory. In addition, the Data Controls Panel may provide transparency regarding the status of data migration across data migration factory layers.

The dashboard may comprise several control types. In some embodiments, a control type may comprise the status of a legacy system data request and subsequent loading of data associated with the request. Users may submit a data request to a legacy system via a particular data request process. A team of users from a target system may work with users of the legacy system to prioritize, schedule, and deliver legacy system data files to a landing zone. The data request status and file load status may be published in the Data Controls Panel with specific times and any identified issues. A data request may comprise merged requests from multiple lines of business. Legacy system data load status may provide transparency into data migration from the legacy system to target system applications. Status may be conveyed by legacy system code, target system name, target system application, load status, or "as of date". Load status may be monitored using a color-coded system across different layers of the data migration factory. By way of example, an actual data output at the staging layer may be compared with expected data output; output at the transformation layer may be compared with output at the staging layer; and output at the enterprise data warehouse may be compared with output at the staging layer. Following comparison, if no variance is observed, a status may be green, while a red status may indicate data variance between stages. A summary providing overall status of different data migration factory layers, including any observed variance, may be reported. This summary may be detailed by target system mnemonic, legacy system code, or other identifier. One example of such a summary may comprise a report on customer accounts that provides account numbers, balances, and other specifics. Such a customer account report may show accounts with balance variance and indicate whether a particular legacy system account number is eligible for conversion or not. Data conversion may be automated and metadata-driven, which allows for large scalability.

In some embodiments, prior to a data request being processed, a demand management system may be employed that assigns unique payloads for structured data and unstructured data. The demand management system may comprise a database that enables legacy and target system users to monitor data files during migration until their status is loaded onto a dashboard. Thus, users can identify the status of particular payloads proceeding through migration. By way of example, a dashboard may start with zeroes until data transfer is initiated, at which point the status of data transfer begins to update on the dashboard. Once deemed feasible, the data request may then be processed, and data may be packaged for migration. In some embodiments, data packaging instructions may depend on data type (e.g., structured data vs. document data vs. interactive voice response (IVR) data). The data management system may create identifiers to facilitate tracking and monitoring of a particular dataset undergoing migration. In some embodiments, the identifiers may comprise payload level identifiers, whereby a dataset is characterized or identified by its data carrying capacity. A dataset may be subject to various observation checkpoints along the migration path to ensure data is being completely and accurately migrated. In some embodiments, the data management system may facilitate comparing actual versus expected data output at various stages of migration.

In some embodiments, a control type may comprise identifying development defects. Legacy and target system users may work together to define workflows and manage and document any identified defects that arise during data migration. Such defects may be published in the Data Controls Panel, for example, by a defects-specific dashboard that highlights live open and closed defects. Defects may be defined by several attributes such as, for example, defect identification, defect description, defect detection date, defect severity, location of defect detection, status of defect, defect type, target system or application specific code, target system name, data file name, or whether the identified defect is in the data migration factory or outside of it.

When navigating through a defects dashboard, a user may adopt an executive view, which provides an overview of defects that are currently open, displaying them based on severity, line of business, migration event, or data migration factory element so that users may gain a high level understanding about the current performance of defects. Defects may be presented in a data table, where users may scroll through and utilize filters to zero in on a particular defect. Open defects may be defined by severity (whether critical, high, medium, or low); severity and line of business; or severity, line of business, and data migration factory layer (landing zone, staging layer, transformation layer, target system application). Alternatively, defects may be defined by status (whether new, open, reopened, assigned, deferred, ready to retest, or fixed) and migration event.

In some embodiments, a control type may comprise data movement control. As data moves through the data migration factory, legacy and target system users may build data movement controls defined by basic guidelines within migration factory layers/stages. Such controls may comprise job status, row counts, sum amounts, etc. Data movement control outputs may be published in the Data Controls Panel.

In some embodiments, a control type may comprise account traceability and balance reconciliation for, for example, loans and deposits legacy systems. Key financial attributes may be defined and identified within a legacy system and mapped through to a corresponding target system application. Key data requirements from the target system application may be identified during data mapping. Controls may have multiple levels of detail and show variances across migration factory layers. Such controls may be published in the Data Controls Panel. In some embodiments, account traceability and balance reconciliation may comprise tracking each individual loan and deposit account from the legacy system to different layers/stages of the data migration factory. Key attributes may be tracked, such as, for example, account number, total balance, outstanding balance, accrued interest, charge off, recovery, unfunded amount, or credit limit. The ability to monitor account traceability and balance reconciliation may depend on data mapping, the migration process flow, and data availability.

In some embodiments, a migration reconciliation dashboard may track items of data as they flow through a migration system. An item may comprise a dataset (rows of structured data) or an object (a file, an image, a document of unstructured data).

To enable tracking and traceability of data files, standardized naming conventions may be employed for control files that are ingested into a migration system during processing. An example of a standardized naming convention may comprise datarequestID_dataset#_sourcesystemname_datetime.csv. There are typically two files for each ingestion step: a data file and its corresponding control file. Naming the control file represents a unique ingestion process step tracked in a metadata database.

For ingestion and tracking/traceability of structured data, a control file in csv format may comprise a frequency measure of an expected row count in the file, so it can be uniquely identified and correlated to a particular migration job. In addition, a structured data file may comprise a financial measure (e.g., "amount" in a column referring to a sum) for all rows in the data file. Thus, two measures may be employed as a validation step to ensure data ingestion has been accurately processed without errors.

For ingestion and tracking/traceability of unstructured data, a unique naming convention may be employed that comprises an expanded control file—or manifest file—that enables predictable file movement capacity since payloads for unstructured data are typically objects rather than structured columns and rows. A container may be created using a common archive file format in the public domain to facilitate management of unstructured data files. In some embodiments, the manifest file may comprise significantly more metadata about a particular data object in the container than a control file. In some embodiments, a manifest file may describe schema of incoming data and function as a unique key that may be employed for locating a data object during migration. By way of example, for an account 1234 with a loan of $10 million dollars, an account identifier, a customer identifier, and a loan identifier may be unique enough to identify a particular loan. A manifest file may serve as a detailed description of the data file, thus generalizing the process of moving data.

In some embodiments, a control type may comprise data profiling and data quality. Data quality may be implemented by data quality rules and data quality outputs published in the Data Controls Panel.

In some embodiments, a control type may comprise monitoring and identifying any data gaps and remedying such gaps. Data gaps may be associated with key data elements/requirements identified during data mapping. Gaps and remediation efforts may be captured and published in the Data Controls Panel. An overview of data gaps may be provided on a dashboard. Display of data gaps may comprise total data gaps, total key data element/requirement gaps, remediation status of data gaps, or total gaps by target system line of business. Charts may be provided for enterprise level data gaps, data gaps by remediation category, or consumer gaps.

Data controls may exist at various points in the migration factory path, including extraction, packaging, transformation, delivery to the target system, and at an enterprise data warehouse within the target system.

During data migration, data load and movement control may be associated with a number of steps. In a first step, metadata control files may be provided that contain reference data and may be used in controls reporting. Metadata may be employed to calculate a volume of a particular dataset and compare it against an expected volume of the same dataset. Metadata may be employed to generate data control checkpoints along the migration process where particular datasets are validated and verified against control files. The status of such checks may then be presented on the migration dashboard. Reference data may comprise a job name, a legacy system table, a loaded target system table, metrics to track (i.e., record counts), or summable amounts. Data migration factory users may upload control files on to a Controls database and copy data as it progresses through migration. In some embodiments, control files may be created by data packaging teams. A control file may mirror a receipt that describes a particular data package being migrated. In a second step, a process may be developed to collect control data. Control data may be defined by metadata. Data may be loaded to target system dataset, and the time of the data load may be recorded. Certain records may be filtered out prior to loading to the target system dataset while other records may be written into the dataset. Legacy system and target system field names may be employed. In a third step, control data may be transmitted to the data migration factory via two separate processes. A first process may comprise a cloud storage procedure where legacy system and target system users use a particular platform as a data movement tool. In some embodiments, the platform may be Informatica. In this first process, control data elements may be passed as parameters. A second process may comprise writing control data to a separate file or dataset per control-specific templates and calling a job signaling completion. Control data may subsequently be pulled and loaded to a cloud analytics platform for reporting.

A legacy system data movement controls dashboard may provide insight into data movement control outputs across data migration factory layers. Such movement may be monitored by legacy system application code or some metric associated with a target system application or domain. Such a dashboard enables tracking of control file count totals and balance totals from a legacy system to different layers/stages of the data migration factory until migration culminates at target system applications.

A data movement controls dashboard may comprise several capabilities and advantages. Capabilities may comprise documentation of legacy system features and options; a dashboard of target system product features and options; standardized legacy system-to-target system data mapping; identification of one-offs, small populations, and unique features in a particular dataset; documentation of interface and peripheral systems; and standard and ad-hoc reporting.

A data migration factory dashboard may present data and control file status in multiple ways. For example, the status of a control file within a landing zone may be presented by target system application or, alternatively, by legacy system code. In some embodiments, details about data movement controls may be provided. For example, control file record counts and amounts may be monitored from landing zone to staging layer by legacy system code or target system application. Metrics may be compared against a prior stage or layer as data progresses to report data status. A control file may be compared against a data file as data migrates to identify data discrepancies or issues with data quality.

The data migration factory may comprise a data request and data load status guide that provides insight into data file loads from a legacy system to an enterprise data warehouse of a target system. Individual files may be monitored by legacy system code, target system mnemonic, or target system line of business. The scope of the guide may comprise all datasets extracted and packaged from the legacy system. The migrating data may be consumed by various applications through the data migration factory before final output at the target system enterprise data warehouse. The disclosed guide may be found in standard data migration factory conversion or customized vendor-to-vendor conversion or manual conversion. By way of example, in standard conversion, legacy system data may be consumed at the stage layer and transformation rules applied prior to output at the transformation layer and final output at the target system enterprise data warehouse.

There may exist certain exceptions to the data load and movement control requirements of the data migration factory. Data flow through a data migration factory may proceed through various target system applications, such as data warehouses, advanced analytical systems, and content management systems, prior to a final output at a target system enterprise data warehouse. Data flow may proceed through several types of migration patterns: standard data migration factory, partial data migration factory conversion, vendor-to-vendor conversion, manual conversion, or data migration factory-landing zone only conversion.

Under standard data migration factory conversion, legacy system data may be consumed from a stage layer and transformation rules applied prior to providing a final output at a transformation layer and target system enterprise data warehouse.

Under partial data migration factory conversion, legacy system data may be consumed from stage/transformation layers and a writeback file provided to the transform layer with converted data and non-converted data account details. A final output may then be provided to an enterprise data warehouse. The purpose of a writeback file may be to ensure that all data expected to be converted is accurately, completely, and properly converted and to allow for discrepancies to be remedied and reconciled.

For manual data conversion, in a first step, a legacy system may provide a control file to a target system operations team that will manually enter the data. The control file may represent a number of records to be manually entered and a sum of key amount fields. Control files may be uploaded to the Data Controls Panel either before or after data is entered into the target system. In manual conversion, writeback files may be manually prepared at several data migration factory stages.

For vendor-to-vendor conversion, a legacy system may request from a vendor a complete file of all records to be converted and submit that file to a landing zone. The legacy system may provide a control file for the legacy system data file to a target system based on target system templates. The control file may then be uploaded to the Data Controls Panel. Data may then be converted from the legacy system to the target system. Vendor-to-vendor conversion may comprise legacy system or target system-specific vendors and writeback files for data validation.

In data migration factory-landing zone only conversion, data may be sourced from a landing zone and a final output file provided to a target system enterprise data warehouse with a writeback file loaded to a transformation layer for data validation.

In some embodiments, a controls framework may be established for the data migration factory. Under this framework, a legacy system data file may consist of a legacy system-specific code and an "as of date". The "as of date" may represent a particular date when a dataset is provided to a file. Data may also be associated to an "end date", which represents a final date when all data has been added and transformed within a particular data file.

The data migration factory may possess the ability to conduct a customer and account data cross-reference across the legacy and target systems. The cross-reference may be designed to help target systems accurately cross-reference customer and account data so that it is accurately converted to target systems. Cross-referenced account and customer data may be included in a particular database where data has been mapped between legacy and target systems.

In some embodiments, data may be converted via staging and transformation steps. Typically, legacy and target systems may follow specific standards such that data from the legacy system will have to be converted to comply with target system requirements. In certain situations, the legacy and target systems may follow the same standards and thus be compatible from the outset such that data transformation may not be necessary. Transformation of data from legacy system format to format compliant with a target system may be mediated by WTX and ETL transformation systems. A transformation layer may transform data to meet specification requirements of the target system and prepare data for ingestion into the target system. A quality control feedback loop may apply data quality and profiling rules to a data transformation layer in order to make sure all requirements are met to smoothly transfer and ingest data into a target system. The quality feedback loop flags any deficiencies in data transfer for subsequent remedy. Reference data may comprise a mechanism to employ target system coding as common reference information to facilitate transformation of legacy system data to target system data. Reference data may comprise general enterprise data or line-of-business data. Reference data may comprise a single storage point that can be reused by any data transformation process. Derivation logic may comprise normalizing data so that differences between a legacy system and target system are accounted for and translated. Data may then be transformed in accordance with transformation rules in order to comply with a requirements associated with a target system.

Following transformation, once data has cleared final inspection, data may be loaded into target systems. Each target system data table may comprise separate sessions or workflows and a driving legacy system attribute that facilitates data gap identification and reconciliation. The status and identification of data gaps may be provided directly to a dashboard. Any data gap on a dashboard may be analyzed to determine if that gap is an actual issue or non-issue. In some embodiments, the dashboard may accumulate inputs of migrated data at various stages of migration and present status updates on that migrated data throughout the migration process. For purposes of this disclosure, a dashboard may comprise a migration reconciliation dashboard. Following migration to a target system, data may be sent to downstream consuming systems. By way of example, data may be transferred to an enterprise data warehouse within the target system.

Within the data migration factory structure, a container may comprise a ZIP file wrapper of up to 100,000 files that groups likely objects together in a navigable folder structure. Metadata may comprise business keys that users employ to correlate customer data, account data, transaction data, and other identifiers between legacy and target systems. Metadata may also facilitate fulfilling data control, audit, and compliance lineage requirements. Manifest may comprise a control document that provides specific details about each file in a Container.

The disclosed data migration factory may provide the ability to conduct a comparison of data before and after migration. In particular, legacy system data may be compared to corresponding target system data. By way of example, by having customer information file (CIF) data from the legacy system in the same environment as CIF data from the target system, users may compare customer and account counts, consider data transformation logic, and validate field comparisons. By way of example, users may confirm that social security numbers, names, and account relationship remain consistent as data migrates from the legacy system to the target system. Conventional data conversion systems only include the target system view so users are forced to guess or assume that all data has been properly converted. The disclosed data migration factory enables direct comparison of data, i.e., CIF data, between the two systems.

The data migration factory may comprise a number of control categories and checkpoints that monitor and regulate data as it proceeds through the migration process, ensuring that all data from a legacy system is properly converted to a target system. Controls may comprise data movement controls that control count and balance of data at four major locations in the migration factory: the legacy system, the staging layer, the transformation layer, and at the enterprise data warehouse stage in the target system. In addition, controls may comprise financial controls that provide a balance sheet reconciliation view during data migration for such financial categories as outstanding balance, line of credit, accrued interest, and long-term debt charge off amount. Controls may additionally comprise data quality and profiling using, for example, a mnemonic system as well as data gaps and mitigation in which all identified data gaps are documented and mitigated. Finally, controls may comprise development defects by criticality, source, or layer and data load status for each data migration layer (stage layer, transformation layer, enterprise data warehouse stage).

The disclosed data migration factory may comprise a file watcher. The file watcher may monitor control file load by capturing an inventory of requested legacy system files through demand requests, capturing a data file and control file metadata that are extracted and packaged from the demand requests, capturing control metrics associated with the data file from the legacy system, and capturing mapping between the legacy system and target system applications. The file watcher may facilitate high capacity and high volume migration of data by loading files into a Connect Direct program configured for load balancing and scalability.

The disclosed data migration factory may also comprise legacy system-target system data mapping, where data entries associated with a job may be captured for legacy system and target system mapping. Such mapping may provide information on a legacy system file or table for count reconciliation. Mapping may auto-populate based on job-naming conventions.

Control metrics may be captured at the table and column level after data is loaded. Such metrics may include row counts and sum amounts.

Details of data load jobs and runtime statistics may be captured for both informatica and non-informatica jobs. Informatica jobs may capture details of workflow, sessions, and job runs (e.g., timestamps, status).

The disclosed data migration factory may comprise reference data. Reference data may comprise schema names, mnemonics, table metric types, and column metric counts.

In alternative embodiments, the data in the system may be migrated via a customized path that bypasses one or more features of the system. In the embodiments, the one or more bypassed features may comprise the first and second landing zones or other components of data migration. Customized data migration may comprise special uses cases where custom data is converted. In some embodiments, the customized migration path may be associated with such special use cases as acquisition, realty, or provider uses. In some embodiments, provider use may comprise a customized migration path specific to a particular provider. In some embodiments, the provider-specific migration path may comprise a neutral environment for data migration in between the legacy system and the one or more target systems. In some embodiments, migration of IVR data may be customized via, for example, a server-to-server system.

Background migration paths may comprise customized paths that migrate particular types of data, such as, for example, video or audio data. In some embodiments, customized migration paths may bypass a migration factory landing zone and, alternatively, go through a separate neutral or customized landing zone. Data and audit controls may be present in all migration paths, whether customized or via the migration factory.

For customized migration not involving a migration factory, metadata may be provided in advance. Such metadata may comprise data load job details; legacy system-to-target system mapping; and table level, column level, and runtime metrics at each applicable stage/layer. Actual values recorded should be compared against such metrics to ensure data conversion is proceeding accurately and completely. Mainframe and Linux servers may be employed for customized migration.

In other embodiments, special use cases may comprise vendor- or supplier-specific cases, or Enterprise Taxation and Policy Management Data, or Government, Risk, and Compliance data. Vendor-specific special use cases may employ particular platforms for customized migration, such as, for example, Google Suite for email migration. Such email migration may comprise: initiating a connection from Google Mail to a Quest Migration Tool, loading a user list into a migration tool with legacy and destination systems, loading parameters for data migration, initiating a connection to a migration via neutral tenant, migrating Gmail data to the neutral tenant, setting parameters for migration of data from the neutral tenant to a target system, migrating data from the neutral tenant to the target system, and validating the data once migrated. A tenant may comprise a cloud container that houses specific data and provides a large amount of compute capacity. By way of example, a legacy system tenant may be Google Suite and a target system tenant may be Microsoft Office. There may be a third tenant intermediate between the legacy and target system tenants. Alternatively, platforms for customized migration may comprise Google Drive/Box and network-associated storage with similar migration steps involving a Quest Migration Tool and neutral tenant.

In some embodiments, the legacy system may comprise a cloud-based platform. In some embodiments, the cloud-based platform may comprise cloud computing and collaboration tools, a cloud-based storage system, and a network attached storage (NAS). In some embodiments, the customized migration path may comprise server-to-server migration, or, more specifically, database server-to-database server migration. In some embodiments, the database server to database server migration may be subjected to size restrictions. In some embodiments, the database server-to-database server migration may comprise a retention policy on highly confidential regulatory data. In some embodiments, the database server-to-database server migration may comprise backup and restore functionality. In some embodiments, the database server-to-database server migration may comprise NAS-to-NAS migration. For such customized migration, a legacy system may employ such platforms as Isilong, Unity, and NetApp to store employee and departmental files or, alternatively, load documents. In some embodiments, for NAS storage, the target system may select a vendor and develop storage architecture that supports the data integration requirements of a legacy system. As with the data migration factory, the legacy system may provide business directory information and other metadata to correlate customer data, account data, transaction data, and other identifiers between legacy and target systems. Alternatively, data control metadata may be provided by a vendor.

In some embodiments, the NAS-to-NAS migration may be subjected to data controls provided by the legacy system and one or more target systems and executed by a provider. In some embodiments, a provider may comprise a vendor. In some embodiments, the data controls may comprise metadata that facilitates identification of data during NAS-to-NAS migration. In some embodiments, security concerns may be flagged during the database server-to-database server migration and migration may be paused until the security concerns are resolved. In further embodiments, a security concern may be identified, causing a resolution message to issue and migration to pause. A migration system may then resolve the security concern, allowing migration to resume.

By way of example, one type of security concern may be an authentication mismatch by an account employed by an automated job to access a legacy system. In such a scenario, a migration system may record the error message generated by the legacy system as a result of the authentication mismatch and exit from the job. The error message may then be employed to validate whether the job was operating with the correct operating system profile, which will prevent system users from working on migration jobs with configuration errors or subject to security breach attempts.

Another type of security concern may be an entitlement mismatch at a legacy system, landing zone, or transformation stage, where an incorrect account is being employed to read data. Such a mismatch may prevent data consumption teams from receiving data they are not authorized to use or view.

Regarding data controls for special use cases involving a customized migration approach, legacy and target systems may develop migration requirements that a vendor will execute.

In some embodiments, the migrated data may comprise consumer data, balance sheet data, business agreement data, consumer non-business agreement data, human resources data, security application data, agreement history data, imaging and document data, video data, audio data, and provider data. In some embodiments, migration of imaging data may allow for development of a document classification approach that identifies signature card images from multi-page tiff documents. In other embodiments, data types that may be migrated include core banking data. Core banking data may comprise customer data, account data, financial transaction SPOT data, transaction history data, or customer non-financial transaction data. In addition, human resources and employee data may undergo migration. Data related to cyber security and fraud technology may be migrated.

In some embodiments, the migrated data may be associated with metadata that facilitates control, audit, and compliance of the data as it migrates from the legacy system to the one or more target systems and is transformed and loaded into the one or more target systems. In some embodiments, the metadata may automate data migration and transformation such that it is scalable to voluminous amounts of data.

In some embodiments, data may be migrated physically. In other embodiments, the data may be migrated over a network or wire. In other embodiments, the data may be migrated via cloud environments.

In some embodiments, the migrated data may be subjected to one or more checkpoints to ensure complete migration from the legacy system to the one or more target systems. In some embodiments, the one or more checkpoints may comprise one or more of data quality and profile, quality assurance, final inspection, or the migration reconciliation dashboard.

In some embodiments, data migration may be subjected to specific controls. In some embodiments, the controls may comprise data counts or data balances. In some embodiments, the controls may be present at checkpoints along the data migration path. In some embodiments, the checkpoints may comprise data extraction prior to packaging, data packaging, data transformation, delivery of transformed data to the one or more target systems, or delivery of data to an enterprise data warehouse or advanced analytical systems within the one or more target systems. In some embodiments, the controls may be associated with system of record transaction data. In some embodiments, the controls may be published on the migration reconciliation dashboard enabling presentation of the status of the system of record transaction data as it is migrated from the legacy system to the one or more target systems. In some embodiments, the system of record may be a mainframe system. In some embodiments, the migration reconciliation dashboard may present such financial categories as outstanding balance, line of credit, accrued interest, and long-term debt charge off amount.

In some embodiments, a customer key may be employed to connect a customer account to customer information file data as it progresses from the legacy system to the one or more target systems. In some embodiments, the customer key may be employed to track customer data as it moves through the migration factory. In other embodiments, the customer key may be employed by a target system to create a link between data extracted from a legacy system and data expected to be transformed and integrated into a target system.

In some embodiments, the migrated data may comprise structured data or, alternatively, unstructured data. Unstructured data, for example, may comprise high volume file-based payloads. In some embodiments, the migrated data may comprise transaction current snapshot data. In some embodiments, the migrated data may comprise transaction history data. In some embodiments, the migrated data may comprise highly sensitive customer data that is cordoned off into a data clean room that restricts access to authorized individuals. In some embodiments, a data clean room may store highly confidential data and be accessible only to pre-authorized individuals that require specific authentication as a restricted privilege process to access the data clean room.

In some embodiments, following approval of the data request: the data may be extracted from a storage location within the legacy system; the extracted data may be assigned a particular code that functions as a data identifier; an archive file may be created in a location in the legacy system with sufficient capacity to receive the extracted data; the extracted data may be loaded onto files with capacity to store and move the extracted data; the files may be packaged and added to the archive file in uncompressed form; a data control file may be created that correlates with the packaged data and is paired with the archive file to ensure all of the extracted data is properly packaged for migration; the status and content of both the archive file and data control file may be published on the migration reconciliation dashboard; and the archive file and data control file may be moved to the first landing zone specific to the legacy system in preparation for migration to the one or more target systems. In some embodiments, the data control file may travel with the archive file throughout migration to ensure all data is properly migrated to the one or more target systems and flags any inconsistencies or discrepancies that arise during migration. In some embodiments, the migrated data may comprise structured data or, alternatively, unstructured data. In some embodiments, the particular code may be a tracking code that allows for data to be tracked following extraction. In other embodiments, the particular code may be a linking code that links data extracted from a legacy system with data expected to be transformed and integrated into a target system to ensure that data is completely migrated from the legacy system to the target system.

Migrating unstructured data may be separate than structured data. By way of example, extraction, packaging, and transfer of unstructured data files may proceed as follows. A request for unstructured data (i.e., image and document data) may be created. For extraction of unstructured data files from a legacy system, a particular vendor may be identified, along with a particular legacy system business code associated with the extracted data. The total capacity needed for the extracted data may be calculated and a work area with sufficient space for the extracted data identified so that a ZIP Archive may be created. The ZIP Archive may function as a container that groups related objects together in a navigable folder structure. In some embodiments, extraction of data may comprise a quality control check by the legacy system, whereby a quality control process is run to calculate rows and verify filters needed to meet a particular data request. The extracted file may then be packaged. For file packaging, all extracted files may be added to the ZIP Archive with file-naming conventions. All relative file paths may be included in the ZIP Archive. The ZIP Archive may typically be uncompressed, as compression delays ZIP Archive creation. A ZIP Archive listing may be produced and a data control file created. The ZIP Archive listing may function as a control document that provides known metadata about each data file and is generated and stored in the ZIP Archive prior to transfer. Metadata functions as a file listing generated by the data packaging process that is employed to fulfil data control, data validation, audit, and compliance lineage requirements. The packaged file may then be transferred. For file transfer, a technical environment destination for transfer of the ZIP Archive must be confirmed. The ZIP Archive, Archive Listing, and Data Control File may then be dropped in the appropriate folder and transmission to the target system confirmed with a legacy system user. Initiation of transfer to the staging area may then occur. In particular, the Data Control File may be ingested and processed into a Cloud Audit, Balance & Control database and the Zip Archive file content may be validated such that it matches the Data Control File and any discrepancies are reported. A request to access the migration staging area may be submitted before the Zip Archive is collected from the landing zone.

A legacy system may employ multiple transfer patterns in order to provide a highly scalable data integration process defined by legacy and destination systems. Such an approach may facilitate bulk migration of unstructured data via such platforms as Google Suite and NAS. Data files may be stored in such platforms as Enterprise Content Management. Storage of data files during data migration may persist until all files have been dispositioned into a target system. Data controls function to ensure that each step in data migration may produce a metric validating complete data transfer to a target system. ZIP Archives may be retrieved and unzipped and any necessary data transformations performed for successful migration to a target system.

Information packaging may be initiated via a demand management system that sets up unique identifiers for structured and unstructured data. A target system may submit a data request from a legacy system via the demand management system. The demand request may be forwarded to the legacy system packaging team in accordance with target system specifications. Demand requests may be for any type of data including, but not limited to, audio data. The demand management system may account for roadblocks during dataflow. Once requests are made to the legacy system, legacy system owners may extract data from the legacy system and drop data files in a legacy system landing zone through a VPN connection. The data files may then be copied and moved to a target system landing zone.

Entry conditions may comprise conditions that a data request must meet for unstructured data to migrate. Such criteria may be unique for each use case and require defined extraction, packaging, and data controls in order for migration to proceed efficiently. Entry criteria may comprise data source criteria, such as, for example, NAS, cloud storage, or an application server subsidiary. NAS may comprise a file share associated with legacy system business function and containing document data, image data, audio data, or video data. Cloud storage may comprise a group storage that is shared across legacy system business function. An application server subdirectory may comprise a server-attached storage path exclusive to legacy system application servers. Entry criteria may additionally comprise specific size criteria or packaging criteria. By way of example, audio or video recordings are not supported by a server-to-server migration pattern and, thus, may be migrated using an import or export function provided by a vendor. In such circumstances, the vendor may provide an internal metadata file for each object stored in a server.

The legacy system landing zone may deliver the data payload to specific targets within the data migration factory using a file watcher process, which is part of a Connect Direct program that assists with scalability and ensures proper data delivery and quality of service capability. Each system may manage data security during transfer. By way of example, data may be encrypted at rest and while in motion by the Connect Direct program. A broken data payload may result in such negative consequences as a confidentiality breach.

Landing zones may be split to accommodate two sets of data volumes. For example, landing zones may accommodate 400 terabytes of unstructured data and 20 terabytes of structure data.

A dashboard may collect metadata statistics as data demand requests are made and data flows through the data migration factory. The dashboard facilitates ensuring data requests are met. The dashboard serves as a monitoring system and updates with data statistics as requests are made.

Control files may be created and allow checking of the migration process at each step along dataflow. Data packaging team may create the control files, which function as separate records that describe data files. Control files may be part of a data package and serve as information material that describes the content of a particular data package and helps understand what is comprised within a particular data payload.

Figure 4:
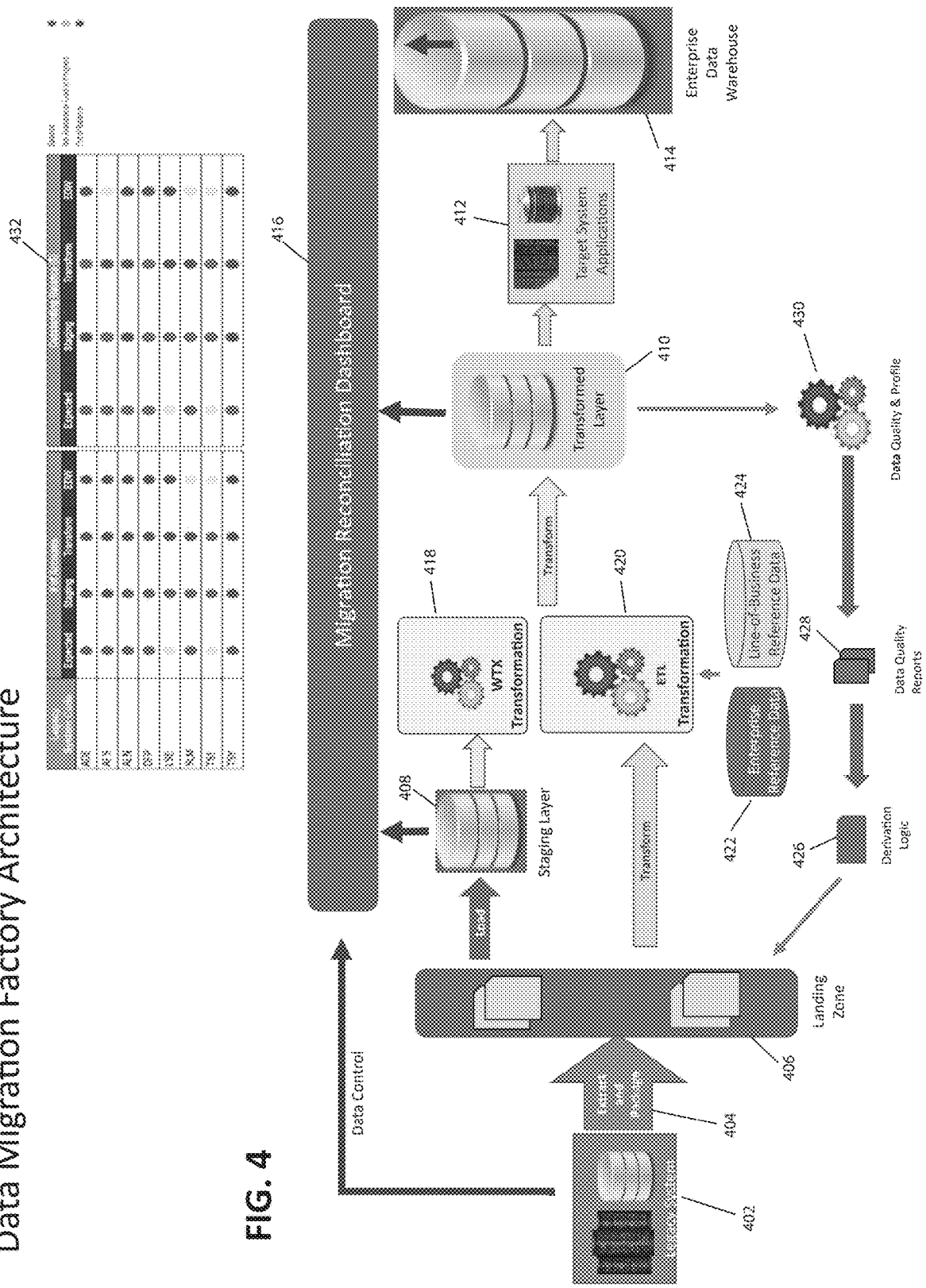
FIG. 4 is an exemplary illustration of the architecture of the disclosed data migration factory.

FIG. 4 depicts an exemplary illustration of the architecture of the disclosed data migration factory. A request is made by a target system for data from a legacy system. As shown in 402 and 404, the data request is processed and data from the legacy system is extracted, packaged, and moved to a landing zone 406 that receives the packaged data. As a data control mechanism, specifics about the requested and packaged data as well as the status of the data request and extraction are presented on a migration reconciliation dashboard 416 for user monitoring. In particular, data counts and balances are identified and presented on the dashboard 416. Relying on enterprise reference data 422 and line-of-business reference data 424 as input and to facilitate transformation, some of the data in the landing zone 406 is then directly transformed to comply with the data format and requirements of the target system. Such "bypass" migration may occur if a particular dataset is voluminous or depending on the preference of a particular user or migration vendor. This customized data migration may be associated with such special use cases as acquisition, realty, or provider uses. Reference data may be stored in two separate databases (e.g., enterprise reference data and line-of-business reference data), each of which contains data definitions with known data synonyms for data existing in different "data domains": the overarching enterprise data domain (enterprise reference data) and a sub-domain (line-of-business reference data). Alternatively, other data in the landing zone may proceed through a staging layer 408 that facilitates mapping of data between the legacy and target systems, establishes transformation rules in preparation for upcoming transformation of data to be compliant with the target system, and performs completeness check to ensure all data properly migrates from the legacy system to the target system and is transformed cleanly. The data at the staging layer 408 serves as a second checkpoint for data monitoring as the status of the data at the staging layer 408 (i.e., how much data is migrated to the staging layer relative to data initially packaged for migration) is also presented on the migration reconciliation dashboard for user monitoring. The data at the staging layer 408 is then transformed at a transformation layer 410 via WTX transformation 418 or ETL transformation 420 in order to be compatible and readily integrated into the target system. A feedback loop comprising data quality and profiling 430 is implemented to identify any gaps in data that arise at the transformation layer. From that data quality and profiling 430, data quality reports 428 and derivation logic 426 are generated. If any data gaps are identified via that feedback loop, the missing data is reextracted from the legacy system, repackaged into the legacy system landing zone, and moved to the target system landing zone for migration through the factory. The purpose of the feedback loop may comprise coordinating with the legacy system to correct identified errors such that they do not arise a second time. The feedback loop may kick in during migration of several types of data, including, but not limited to, highly confidential customer data restricted to a data clean room. The transformation layer 410 serves as a third checkpoint for data monitoring as the status of data migration at the transformation layer (i.e., how much data is migrated to the transformation layer relative to data at the staging layer and data initially packaged for migration) is presented on the migration reconciliation dashboard 416 for user monitoring. Once the data check is complete and data has been properly transformed to be compliant with the target system, data files will be loaded into target system applications 412 and validated to confirm all data is present, complete, and accurate. Data will then be loaded onto a target system enterprise data warehouse 414 and published on the migration reconciliation dashboard 416 as a final data status check (where, for example, data loaded onto the enterprise data warehouse will be compared with data initially extracted and packaged to confirm all data has properly migrated).

Figure 5:
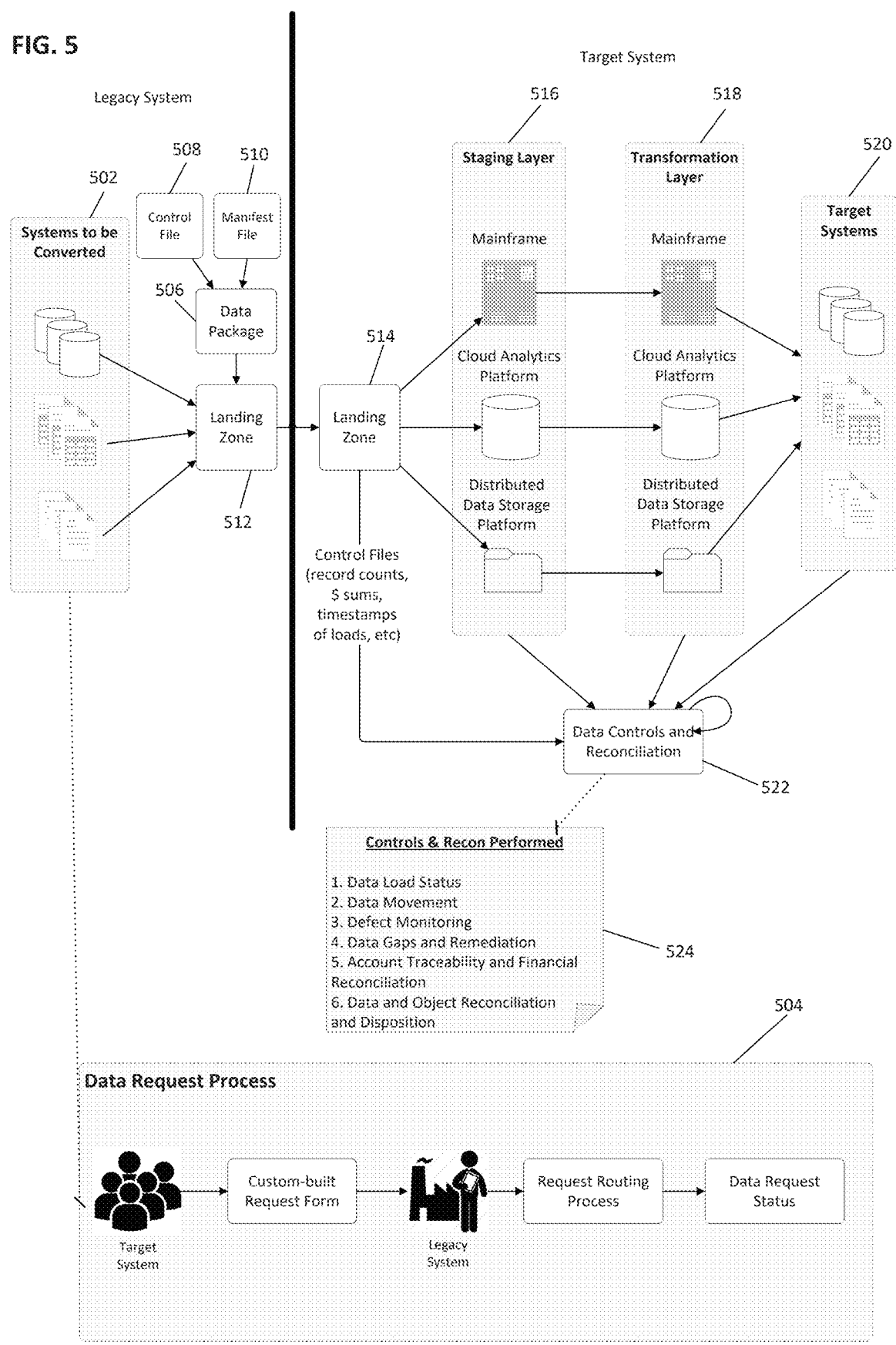
FIG. 5 is an exemplary illustration of the architecture of the disclosed data migration factory.

FIG. 5 depicts an exemplary illustration of the architecture of the disclosed data migration factory. As can be seen in 502 and 504, the target system submits a custom-built request form for data to the legacy system. The data request process may comprise a routing and processing request step whereby the data request form is sent to the appropriate packaging team for data packaging and processing team for data pipeline processing. The requested data is then extracted and packaged for migration. The status of the data request is presented on the migration reconciliation dashboard. Once requested data is extracted and packaged into a Data Package 506. A package of structured data may be tracked by a Control File 508, and a package of unstructured data may be tracked by a Manifest File 510. The Data Package 506 is first moved to a landing zone specific to the legacy system 512. The data in the legacy system-specific landing zone is then copied and moved to a landing zone specific to the target system 514. The link between the legacy system landing zone 512 and the target system landing zone 514 may initially be a secure network connection over VPN and, later, a direct network integration by the target system. Control files are generated, which provide information on the data being migrated, such as data record counts, money sums, and timestamps of data loads. The data is then moved to staging 516 and transformation 518 layers, which, by way of example, could comprise mainframe, cloud analytics, or distributed data storage platforms. A mainframe data platform may comprise a central data repository or processing center (as opposed to a distributed form of computing). The cloud analytics platform may comprise a centralized cloud data analytics platform. The distributed data storage platform may comprise an open-source software platform that manages data processing and storage for big data applications. Once successfully transformed, data would then move to the target system 520. During migration, data is continuously monitored and subjected to strict control to ensure it is properly being moved from the legacy system to the target system. Data control and reconciliation 522 includes (1) monitoring the status of data loads, (2) monitoring data movement through the migration factory, (3) monitoring any defects that arise during data migration, (4) monitoring any gaps that arise during migration and remedying those gaps, (5) account traceability and financial reconciliation, and (6) data and object reconciliation and disposition 524. The disclosed migration dashboard facilitates control of data as it migrates through the factory to the target system. By way of example, dashboard 432 depicts load status across different stages in color-coded fashion as data migrates through the factory. For example, actual data output at the staging layer may be compared with expected data output; output at the transformation layer may be compared with output at the staging layer; and output at the enterprise data warehouse may be compared with output at the staging layer. Following comparison, if no variance is observed, a status may be green, while a red status may indicate data variance between stages. A summary providing overall status of different data migration factory layers, including any observed variance, may be reported on the dashboard, as shown in example dashboard 432. This summary may be detailed by target system mnemonic, legacy system code, or other identifier.

Figure 6:
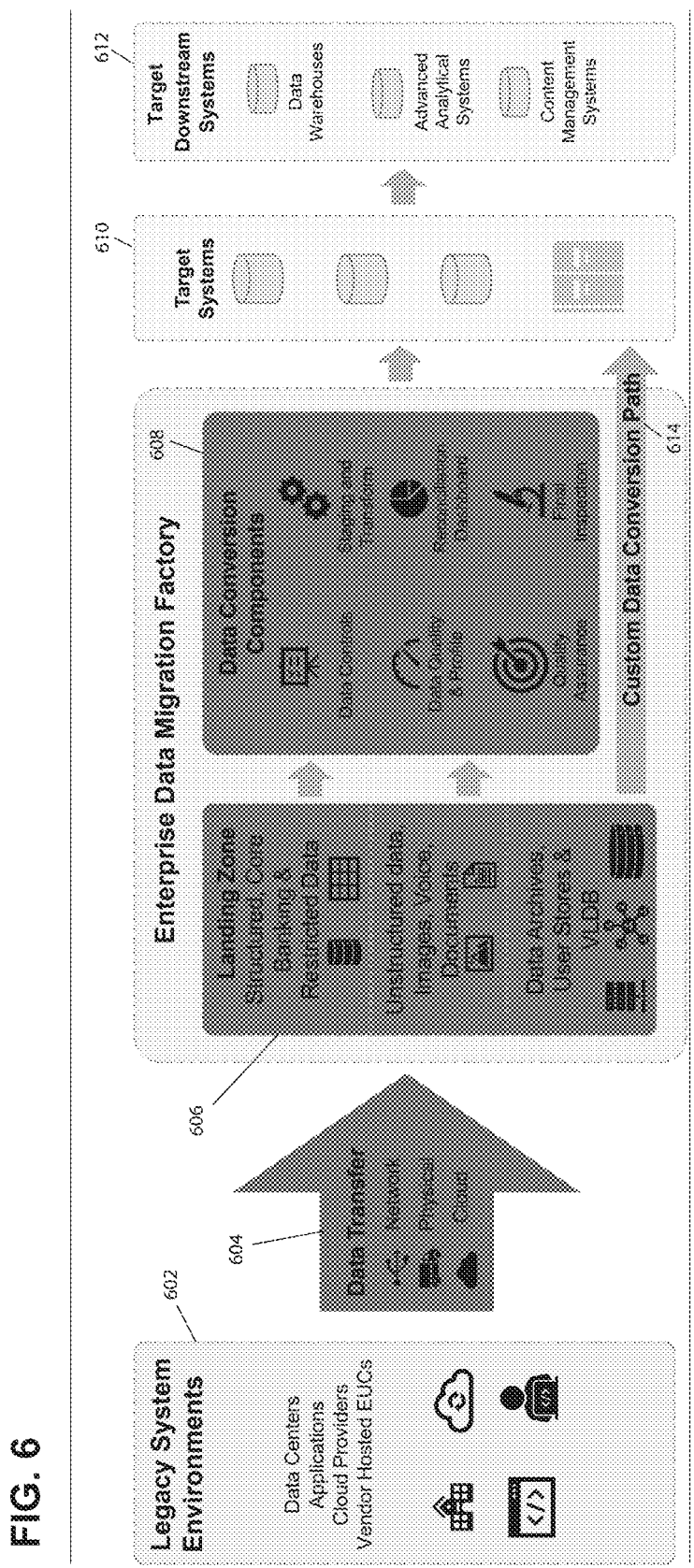
FIG. 6 is an exemplary illustration of the architecture of the disclosed data migration factory.

FIG. 6 depicts an exemplary illustration of the architecture of the disclosed data migration factory. Data may be requested by a target system from several legacy system environments, including, but not limited to, legacy system data centers, legacy system applications, legacy system cloud providers, or vendor-hosted end-user computing 602. Within the context of the central enterprise data migration factory, data may be transferred from the legacy system to a landing zone over the wire, through cloud, or through physical lift and shift 604. As shown in 606, the landing zone may receive several types of data, including, but not limited to, structured data, such as core banking data or restricted data. Alternatively, as shown in 606, the landing zone may receive unstructured data, such as image data, voice data, or document data. In addition, as shown in 606, the landing zone may receive data archives, user stores, or very large databases. Once received by the landing zone, as shown in 608, several data conversion components may function to properly and completely convert the data to be compliant with the target system, including stage and transform layers, data controls, data quality and profile, and quality assurance. The status of data conversion may be monitored at several checkpoints along the migration path by a reconciliation dashboard 608. A final inspection may be performed as a validation step prior to load into a target system to ensure all requested data is converted completely and accurately 608. As shown in 610, the transformed data may then be integrated into target systems and, subsequently, as shown in 612, to downstream consuming target system applications, such as data warehouses, advanced analytical systems, and content management systems. In other embodiments, certain types of migrating data may bypass the enterprise data migration factory and, alternatively, as shown in 614, proceed via a customized data conversion path before subsequent integration into the target system. Whether data migrates through the centralized migration factory or via a separate customized path may depend on the data size or type, as well as the user or migration vendor involved.

In some embodiments, a system for migrating data from a legacy system to one or more target systems comprises: at least one processor for: executing a first application that may serve as a first landing zone for receiving packaged data from the legacy system and may move the received data to a second application operating as a second landing zone. The first landing zone may be specific to the legacy system and the second landing zone may be specific to the one or more target systems. The first and second landing zones may facilitate migration of the data from the legacy system to the one or more target systems.

In some embodiments, the first and second landing zones may be file servers connected by a virtual private network and a firewall.

In some embodiments, the first and second landing zones may organize data by a mnemonic identifier system that facilitates identification of the data migrating from the first landing zone to the second landing zone. In some embodiments, a landing zone may accommodate various categories of legacy system data. The disclosed data migration factory may subsequently ingest, transform, and load certain types of data to target systems, such as, for example, structured data. The structured data may comprise core banking data and may be current or historical. Other types of data may not be subjected to the disclosed data migration factory but, rather, to alternative migration paths. Such other types of data may comprise unstructured, document, image, or archive data.

In some embodiments, the first and second landing zones may employ a file watcher process that facilitates scalability of data migration; ensures proper delivery of data as it is received by the first landing zone, migrates between the first and second landing zones, and migrates from the second landing zone to downstream components; and ensures data quality and completeness during data migration.

In some embodiments, the first and second landing zones may migrate structured or unstructured data. In some embodiments, the structured data may comprise core banking and restricted data. In some embodiments, the core banking and restricted data may comprise current snapshot and history data. In some embodiments, the unstructured data may comprise image, audio, archive, and document data.

In some embodiments, a request for data may be preceded by data cataloguing. Data cataloguing may be performed via any applicable software including, for example, Alation. Data cataloguing may comprise querying databases of a legacy system via applicable software and pulling data of interest, i.e., metadata, from those databases for subsequent use. Once queried, any data of interest may be written to the applicable cataloguing software. Data cataloguing may facilitate handling of large volumes of files in short order. Certain applicable software such as, for example, Alation may be user-friendly. Any database may be queried for data migration. Database software for legacy system data, target system data, or both may comprise Oracle Exadata. Oracle Exadata may also comprise backup and restore functionality to ensure data from databases is not lost. In some embodiments, when migrating structured data, data structure may be determined from schema of a legacy system and input into a data catalog. By way of example, Alation may enable ingestion of legacy system schema, thus allowing a user to understand the structure of a particular dataset. In some embodiments, a data catalog may comprise a user interface for a user who seeks to perform data analysis, discovery, and/or profiling of a dataset. A data catalog may present inventory of data elements for a particular dataset. For structured data, such inventory may comprise tables. In some embodiments, the data catalog may comprise an empty shell fillable with data that a user may want to see and understand.

A data catalog may provide an interface to users that analyze structured data. The catalog may display an inventory of structured data elements in a particular object, such as a table. A description of the data catalog may be generated. Schema may be extracted and ingested into a program, such as Alation. The data catalog may serve as a mechanism for generalizing data and enabling scalability but typically may not track data content. The Alation program may work on a particular datatype, reflect schema, and define attributes and any other metadata from the legacy system. Cataloging may allow for a data evaluation that builds a job to move content.

Manifest files may track the structure, type, and content of a particular set of unstructured data and reflect schema of a particular data source and required attributes to tie to a target system, in essence, educating the migration factory on unstructured data that is to be migrated and enabling subsequent verification and validation. Manifest files may comprise more functionality than a data catalog. Manifest files and data catalogs are parallel components that may function similarly in that they allow a quick understanding or picture of legacy system datasets. By way of example, a particular data package may include payload, a control file, and a manifest file that describes the schema of a data source and required attributes (in the form of metadata) that allow for tying payload to target systems. In some embodiments, a manifest file may provide a detailed description of data. A manifest file may describe schema of information in unstructured data such that it may be queried by the migration factory later. In some embodiments, the schema of information may be defined by a database. This is opposed to structured data which comes from a relational database and has natural schema that may function as output or input for Structured Query Language.

In some embodiments, a system for migrating data from a legacy system to one or more target systems comprises: at least one processor for: executing an application having a data packaging feature that packages and moves data requested by the one or more target systems from the legacy system to a first landing zone specific to the legacy system.

In some embodiments, the data packaging feature may facilitate migration of the data from the legacy system to the one or more target systems.

In some embodiments, the data may comprise structured data, or, alternatively, unstructured data.

In some embodiments, the requested data may be subjected to certain entry conditions that must be satisfied in order for the data to be packaged for data migration. In some embodiments, the entry conditions may relate to extraction of the data, packaging of the data, or controls associated with the data. In some embodiments, the entry conditions may relate to data source or sizing criteria. In some embodiments, the data source criteria may comprise NAS, a cloud storage, or a server-attached storage patch exclusive to servers of the legacy system. In some embodiments, the packaging of audio or video recordings may comprise an import or export function provided by a vendor.

In some embodiments, a system for migrating data from a legacy system to one or more target systems comprises: at least one processor for: executing an application having a migration reconciliation dashboard that publishes the status of the data as it is migrated from the legacy system to the one or more target systems. In some embodiments, the migration reconciliation dashboard may facilitate migration of the data from the legacy system to the one or more target systems.

In some embodiments, the migration reconciliation dashboard may publish information related to the status of data requests for migration allowing for identification of any issues in such requests.

In some embodiments, the migration reconciliation dashboard may publish information related to the status of data file loads for migration allowing for identification of any issues in such loads.

In some embodiments, the migration reconciliation dashboard may publish information related to defects in data that develop during data migration.

In some embodiments, the migration reconciliation dashboard may publish information related to data movement controls as data proceeds through migration. In some embodiments, the data movement controls may comprise job status, row counts, or sum amounts.

In some embodiments, the migration reconciliation dashboard may facilitate account traceability and balance reconciliation by defining and identifying key financial attributes as they proceed through migration.

In some embodiments, the migration reconciliation dashboard may publish information related to data quality and profiling as data proceeds through migration.

In some embodiments, the migration reconciliation dashboard may facilitate identification of data gaps and subsequent remediation.

Figure 7:
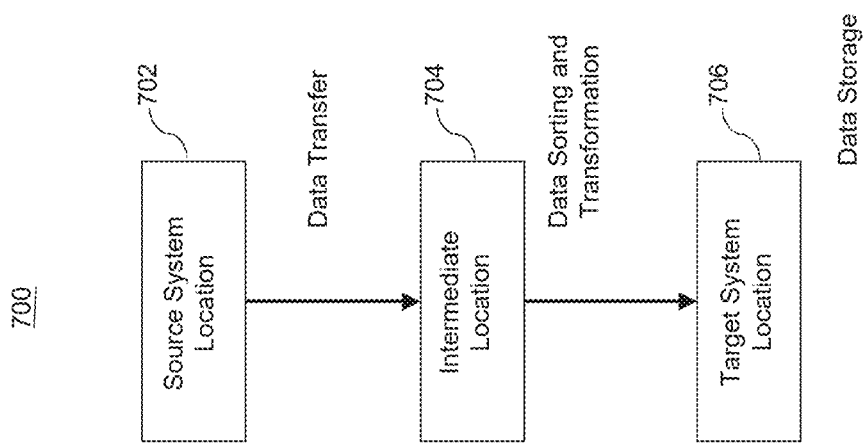
FIG. 7 is an exemplary schematic diagram of a data migration factory, consistent with some disclosed embodiments.

As shown in FIG. 7, a data migration factory 700 may comprise an initial location in a source or external system 702 where data is located. The data may then be transferred to an intermediate location 704 for data sorting and transformation, such that the data will comport with the data format of the target system where the data will integrate. Following data sorting and transformation, data may then be loaded and stored onto a location in a target system 706, completing the data migration and integration process. In some embodiments, data migration may comprise multiple intermediate locations for data processing prior to integration into a target system.

By way of example, in a standard workflow, before migration, the DMF system may first establish source-to-target mapping based on business needs and generate target system-specific files. Source-to-target mapping may comprise a set of data transformation instructions that determine how to convert data in a source system to render it applicable and functional in a target system. Data from the source system may be geared or configured to comply with the target system. The data transformation may be based on business needs of the target system. Business needs may entail opportunities that are of strategic importance to the target system, such as, for example, increasing revenue, improving customer satisfaction, and/or reducing costs. The target system may establish data transformation rules for its programs to facilitate conversion of data from a source system and integration into the target system. Such rules may include data cleansing, data formatting, and data validation, as discussed below. For example, data transformation may entail first cleansing data intended to be transformed by resolving any inconsistencies. Such inconsistencies may comprise data that is corrupted, incorrect, duplicate, or incomplete. Data cleansing may comprise correcting errors or inconsistencies within data or restructuring data to make it easier to use, view, and/or analyse. Alternatively, the DMF system may employ software to identify any gaps—or missing information—in the data. After cleansing, a data profiling tool may be employed by the target system to further eliminate any remaining errors in data and to examine and summarize the data to understand its content, its format, and how it's organized. Such a step may facilitate an understanding of what needs to be done to convert data from a source system into data that is compatible with a target system. A code with program instructions may then be created by a data transformation tool or platform to run a transformation job. Data may then be converted into a format that complies with the target system and may be reviewed to confirm the formatting is compliant with the target system. Data from the target product specific files may be loaded in programs in the target system and may be validated. Validating data may comprise confirming it has no inconsistencies or gaps and complies with the parameters of a target system. Finally, the validated data may be loaded from the programs into a data warehouse in the target system for future analysis. A data warehouse may comprise a database or memory system used for the analysis and reporting of structured data from multiple sources. Examples of the multiple sources include an organization's point-of-sale systems, its mailing lists, its website, its marketing automation, and its customer relationship management.

During the process, the data may be assigned various attributes, which may be determined based on metadata associated with the original data. Assigning an attribute to data may entail, for example, labelling or defining the data by a certain characteristic or trait. Such attributes may include, for example, data accuracy, completeness, reliability, relevance, and timeliness. Attributes may be stored in a particular location in the target system and assigned to data based on internal software- or memory-based review either at certain locations within the target system or, alternatively, review by external personnel. For example, during the data cleansing or data validation steps of transformation, data may be reviewed for accuracy or completeness. Following review, if determined to be accurate or complete, data may be assigned the attribute "accurate" or "complete". Metadata may comprise, for example, a set of data that describes and provides information about other data. By way of example, metadata may comprise data that describes and provides information about external data. Examples of metadata may include the author of a particular dataset, the date a dataset was created, the date a dataset is modified, if applicable, or the size of a particular dataset. Alternatively, when visualizing a spreadsheet composed of data, metadata may comprise the row and column headers in a particular table in the spreadsheet and/or the number of rows and columns in the table. During data review, data may be assessed against metadata when assigning attributes. For example, metadata related to a particular dataset may be employed to determine whether the dataset is accurate or complete. Alternatively, another piece of metadata—the final date of the dataset—may determine whether the data satisfies the timeliness attribute. Or metadata on the author of a particular dataset may be employed to assess the dataset's reliability.

The DMF system may track or monitor these attributes as the data moves through the various location(s) of the target system. In particular, the system may track or monitor whether any assigned attributes change as data progresses through the target system.

For some custom data, a custom workflow, which differs in certain aspects from the standard workflow described above, may be used. Custom data may comprise data that is unique and not readily collected for transformation. Such data may comprise vendor data, provider data, Enterprise Taxation and Policy Management (ETPM) data, Government Risk, and Compliance (GRC) data, money spent, user identification, installation dates, number of purchases and typically refers to user-created licenses, components, and component versions. Vendor data may comprise, for example, relevant information about goods and services. Such data may include, for example, procurement history, contract records, inventory data, and supply categories, among other things. Provider data may comprise, for example, information that is (a) generated by a provider in the course of services rendered including, without limitation, service and usage data and/or (b) collected by a provider, whether as a result of services rendered or otherwise. ETPM data may comprise, for example, data associated with a business or company related to its management of taxes and policies. GRC data may comprise, for example, a structured mechanism for aligning information technology departments with a business's goals while managing risks and meeting industry and government regulations.

The custom workflow may skip certain steps in the standard workflow, or may modify the transformation process based on business needs.

The data to be migrated from a source system to a target system may be of different data types. For example, the data to be migrated may include structured data. Structured data may refer to data that is stored in a standardized format, has a well-defined structure, complies to a data model, follows a persistent order, and is easily accessed by humans and programs. Data models may help to define and structure data in the context of relevant business processes, facilitating the development of effective information systems. This data type may generally be stored in a database record. An example of structured data may comprise a record associated with a customer bank; the data may include name, date of birth, social security number, account number, address, telephone number. Examples of structured data may include names, dates, addresses, credit card numbers, stock information, and geolocation. It is also contemplated that the data to be migrated may include unstructured data. Unstructured data may refer to data that has an internal structure but is not predefined through data models. It may be human generated, or machine generated in a textual or a non-textual format. Unstructured data may include data that does not reside in a relational database management system. Examples of unstructured data may include records, productivity applications, media and entertainment data, surveillance data, geo-spatial data, audio, weather data, data associated with Internet of Things, machine learning data, and artificial data. Structured and unstructured data may also comprise historical data, or data collected about past events and circumstances pertaining to a particular subject. Depending on whether the data is structured or unstructured, it may be migrated through different paths, i.e., via different temporary locations.

The present disclosure also concerns an Imaging as a Service method, which includes document classification techniques to convert an image of text from single or multiple-page images into a machine-readable text format. The Imaging as a Service method may convert any image format into a text format. For example, the Imaging as a Service may convert a tiff, jpeg, png, bitmap, gif, psd, pdf, or any other image format into a text format.

The present disclosure also concerns controlling and checking the data at various locations in the data migration path. Controlling and checking data comprises reviewing the data as it migrates from an external location to an internal, target location. As discussed above, these locations may be temporary or permanent or both temporary in some instances and permanent in other instances. For example, the system may check whether data is completely loaded when it is first loaded into a system. Alternatively, for example, the system may check whether all customer records have a social security number, a date of birth, an address, and a phone number. The system may check data quality depending on the nature of the data after the data is converted into the target system. By way of example, in a banking system, Loan Maturity Date should not be blank and should be after Book Date and after First Payment Due date or not past 30 years. Further, the system may check data compliance after the data is fed in the programs in the target system. Data compliance may comprise, for example, ensuring data is properly protected, secured, and/or stored when fed into a target system. In particular, compliant data may be fully protected from unauthorized access and use, malware, and other cybersecurity threats to the target system. Data compliance may relate to several features of the target system, including, for example, system programs, specific data formats, and templates. Data consumed by different programs in the target system may follow different data processing paths. Reference data—or data used to classify or categorize other data—may be used to assist with the checking of data. For example, the source and target systems may both create a customer information file ("CIF") by consolidating customer account information and combining it with basic demographic information to create a current snapshot of a customer relationship. The DMF system may maintain and compare CIFs from both the source system and the target system for data validation. Reference data may comprise a standardized database model generalized into a common structure to enable and facilitate consistent lookup by a data transformation algorithm. By way of example, if a lookup parameter is "Gender", lookup values may comprise (Male, M, 1), or (Female, F, 2), or (Unknown, U, 3). Reference data may convert an input of "M" to "Male".

Data check results may be published to a data migration dashboard as the data moves from a source system to a target system and is integrated into the target system to provide transparency and visibility about data treatment. By way of example, the dashboard may be a Tableau Dashboard. Other relevant information or identified issues, such as account balance variances during the migration, data quality, data gaps (or missing information) and available remediation to cure any issues in account balance, data quality, or data gaps may also be published to the dashboard. By way of example, if certain key data input required by regulatory policy is missing, a data gap may be reported in the dashboard.

Before data migration, early access to customer information may be needed to mitigate risks that could impact a successful migration. For example, access to Name, Address and Tax IDs in the banking industry may be required to analyse and triage fields that are critical for communicating with customers as well as to minimize adverse impacts to customers during data migration. Customer data may be stored in preparation for data migration specifically or for any other purpose involving data, such as processing and analysis. Data may be stored in any feasible data storage location, including, but not limited to, a clean room. A data clean room may comprise a memory location that provides aggregated and anonymized user information to protect user privacy while also providing advertisers with non-personally identifiable information. In this respect, the data room may be "clean" because it provides potentially valuable aggregated customer information to advertisers while simultaneously maintaining customer privacy. A clean room may serve as an early location in data migration, storing data intended to be migrated. Alternatively, as discussed above, a clean room may also store data in preparation for other purposes, such as processing and analysis. Data storage in such locations may be temporary or permanent. In other embodiments, legacy and target systems may be highly regulated. A data clean room may function as a cordoned off area on servers to restrict access to customer data to specific individuals. The clean room may serve as a particular channel from a legacy system to a target system that handles large and very sensitive customer datasets. The clean room channel may be much more secure than other migration channels. The clean room may comprise highly sensitive regulatory data about a particular system, which has a strict retention policy.

The present disclosure also concerns migrating unstructured data using an ETL ("extract, transform, and load") process. In an ETL process, after the system detects a request for unstructured data, the system may extract the data and combine it with data from multiple data sources into a single data collection in preparation for migration.

Some embodiments of a data migration factory involve a system for transferring and integrating data from one or more external locations into an internal location. Transferring data may entail, for example, moving it from a database of one original location to that of a target location. A database may comprise, for example, an organized collection of structured information, or data, typically stored electronically in a computer system. Alternatively, a database may comprise unstructured data, which requires structure and/or organization prior to migration and integration into a target system.

In some embodiments, the at least one processor is configured to transfer external data from the one or more external locations to a first temporary location; sort the external data in the first temporary location into one or more defined categories; write a first defined category of the sorted external data to a second temporary location; in the second temporary location, convert the first defined category of external data into internal data using at least one data conversion rule, wherein the data conversion rule is associated with enabling compatibility between the internal data and at least one internal application; and deposit the internal data to the internal location. The at least one processor may refer to one or more processors as discussed elsewhere in this disclosure. The instructions executed by at least one processor may, for example, be pre-loaded into a memory integrated with or embedded into the controller or may be stored in a separate memory. The memory may refer to one or more memories as discussed elsewhere in this disclosure. As discussed above, a location may be temporary where data is sorted, transformed, or stored for a finite amount of time. In some embodiments, a location may be physical or geographic. In other embodiments, a location may be memory- or software-based. Alternatively, a location may be part of a database or computing device. The data location may be temporary so that data, for example, may be reformatted, reorganized, or checked for errors. A permanent location, on the other hand, may be one where data is sorted, transformed, or stored for a continuing or perpetual amount of time.

Sorting data into one or more defined categories may, for example, entail organizing it into one or more pre-set or established groups or classifications. Such categories may comprise, for example, sorting data alphabetically, sorting data chronologically, sorting data by size, or sorting data by source. Such categories may be defined by an outside user or, alternatively, by internal software within the processor. In some embodiments, the processor may write a first category of the sorted external data to a temporary location. Writing data may entail, for example, employing computer code to transfer or move the data from an initial location to a target location, or, alternatively, append it to a file on a local device or server. The processor may be configured to write the first category of sorted external data because that first category would be better organized than uncategorized data that is not organized in any way. By way of example, if external data is organized alphabetically or chronologically, it may be easier to work with than unorganized data.

The processor may then convert the first defined category of external data into internal data using a data conversion rule. By way of example, the processor may convert external data categorized alphabetically or chronologically into internal data by transforming it into data that is compatible with an internal or target system. Alternatively, the processor converting the first defined category of external data may entail translating the data from one format into another so that it is ultimately compatible with the format of its target destination. A data conversion rule may comprise, for example, a specific equation or mechanism by which data is converted so that it complies with data or features of a target location. Such conversion rules are typically associated with enabling compatibility between data at a target location—or internal data—and applications, or programs, of the target location. By way of example, external data may be categorized chronologically and transferred to a temporary location, where the external data would be converted to internal data based on a data conversion rule that enables compatibility between internal data and an internal/target application or program. The data conversion rule may, for example, facilitate reformatting external data to comply with the required data format of the internal application. Alternatively, the data conversion rule may facilitate adjusting the size of a particular dataset so that it satisfies size limitations or restrictions of an internal application. Once properly converted to comply with an internal, target location, internal data may then be deposited or stored in that target/internal location for future processing or analysis. Alternatively, depositing data may comprise, for example, writing the data to a memory or storage device at the internal location. In some embodiments, any external data that either remains uncategorized or has been categorized but not transferred for conversion may be stored at a temporary location for future processing and/or analysis. In general, organizing data by categorizing it into pre-defined categories may facilitate the data conversion process by minimizing both the time and effort needed for its conversion as well as any intervening roadblocks or obstacles.

Figure 8:
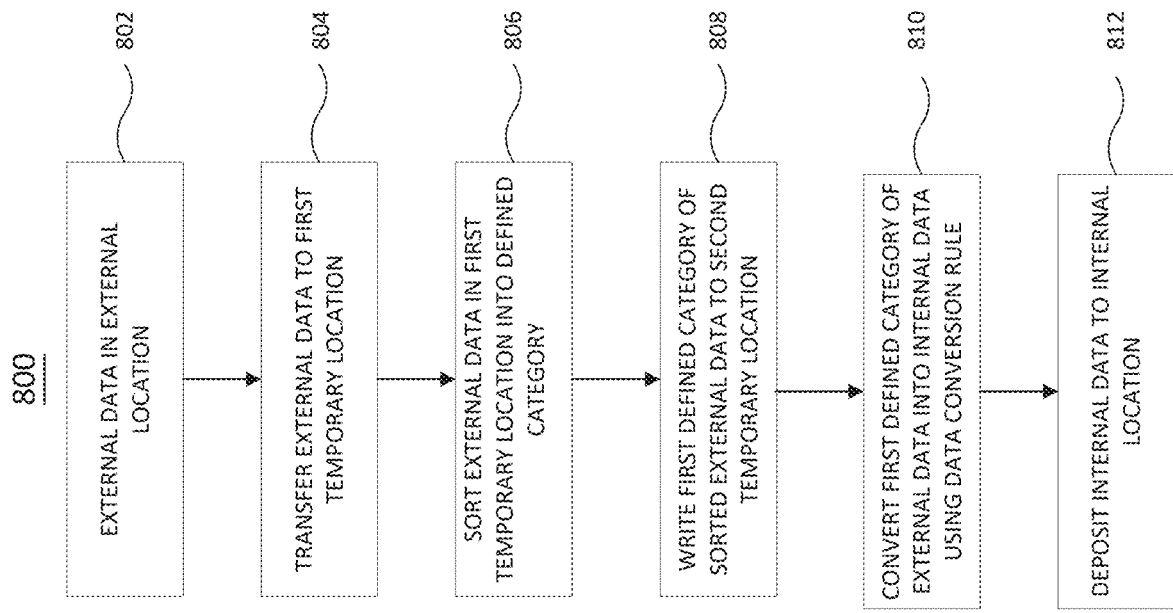
FIG. 8 is a flowchart of an exemplary system for transferring and integrating data from one or more external locations into an internal location.

FIG. 8 illustrates a flowchart of example system 800 for transferring and integrating data from one or more external locations into an internal location. In some embodiments, system 800 may be performed by at least one processor (e.g., 210, 332) to perform operations or functions described herein. In some embodiments, some aspects of system 800 may be implemented as software (e.g., program codes or instructions) that are stored in a memory (e.g., 220) of computing device 200 or a non-transitory computer readable medium. In some embodiments, some aspects of system 800 may be implemented as hardware (e.g., a specific-purpose circuit). In some embodiments, system 800 may be implemented as a combination of software and hardware.

Referring to FIG. 8, system 800 may include 802 external data in an external location and a processor configured to 804 transfer the external data from one or more external locations to a first temporary location. The processor may then 806 sort the external data in the first temporary location into one or more defined categories and subsequently may 808 write a first defined category of the sorted external data to a second temporary location. In the second temporary location, the processor may 810 convert the first defined category of external data into internal data using at least one data conversion rule, the data conversion rule being associated with enabling compatibility between the internal data and at least one internal application. The processor may then 812 deposit the internal data to an internal location. In some embodiments, after the data is sorted, the at least one processor is further configured to identify a second category of data as being compatible with at least one program of the target location and deposit the identified second category of data to the target location. In some embodiments, the second category of data may comprise the defined categories described above. By way of example, data categorized by source or size may be determined by the processor to be compatible with a program of a target location because, for example, the data satisfies the size requirements of the target program or, alternatively, the source of the categorized data is the same as the data in the target program. In determining that categorized data complies with a target program, the processor may compare the format of the categorized data with the format of datasets that are either currently stored or were previously stored at the target location. Following such a comparison, the processor may determine that the categorized data is fully compatible with the specific program and, accordingly, may deposit the categorized data to the program in the target location without any changes, modifications, or reformatting. In other embodiments, the processor may determine that the categorized data requires minor adjustments or reformatting to be compatible with the program of the target location and, accordingly, may send the categorized data to a separate location for such reformatting. In certain embodiments, the processor may determine that the categorized data would not be compatible with any program in the target location, in which case the categorized data may be stored in a temporary location for future processing.

In some embodiments, as described above, the at least one processor is further configured to assign at least one attribute to the external data, wherein each attribute is determined based on metadata associated with the external data.

In some embodiments, the at least one processor is further configured to associate each attribute, as described above, with one or more of the defined categories, as described above. By way of example, if a particular source of data (a defined category, as described above) is reliable, the at least one processor may associate the attribute of "reliability" to that particular source of data. Alternatively, the at least one processor may review chronologically sorted data (another defined category, as described above) and determine that it is timely and should be associated with the attribute of "timeliness".

In some embodiments, the at least one processor is further configured to track each assigned attribute at a first time, wherein the first time corresponds to a time when the external data is located at the one or more external locations; track each assigned attribute at a second time, wherein the second time corresponds to a time when the external data is located at the first temporary location; track each assigned attribute at a third time, wherein the third time corresponds to a time when the external data is located at the second temporary location; track each assigned attribute at a fourth time, wherein the fourth time corresponds to a time when the external data is converted to internal data and is located at the second temporary location; track each assigned attribute at a fifth time, wherein the fifth time corresponds to a time when the internal data is located at the internal location; and compare each attribute at the first time, the second time, the third time, the fourth time, and the fifth time. Alternatively, data attributes may be tracked at any time, including, but not limited to, a sixth time, a seventh time, an eighth time, a ninth time, a tenth time, or an nth time. Additionally, any number of system locations may be employed for data tracking. In particular, in alternative embodiments, the at least one processor may be configured to track any assigned data attribute at any time and compare attributes between any timepoints. In alternative embodiments, the data being tracked may be located at permanent locations. In further alternative embodiments, of the data being tracked, some data may be located at permanent locations while other data may continue to migrate or progress through temporary locations. Tracking data attributes may comprise, for example, monitoring attributes assigned to particular datasets as they proceed through the data conversion process and become integrated into a target system. By way of example, prior to its conversion, a particular dataset may be characterized by such attributes as "complete", "accurate", and "reliable". Tracking these attributes may entail monitoring the dataset as it proceeds through different locations in the data transformation process to make sure the dataset maintains the attributes "complete", "accurate", and "reliable". In certain instances, a particular data transformation step (e.g., reformatting of data to comply with the data format of a target system) may result in data being lost and, thus, no longer being characterized as "complete". Tracking of attributes may ensure that any changes in attribute characterization during the data transformation process are properly addressed such that, if a dataset is flagged as incomplete during reformatting, for example, that change is quickly remedied. Attribute tracking may occur at any point along the data transformation process including, for example, with respect to external data or internal data specifically, or, alternatively, during instances when external data is converted to internal data.

In some embodiments, the external data is transferred to the first temporary location by wire. Data transferred by wire may include, for example, data transferred over a network or cloud system. By way of example, a particular dataset may be located at an external location, where it is assigned one or more attributes (e.g., "complete", "accurate", "reliable", etc.). If all attributes are satisfied at the initial external location, the dataset may transfer by wire to a next location, such as a first temporary location, where its attributes will once again be assessed to ensure none have changed and they all remain satisfied. Alternatively, data may be transferred by any other feasible mechanism. Other forms of transfer may comprise, for example, serial transfer or parallel transfer. Serial transfer may comprise transferring data bits one after another over a single channel. Parallel transfer may comprise transferring data bits at the same time over multiple channels. Such channels may comprise wire, as discussed above. In some embodiments, data may be physically transferred between locations if attributes are satisfied. In such scenarios, a data transfer device may be loaded and transformed at an external location and, subsequently, shipped to a target location for integration, i.e., via upload of data from the transfer device to cloud storage in the target location.

In some embodiments, the disclosure provides a method comprising: transferring data to a first location; assigning the transferred data to a first data type or a second data type, the assignment depending on the data; responsive to assigning the transferred data to the first data type, enabling migration of the first data type to a second location via a first path; and responsive to assigning the transferred data to the second data type, enabling migration of the second data type to the second location via a second path. In some embodiments, data may be transferred to a first location in a system where it is assigned a first data type or a second data type. As discussed above, data types may comprise structured or unstructured data. The assignment of data type may depend on whether the data more mirrors structured or unstructured data. By way of example, if the transferred data is stored in a standardized format, has a well-defined structure, complies to a data model, follows a persistent order, and is easily accessed by humans and programs, it may be assigned structured data. On the other hand, if the transferred data has an internal structure, but is not predefined through data models, it may be assigned unstructured data. Assignment of a data type to the transferred data may enable migration of the assigned data to a second location via a particular path. Data migration via a path may entail, for example, transferring and integrating data from one location to another via a particular mechanism or route. The particular path by which the assigned data migrates may depend on its data type. By way of example, if the transferred data is assigned as structured data, it may be more defined and structured and, accordingly, may not require as much formatting or manipulation as unstructured data. Thus, structured data may migrate on a first path to the second location which comprises some formatting and/or manipulation prior to arriving at the second location. Unstructured data, being not as well defined or structured as structured data, may require substantially more formatting and/or manipulation than structured data and, accordingly, may migrate to the second location on a second path which comprises substantially more formatting and/or manipulation than the first path. In alternative embodiments, any number of data types, locations, or paths may be employed for the transfer of data.

Figure 9:
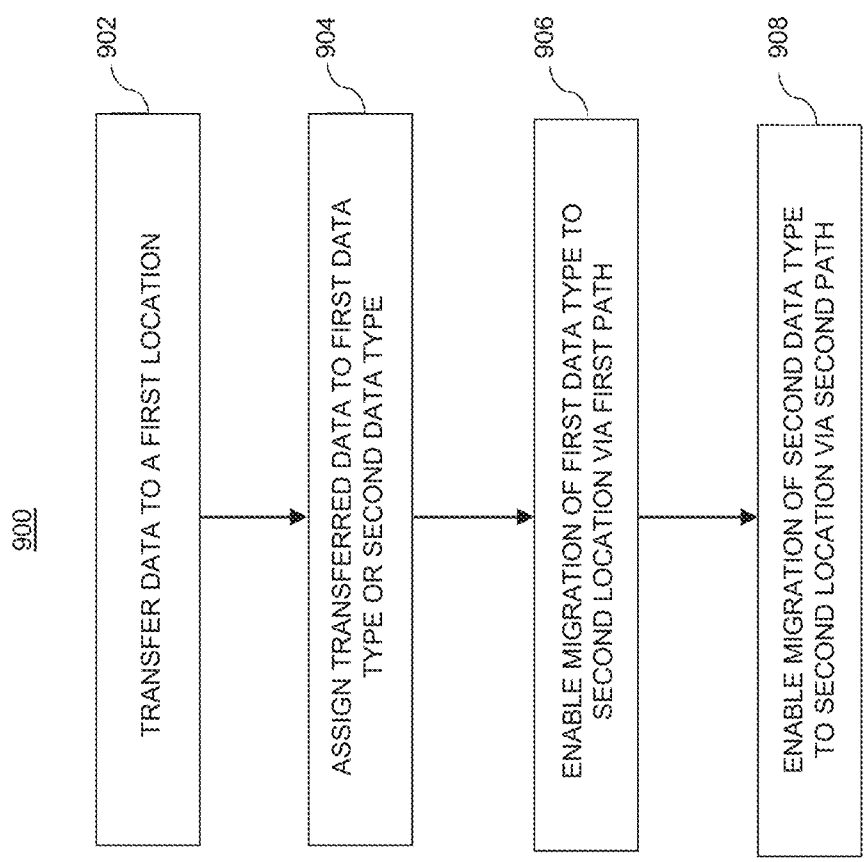
FIG. 9 is a flowchart of an exemplary method for transferring data and enabling migration of the data, consistent with some disclosed embodiments.

FIG. 9 illustrates a flowchart of example method 900 for transferring, assigning, and enabling migration of data, consistent with embodiments of the present disclosure. In some embodiments, method 900 may be performed by at least one processor (e.g., 210, 332) to perform operations or functions described herein. In some embodiments, some aspects of method 900 may be implemented as software (e.g., program codes or instructions) that are stored in a memory (e.g., 220) of computing device 200 or a non-transitory computer readable medium. In some embodiments, some aspects of method 900 may be implemented as hardware (e.g., a specific-purpose circuit). In some embodiments, method 900 may be implemented as a combination of software and hardware.

Referring to FIG. 9, method 900 may include a step 902 of transferring data to a first location. Method 900 may include a step 904 of assigning the transferred data to a first data type or a second data type. As discussed above, data types may comprise structured or unstructured data. The assignment may depend on the data. As discussed above, the assignment of data type may depend on whether the data more mirrors structured or unstructured data. Method 900 may include a step 906 of, responsive to assigning the transferred data to the first data type, enabling migration of the first data type to a second location via a first path. Method 900 may include a step 908 of, responsive to assigning the transferred data to the second data type, enabling migration of the second data type to the second location via a second path. As discussed above, the particular path by which the assigned data migrates may depend on its data type. By way of example, structured data may migrate on a first path to the second location while unstructured data may migrate on a second path to the second location.

In some embodiments, the first data type is structured data and the second data type is unstructured data.

In some embodiments, the first data type is at least one of core banking or restricted data. Core banking data may entail, for example, data largely or entirely related to banking. Restricted data, for example, may entail data that is limited or specific in nature. For instance, the data may be restricted in content and/or format. Examples of restricted data may include highly confidential business or personal information that require data protection, are intended for specific use, and should not be disclosed except to those with explicit authorization to review it. A system may be configured to recognize and treat a particular dataset as highly confidential by an outsider user. By way of example, such restricted data may comprise an individual's social security information, sensitive information related to a particular business's customers (e.g., their personal or financial information), or non-patented disclosures related to a business's novel technologies.

In some embodiments, the second data type is at least one of image data, voice data, media data, document data, or archive data. Image data may comprise data associated with images, depictions, or representations. Image data may comprise, for example, data regarding the color, light, or intensity of a number of points. Alternatively, image data may comprise pixels associated with an image. In some embodiments, image data may comprise the size of an image, the location of an image, the time an image was captured, or the type of file an image is associated with. Voice data may comprise data associated with an individual's voice. By way of example, voice data may comprise voiceprint or an audiofile with a user's voice. Media data may comprise data associated with the media or news outlets. Document data may comprise data associated with documents. By way of example, document data may comprise the name of a document, the content of a document, the location where a document is stored, the size of a document, or the date a document was created or generated. Archive data may comprise data associated with prior records or history. In alternative embodiments, the first or second data type may comprise any other type of data, not necessarily those listed above.

In some embodiments, the disclosure provides a system for converting data, comprising at least one memory; and at least one processor configured to maintain a platform that stages and modifies data; accept raw data to the platform, the raw data including a first bookkeeping; save the first bookkeeping of the raw data; load reference data; establish modification rules, wherein the modification rules depend on the reference data; modify the raw data into application data, the modification based on the modification rules, the application data including a second bookkeeping; and save the second bookkeeping of the application data to the at least one memory. The memory may refer to one or more memories as discussed elsewhere in this disclosure. A platform that stages and modifies data may comprise, for example, a part of a computer processor that is configured to receive, hold, and change data. Alternatively, a platform may comprise a system with software and/or graphical user interfaces that presents and changes data. By way of example, platform data may be modified to comply with the programs in its target destination during the data migration process. Raw data may comprise, for example, data that has not yet been processed for use. Examples of raw data may comprise financial transactions from a point of sale (POS) terminal, computer logs, or participant eye-tracking data in a research project. Raw data may be received by a platform for subsequent modification and may comprise a first bookkeeping. Bookkeeping may comprise, for example, a record about the status of data in question; such records may be saved or logged in, for example, a database. By way of example, bookkeeping may indicate whether data is raw or has been modified to comply with the programs in its target destination. In addition, bookkeeping may comprise identifying the respective status of data at a particular instance, the particular location of data along the data migration path, or to what extent data has been modified. Bookkeeping data may be saved or stored in any location configured for storage of raw data. After bookkeeping data is saved or stored, reference data may be loaded onto a system. Reference data may comprise, for example, data used to classify or categorize other data. Examples of reference data may comprise state or country codes, currencies, organizational unit types, or language codes. Modification rules that depend on reference data may then be established and may modify raw data into application data. Modification rules may comprise, for example, rules for changing or transforming data, such as raw data. Application data may comprise, for example, data that has been transformed from raw data that can be readily applied in the target system in which it has been converted. Alternatively, application data may comprise information that is specific to a user and applies to any data created and managed by an application. Examples of such data may include profile information, user data, preferences, and audit trail. Profile information may comprise information about a user's name, account number, or user identification. User data may comprise information generated or owned by a user, such as writing, communications, media, and business data. Preferences may comprise application preferences and configuration settings. Audit trail may comprise logs and history information that record what a user has done with an application. Application data may comprise a second bookkeeping, as described above, which may then be saved or stored at locations configured for storage of application data, such as, for example, memory. A first and second bookkeeping may be similar in certain respects, such as, for example, they may both serve as records of data. But, as discussed above, the two bookkeepings may also differ in that a first bookkeeping may relate to raw data and may be saved or stored at any location in a system configured for storage of raw data while a second bookkeeping may relate to application data and may be saved or stored at any location in a system configured for storage of application data, such as, for example, memory.

Figure 10:
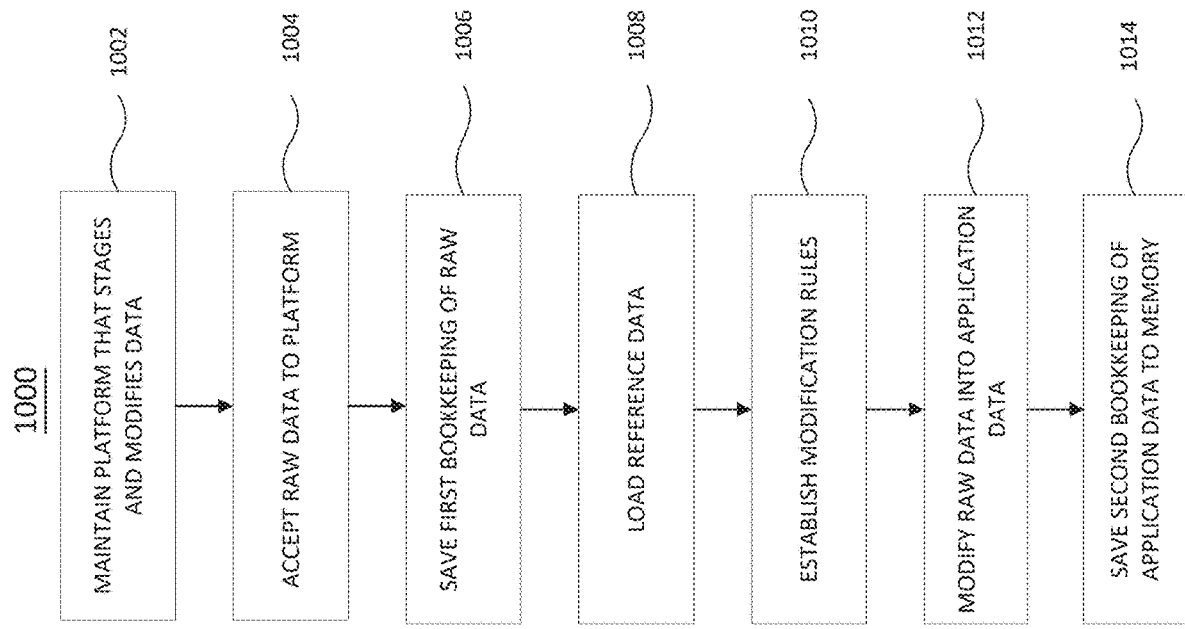
FIG. 10 is a flowchart of an exemplary system for converting data.

FIG. 10 illustrates a flowchart of example system 1000 for converting data. In some embodiments, system 1000 may be performed by at least one processor (e.g., 210, 332) to perform operations or functions described herein. In some embodiments, some aspects of system 1000 may be implemented as software (e.g., program codes or instructions) that are stored in a memory (e.g., 220) of computing device 200 or a non-transitory computer readable medium. In some embodiments, some aspects of system 1000 may be implemented as hardware (e.g., a specific-purpose circuit). In some embodiments, system 1000 may be implemented as a combination of software and hardware.

Referring to FIG. 10, system 1000 may include a processor configured to 1002 maintain a platform that stages and modifies data. The processor may then 1004 accept raw data to the platform, the raw data including a first bookkeeping. The processor may then 1006 save the first bookkeeping of the raw data, 1008 load reference data and 1010 establish modification rules, the modification rules depending on the reference data. The processor May 1012 modify the raw data into application data, the modification being based on modification rules and the application data including a second bookkeeping. The processor may then 1014 save the second bookkeeping of the application data to at least one memory.

In some embodiments, the at least one processor is configured to compare the first bookkeeping and the second bookkeeping. A processor configured to compare bookkeepings may, for example, comprise examining the similarities and differences between them.

In some embodiments, the disclosure provides a system for transferring and integrating custom data from one or more external locations to an internal location, comprises at least one processor configured to: define rules established by a user of the system for identifying custom data; access external data; transfer the external data to a temporary location; identify the external data as custom data, using the defined rules; load the custom data to a target application; and send the target application to an internal location; where the custom data is at least one of vendor data, provider data, and Government, Risk, and Compliance data. In some embodiments, a system may define rules for identifying custom data. By way of example, the system may have an internal set of conditions that help it specifically identify or pinpoint custom data. These rules or conditions, for example, may have been established by a user of the system. Custom data may be understood as discussed elsewhere in this disclosure. In some embodiments, the system may transfer external data—or data from an external or outside source—to a temporary location and, relying on its pre-set or defined rules or conditions, identify the external data as custom data. The custom data may then be loaded to or stored in a target application. A target application may comprise, for example, a particular application or program in a target location where data is to be loaded. In some embodiments, the target application may then be sent to an internal location within the target system where the loaded custom data may then be further processed. By way of example, at the internal location, the loaded custom data may be analysed in some capacity or, alternatively, modified to be compatible with the internal location.

Figure 11:
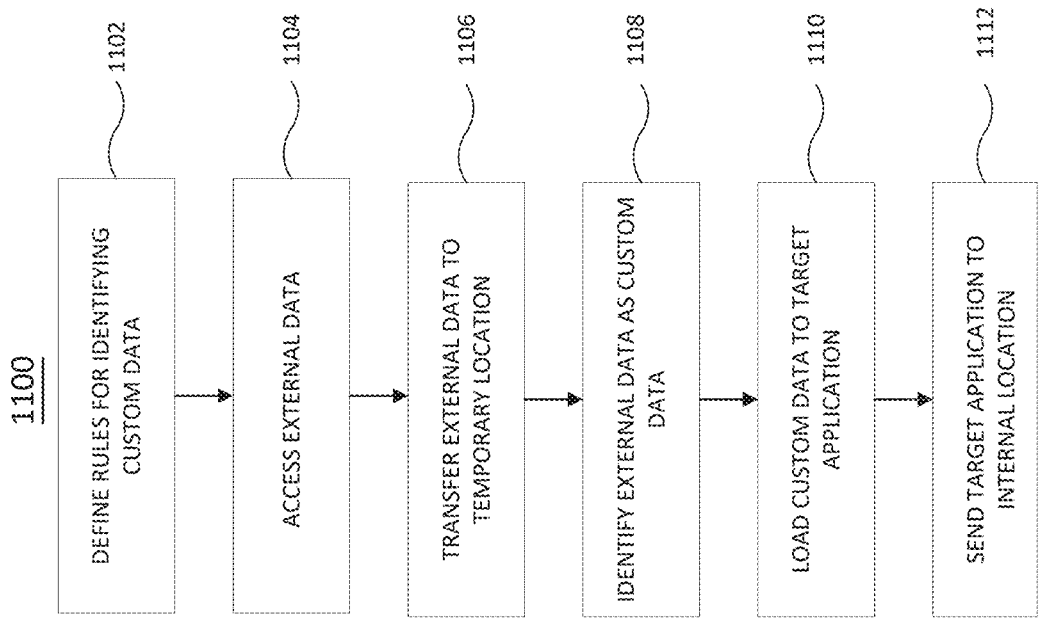
FIG. 11 is a flowchart of an exemplary system for transferring and integrating custom data from one or more external locations to an internal location.

FIG. 11 illustrates a flowchart of example system 1100 for transferring and integrating custom data from one or more external locations to an internal location. In some embodiments, system 1100 may be performed by at least one processor (e.g., 210, 332) to perform operations or functions described herein. In some embodiments, some aspects of system 1100 may be implemented as software (e.g., program codes or instructions) that are stored in a memory (e.g., 220) of computing device 200 or a non-transitory computer readable medium. In some embodiments, some aspects of system 1100 may be implemented as hardware (e.g., a specific-purpose circuit). In some embodiments, system 1100 may be implemented as a combination of software and hardware.

Referring to FIG. 11, system 1100 may include a processor configured to 1102 define rules established by a user of a system for identifying custom data. The processor may then 1104 access external data and 1106 transfer the external data to a temporary location. The processor May 1108 identify the external data as custom data, using the defined rules and, subsequently, 1110 load the custom data to a target application. The processor may then 1112 send the target application to an internal location. The custom data may be at least one of vendor data, provider data, and Government, Risk, and Compliance (GRC) data.

In some embodiments, the disclosure provides a computer-implemented method comprising: maintaining a platform that classifies documents; acquiring, by at least one processor, image data from an external location, the acquisition of the image data including transferring the image data to a temporary location within the platform; converting the image data to a readable form; performing a look up in a repository, the look up comparing the readable form with signature card data stored in the repository; classifying the image data based on the look up; and sending the image data to a final location associated with the classification. By way of example, documents may be classified as restricted, confidential, internal, or public. Maintaining a platform that classifies documents may comprise, for example, establishing a particular location in a target system whose function or purpose is to label or brand documents. The processor may acquire image data from an external location and transfer it to a temporary location within the platform for subsequent classification. Acquiring image data may comprise, for example, obtaining data related to an image, portrayal, or pictorial representation. Alternatively, the processor may acquire and transfer other types of data such as, for example, sound or video data. By way of example, data related to the quality or pixelation of an image may be acquired. The processor may convert image data to a readable form. Converting the image data to a readable form may comprise, for example, adjusting its sharpness, brightness, or contrast, or performing optical character recognition to allow for extraction of text, numbers, symbols, or icons. The processor may perform a look up in repository where it compares the readable form of the image data with signature card data in the repository. Performing a look up in repository may comprise, for example, searching a central location in a computer where data is stored and managed in order to compare the readable form of the image data with signature card data in the repository. Signature card data may comprise, for example, information associated with a credit or debit card that is identifiable by a holder of that card's signature. The processor may the classify the data based on the look up and comparison and send the image data to a final location associated with the classification. Documents may be classified, for example, as restricted, confidential, internal, or public depending on the sensitivity of their content. Depending on the classification (e.g., confidential vs. public), the image data may then be sent to a particular location in a system designed to accommodate the image data and its content. In alternative embodiments, the readable form of image data may be compared with other forms or types of data, such as a user's personal address or particular form of identification, such as a driver's license.

Figure 12:
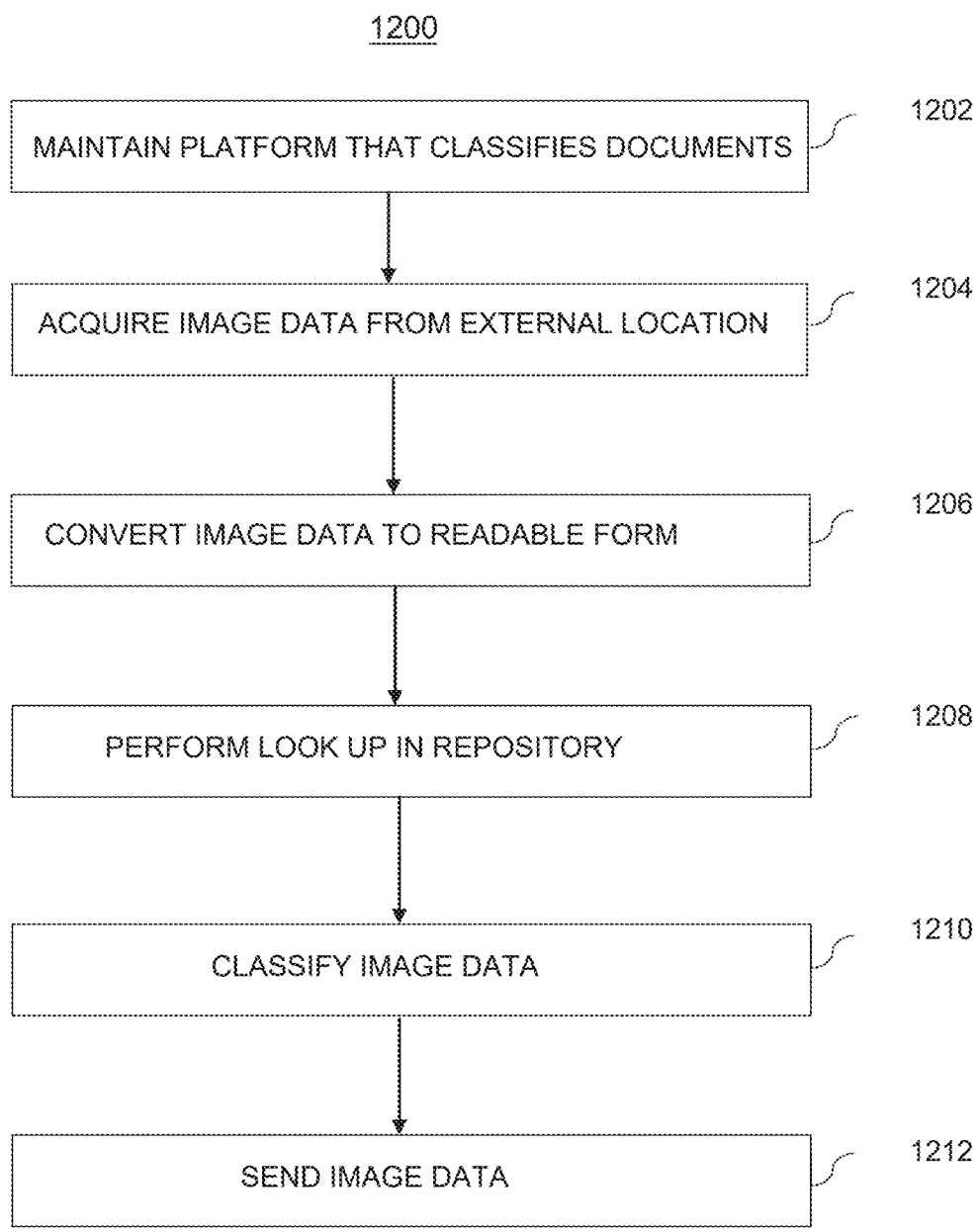
FIG. 12 is a flowchart of an exemplary computer-implemented method for acquiring, converting, and classifying image data, consistent with some disclosed embodiments.

FIG. 12 illustrates a flowchart of example computer-implemented method 1200 for acquiring, converting, and classifying image data, consistent with embodiments of the present disclosure. In some embodiments, computer-implemented method 1200 may be performed by at least one processor (e.g., 210, 332) to perform operations or functions described herein. In some embodiments, some aspects of computer-implemented method 1200 may be implemented as software (e.g., program codes or instructions) that are stored in a memory (e.g., 220) of computing device 200 or a non-transitory computer readable medium. In some embodiments, some aspects of computer-implemented method 1200 may be implemented as hardware (e.g., a specific-purpose circuit). In some embodiments, computer-implemented method 1200 may be implemented as a combination of software and hardware.

Referring to FIG. 12, computer-implemented method 1200 may include a step 1202 of maintaining a platform that classifies documents, as discussed above. Computer-implemented 1200 may include a step 1204 of acquiring, by at least one processor, image data from an external location, as discussed above. For example, data related to the quality or pixelation of an image may be acquired. Computer-implemented method 1200 may include a step 1206 of converting the image data to a readable form by, for example, adjusting its sharpness, brightness, or contrast, or performing optical character recognition to allow for extraction of text, numbers, symbols, or icons. Computer-implemented method 1200 may include a step 1208 of performing a look up in a repository, as discussed above. The look up may compare the readable form with signature card data stored in the repository. As discussed above, computer-implemented method 1200 may include a step 1210 of classifying the image data on the look up. Documents may be classified, for example, as restricted, confidential, internal, or public depending on the sensitivity of their content. Computer-implemented method 1200 may include a step 1212 of sending the image data to a final location associated with the classification. As discussed above, depending on the classification, the final location may be designed to accommodate the image data and its content.

In some embodiments, the image data is in a tiff format. A "tiff format"—or Tag Image File Format—may be a computer file used to store raster graphics and image information. Tiffs may allow for storage of high-quality images before editing to avoid lossy file formats. Alternatively, the image data may be in any other format, such as jpeg, png, bitmap, gif, psd, or pdf.

In some embodiments, the disclosure provides a system for transferring and integrating data from one or more external locations to a target location comprising at least one processor configured to initiate a connection between a source platform and a target platform, the source platform having a source location, and the target platform having a first location, a second location and a target location; transfer source data over the connection from the source location to the first location; load first parameters to the first location; at the first location, apply the first parameters to the source data, the first parameters granting the source data first privileges; transfer the source data over the connection from the first location to the second location, the transfer dependent on the first privileges; load second parameters to the second location; at the second location, apply the second parameters to the source data, the second parameters granting the source data second privileges; and transfer the source data over the connection from the second location to the target location, the transfer dependent on the second parameters; wherein the first parameters comprise the mean or average of the source data, the second parameters comprise the median of the source data, the first privileges comprise permission to reorganize the source data into a format that is more easily readable or analysable, and the second privileges comprise permission for the source data to be transformed to comply with the data format of the target location. A source platform may comprise, for example, a location in a computer system from which data originates or initially comes from. A target platform may comprise, for example, a location in a computer system where data ends up or is destined. A processor may be configured to initiate or establish a connection between the source platform and target platform. This connection may comprise, for example, an exchange of data/information, commands, or signals between the two platforms. In some embodiments, this connection may be initiated manually by an external user or, alternatively, automatically when ip addresses for both platforms are provided. In other embodiments, the connection may be initiated when the source platform sends signals to the target platform, or vice versa. Source data may comprise, for example, data from an original or initial location. Parameters may comprise, for example, criteria or specifications that are applied to source data, or, alternatively, parameters may comprise characteristics or descriptors of data. In general, parameters may comprise statistical information related to an entire dataset rather than to particular values or samples within the dataset. Examples of parameters may include the mean or average of a particular dataset, the range of the dataset, or its median. In some embodiments, a first set of parameters may be loaded onto a first location in the target system. Loading parameters may comprise, for example, analysing a dataset, determining its mean, and storing that information in a location in the target system. A second set of data parameters, such as the median of a particular dataset, may subsequently be determined following analysis of the dataset and stored in a second location in the target system. In some embodiments, parameters may include privileges. Privileges may comprise permission to execute certain actions on a database. Such permissions may comprise, for example, permission to access a data table or, alternatively, permission to execute a database command. In some embodiments, at a first location of the target platform, the processor may apply a first set of parameters to source data. This first set of parameters may then grant the source data first privileges. By way of example, if the source data achieves a certain mean or data range threshold, it may be granted first privileges. Such first privileges may comprise, for example, permission to reorganize the source data into a format that is more easily readable or analysable. Alternatively, the first privileges may comprise permission to store the source data upon its receipt at the first location. In some embodiments, the processor may then transfer the source data from the first location to a second location within the target platform. The transfer of the source data may then depend on the first set of privileges. For example, if the first set of privileges provides permission to transfer the source data from the first location to the second location if the source data achieves a certain mean or data range threshold, the transfer of the source data may then be executed by the processor. In some embodiments, transfer of the source data in accordance with the first privileges may first depend on whether the source data is properly formatted at the first location for transfer to the second location. Alternatively, if the second location is responsible for analysis of the source data, transfer of the source data in accordance with the first privileges may first depend on whether the source data is properly formatted and organized for analysis at the second location. In some embodiments, the processor may then load second parameters to a second location within the target platform. As discussed above, such second parameters may comprise the particular median of a dataset. The processor may then apply the second parameters to the source data such that the second parameters grant the source data a second set of privileges. By way of example, if the median of a particular dataset is analysed and meets a certain threshold, that dataset will then be granted second privileges. Such second privileges may comprise, for example, permission for the dataset to be transformed to comply with the data format of the target platform. Alternatively, if already compliant, such second privileges may comprise permission for the dataset to be presented on a dashboard for view and interpretation. In some embodiments, the processor may transfer source data from the second location to a target location within the target platform. This transfer may depend on a second set of parameters, such as, for example, if the median of the source data meets a certain median threshold.

Figure 13:
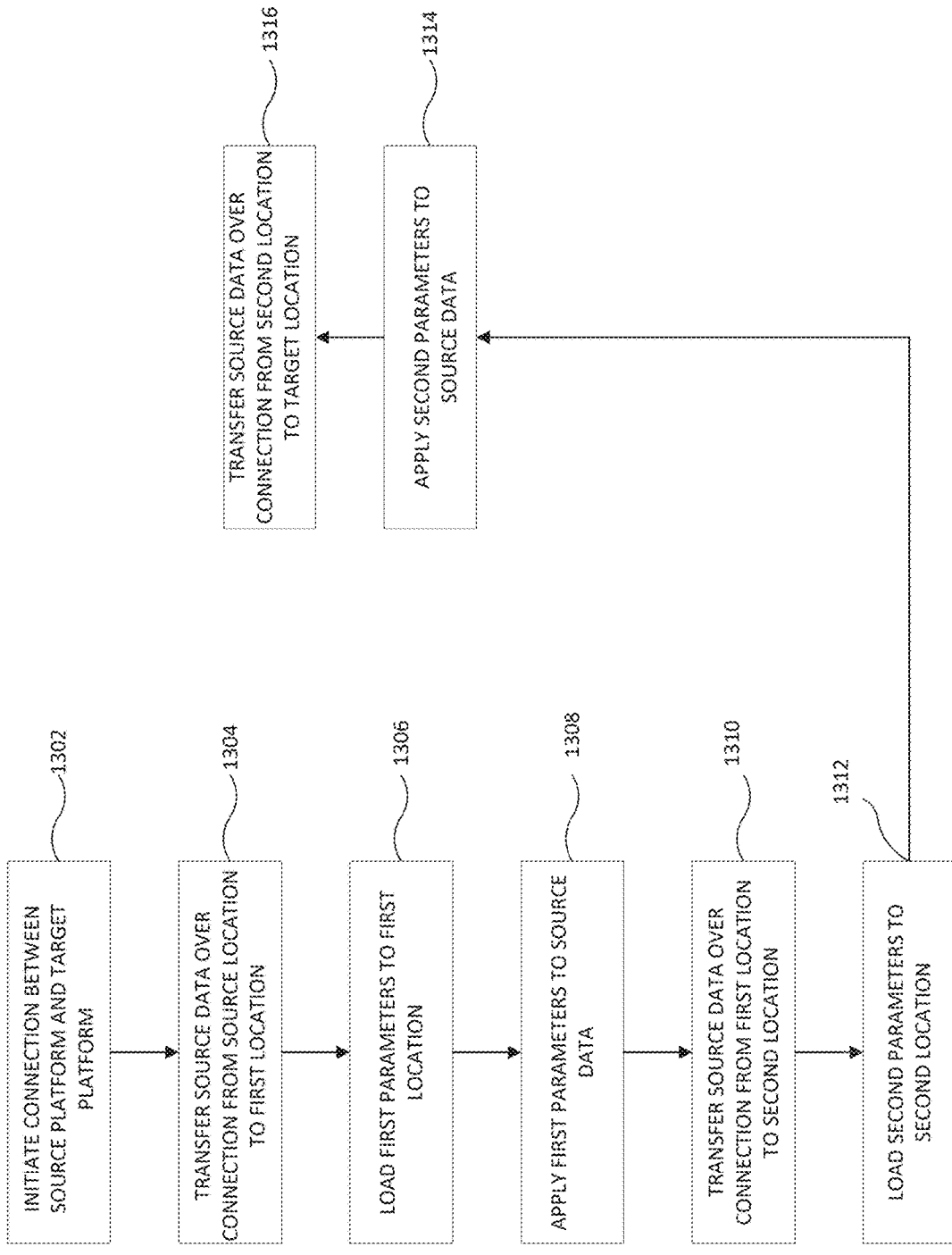
FIG. 13 is a flowchart of an exemplary system for transferring and integrating data from one or more external locations to a target location.

FIG. 13 illustrates a flowchart of example system 1300 for transferring and integrating custom data from one or more external locations to an internal location. In some embodiments, system 1300 may be performed by at least one processor (e.g., 210, 332) to perform operations or functions described herein. In some embodiments, some aspects of system 1300 may be implemented as software (e.g., program codes or instructions) that are stored in a memory (e.g., 220) of computing device 200 or a non-transitory computer readable medium. In some embodiments, some aspects of system 1300 may be implemented as hardware (e.g., a specific-purpose circuit). In some embodiments, system 1300 may be implemented as a combination of software and hardware.

Referring to FIG. 13, system 1300 may include a processor configured to 1302 initiate a connection between a source platform and a target platform, the source platform having a source location and the target platform having a first location, a second location, and a target location. The processor May 1304 transfer source data over the connection from the source location to the first location and, subsequently, May 1306 load first parameters to the first location. At the first location, the processor May 1308 apply the first parameters to the source data, the first parameters granting the source data first privileges. The processor May 1310 transfer the source data over the connection from the first location to the second location, the transfer depending on the first privileges. The processor May 1312 load second parameters to the second location and, at the second location, 1314 apply the second parameters to the source data, the second parameters granting the source data second privileges. The processor May 1316 transfer the source data over the connection from the second location to the target location, the transfer depending on the second parameters. The first parameters may comprise the mean or average of source data, the second parameters may comprise the median of the source data, the first privileges may comprise permission to reorganize the source data into a format that is more easily readable or analyzable, and the second privileges may comprise permission for the source data to be transformed to comply with the data format of the target location.

In some embodiments, the first parameters and the second parameters are stored in independent locations, separate from the source location, the first location, the second location and the target location. As discussed above, parameters may comprise criteria or specifications that are applied to source data, or, alternatively, characteristics or descriptors of data. Independent locations may comprise, for example, locations that are different or separate from a source location, first location, second location, or target location. By way of example, the first and second parameters may be stored on a different computer, different memory, or different data structure than the source location, the first location, the second location, and the target location.

In some embodiments, the at least one processor is further configured to identify one or more data type of the source data; and apply the first parameters and the second parameters based on the identified data type. Identifying data types of the source data may comprise, for example, pinpointing specific types or classifications of data that could be associated with or linked to the source data. As discussed above, data types may include structured or unstructured data. Alternatively, data may be classified according to its availability. For example, data may be controlled and unclassified, restricted, or public. In some embodiments, the at least one processor may be configured to identify any number of data types and/or apply any number of parameters. First and second parameters may then be applied based on the identified data type. By way of example, unstructured data may be disorganized and, thus, would benefit from application of parameters that could help organize it, such as a data range and mean/standard deviation. Structured data may be more organized than unstructured data, but application of parameters such as mean or median may facilitate its analysis. The types of parameters applied to a particular dataset may depend on whether that dataset is structured or unstructured. Typically, unstructured data may require application of parameters directed to organization of data.

The present disclosure also concerns migrating a database from one source server to a target server. In some embodiments, a system for migrating and integrating a database from one or more external servers to a target server comprising at least one processor configured to: access the database located on a storage platform, the storage platform located on the one or more external servers; load the database from the storage platform to an in-memory platform associated with the target server; transfer the database stored on the in-memory platform to an intermediate location; and store the database to an internal platform, the internal platform located on the target server. In some embodiments, a system may migrate and integrate a database from one or more external servers to a target server. A database may comprise, for example, a set of data in a computer that is accessible in various ways. An external server may comprise, for example, an outside computer program independent of a target or relevant program where a database may be located or stored. A target server may comprise, for example, a computer program to which a database from an outside program is intended or targeted. In certain embodiments, the system may transform the database from the one or more external servers such that it conforms with and can readily be received by the target server. In some embodiments, to facilitate the migration and integration of the database to the target server, a processor may first access the database while located on a storage platform in the one or more external servers. A storage platform may comprise, for example, a location in the external server that stores or holds the database. Accessing the database from the storage platform may comprise, for example, obtaining or retrieving it from the platform. The processor may then load or store the database from the storage platform onto an in-memory platform associated with the target server. An in-memory platform may comprise, for example, a location in a computer that relies primarily on memory for data storage. This is in contrast to databases that store data on disks or data processing techniques that rely heavily on reading and writing data. In some embodiments, loading the database onto an in-memory platform may facilitate data migration and integration by eliminating the need for more time-consuming measures such as reading and writing data or pulling data from disks. In some embodiments, the in-memory platform may be associated with the target server such that the in-memory platform may be configured to facilitate migration and integration to the target server by ensuring databases intended for migration/integration are properly formatted, organized, and structured for smooth migration and integration to the target server. Following storage at the in-memory platform, the in-memory platform may then determine that reformatting, reorganization, and restructuring of the database are necessary for integration into the target server. The processor may then transfer the database to an intermediate location where the database may be reformatted, reorganized, and restructured such that the database comports with the data format, organization, and structure of the target server. An intermediate location may comprise, for example, a middle or intermediary location between an external server and a target server. Once properly reformatted, reorganized, and restructured, the database may then be stored to an internal platform located on the target server, completing the migration and integration process. In certain embodiments, the in-memory platform may determine that a database does not need reformatting, reorganization, and restructuring for integration into the target server, in which case the database may be directly transferred from the in-memory platform for storage on the internal platform of the target server.

Figure 14:
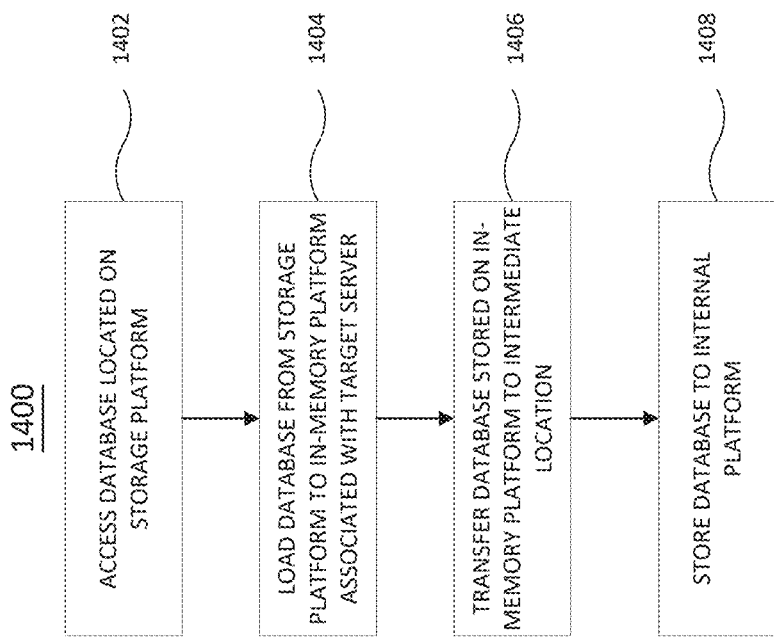
FIG. 14 is a flowchart of an exemplary system for migrating and integrating a database from one or more external servers to a target server.

FIG. 14 illustrates a flowchart of example system 1400 for transferring and integrating custom data from one or more external locations to an internal location. In some embodiments, system 1400 may be performed by at least one processor (e.g., 210, 332) to perform operations or functions described herein. In some embodiments, some aspects of system 1400 may be implemented as software (e.g., program codes or instructions) that are stored in a memory (e.g., 220) of computing device 200 or a non-transitory computer readable medium. In some embodiments, some aspects of system 1400 may be implemented as hardware (e.g., a specific-purpose circuit). In some embodiments, system 1400 may be implemented as a combination of software and hardware.

Referring to FIG. 14, system 1400 may include a processor configured to 1402 access a database located on a storage platform, the storage platform being located on one or more external servers. The processor may then 1404 load the database from the storage platform to an in-memory platform associated with a target server. The processor May 1406 transfer the database stored on the in-memory platform to an intermediate location and May 1408 store the database to an internal platform, the internal platform being located on the target server.

In some embodiments, the at least one processor is further configured to deny storage of the database to the internal platform depending on at least one stored rule associated with a parameter of the database. An internal platform is a platform specific to a target system, or alternatively, a platform that does not exist in an initial, external system. Database rules tied to storage may relate to any condition associated with migrating data, including, but not limited to, its quality, its size, or the degree to which it has been modified. Parameters may comprise those described above, such as the mean, median, or range of a particular dataset. Denying storage of the database to the internal platform based on a stored rule may comprise, for example, rejecting its storage in the internal platform because of an established rule or regulation that prevents or blocks its storage in the internal platform. Denying storage of a database may comprise, for example, not writing it to an internal platform. Alternatively, denying storage may comprise deleting a database from some intermediate location where it is held prior to transfer to an internal platform. By way of example, a particular database may be denied storage to an internal platform because that database does not satisfy data range requirements for being stored in the platform. Alternatively, a database may not satisfy mean or median requirements for storage to a platform.

In some embodiments, the parameter is a size of the data, and the at least one rule is associated with a size restriction. A parameter focused on data size may comprise, for example, characterizing data based on how large or expansive it is. By way of example, data may be characterized by its total size (e.g., in megabytes or gigabytes). Alternatively, data may be characterized by the size of a particular data field or the size of a particular record. Or data may characterized by the size of particular data words. In certain embodiments, data may be characterized by the number of data words, data records, or data fields. A rule associated with size restriction may comprise, for example, denying storage of a particular dataset because it does not meet a particular size requirement. Alternatively, storage of the dataset may be restricted or limited but not denied altogether. By way of example, if the size of a dataset meets certain requirements for storage (e.g., total size) but fails to meet other requirements (e.g., number of data words, data records, or data fields), its storage may be restricted to certain pieces of content but not others. In other embodiments, determination of data storage may not depend on its size.

In some embodiments, the parameter and the at least one rule are associated with a security measure of the database. A security measure of the database may comprise, for example, whether the database is public or confidential. By way of example, a particular dataset may include data content deemed to be critical that must be protected or kept secret. In such circumstances, the dataset may be denied storage in a database if it were not labelled as confidential. Examples of such data may comprise data related to a country's national security, sensitive information related to a particular business's customers (e.g., their personal or financial information), or non-patented disclosures related to a business's novel technologies.

In some embodiments, the parameter is an identification of technology standards, and the at least one rule is associated with a required technology standard. A technology standard may relate to the particular hardware or software under which a system operates. Under a technology standard parameter, for a dataset to be stored in a particular system, the dataset must comply with the particular technology standards—hardware and/or software—of the system. If a dataset is not compatible or operable with the particular technology standard of a system, it may be denied storage in the system.

In some embodiments, the at least one processor is further configured to maintain a copy of the database on the storage platform. Maintaining a copy of a database entails, for example, keeping a duplicate of the database in the storage platform, or particular location in a computer system whose primary function is storing information and datasets. In other embodiments, the at least one processor may not maintain a copy of the database. In some embodiments, the at least one processor may maintain an original copy of the database. In some embodiments, the at least one processor may maintain more than one copy of the database, such as, for example, two copies, three copies, four copies, five copies, or n copies. In some embodiments, the at least one processor may maintain an original copy and duplicate copy of the database. In some embodiments, the processor may be configured to maintain an original copy of a database on the storage platform even after the database has been transformed and stored in a target server. Alternatively, the processor may be configured to maintain a copy of the transformed database on the storage platform.

In some embodiments, a system for migrating and integrating a database from one or more external storage architectures to a target storage architecture comprises at least one processor configured to: access the database located on the one or more external storage architectures; move the database from the one or more external storage architectures to a memory platform; and via the memory platform, transfer the database to a target storage architecture, the transfer depending on user defined rules. Storage architecture may comprise, for example, the specific storage mechanism or device for storage of a particular database. By way of example, a storage architecture may comprise a server-attached storage, a network attached storage, a storage area network, tape library, server centric architecture, information centric architecture, or virtualizing storage architecture. An external storage architecture may entail, for example, an original or source storage architecture from which data is originally transferred, while a target storage architecture may entail, for example, a storage architecture to which data is targeted or intended. As discussed above, an in-memory platform may comprise, for example, a purpose-built location in a computer that relies primarily on memory for data storage. User defined rules may comprise, for example, rules or regulations defined or generated by a particular user or individual. In some embodiments, the processor may first move a database from one or more external storage architectures to a memory platform, and, subsequently, transfer the database from the memory platform to a target storage architecture. In certain embodiments, the transfer to the target storage architecture may depend on satisfaction of specific user-defined rules. By way of example, the transfer of the database may depend on whether the format of the database complies with the format of the target storage architecture. Alternatively, the transfer of the database may then depend on whether the database meets certain size restrictions of the target storage architecture. In other embodiments, the database may be moved to any other platform, such as, for example, an intermediate location, or, alternatively, directly to a target destination without a stop at a memory platform. In some embodiments, the database may be moved to more than one location via a memory platform, such as, for example, an intermediate location and a target location. In other embodiments, a memory platform may not be employed in database transfer. In some embodiments, database transfer may not be defined by any rules. In other embodiments, database transfer may be based on non-user-defined rules. Such rules may include, but are not limited to, data quality, data size, information technology standards, and/or a degree of data modification.

Figure 15:
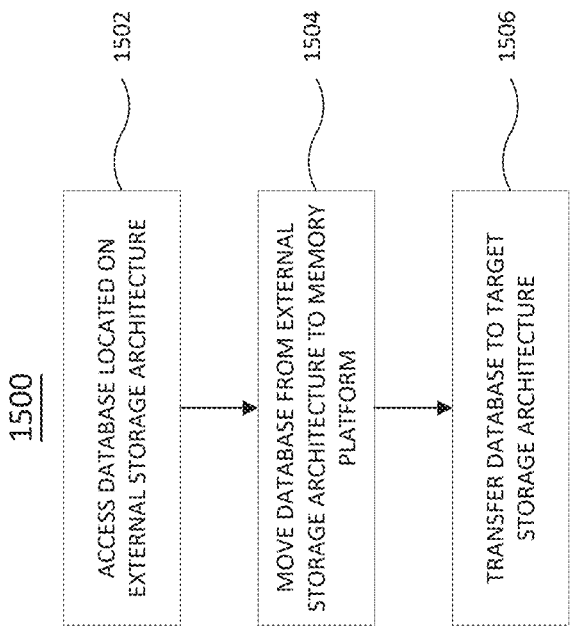
FIG. 15 is a flowchart of an exemplary system for migrating and integrating a database from one or more external storage architectures to a target storage architecture.

FIG. 15 illustrates a flowchart of example system 1500 for migrating and integrating a database from one or more external storage architectures to a target storage architecture. In some embodiments, system 1500 may be performed by at least one processor (e.g., 210, 332) to perform operations or functions described herein. In some embodiments, some aspects of system 1500 may be implemented as software (e.g., program codes or instructions) that are stored in a memory (e.g., 220) of computing device 200 or a non-transitory computer readable medium. In some embodiments, some aspects of system 1500 may be implemented as hardware (e.g., a specific-purpose circuit). In some embodiments, system 1500 may be implemented as a combination of software and hardware.

Referring to FIG. 15, system 1500 may include a processor configured to 1502 access a database located on one or more external storage architectures. The processor May 1504 move the database from the one or more external storage architectures to a memory platform. The processor may then 1506 transfer the database, via the memory platform, to a target storage architecture, the transfer depending on user-defined rules.

In some embodiments, the at least one processor is further configured to identify the external storage architecture as a known platform, and the user defined rules are associated with the known platform. A known platform may be one that is familiar, recognized, or established. In some embodiments, a processor may recognize or be familiar with an external storage architecture based on memory or experience. The processor may then identify the architecture based on its prior knowledge of it. Alternatively, an external user may recognize or be familiar with a particular architecture and may configure a processor to treat the architecture as a known platform. In some embodiments, the at least one processor may be configured to identify any other platform, such as, for example, an intermediate platform, a memory platform, or a target platform. In some embodiments, a platform may not be associated with any rules, or, alternatively, may be associated with non-user-defined rules.

In some embodiments, the user defined rules are associated with metadata of the database. As discussed above, metadata may comprise, for example, a set of data that describes and provides information about other data. By way of example, metadata may comprise data that describes and provides information about external data. Examples of metadata may include author of a particular dataset, the date a dataset was created, the date a dataset is modified, if applicable, or the size of a particular dataset. By way of example, user defined rules may be associated with such metadata as the date a particular dataset was created or modified, or, alternatively, the size of the dataset. In other embodiments, no rules may be associated with metadata. In some embodiments, non-user defined rules may be associated with metadata, but user defined rules may not be associated with metadata.

In some embodiments, the at least one processor is further configured to require an input before moving the database from the one or more external storage architectures to the memory platform. Requiring an input may comprise, for example, necessitating feedback, guidance, or instruction from an outside source or user before moving a database. By way of example, the input may comprise an assessment of data quality, data size, or a degree of modification of data. The processor may compare the input to a threshold and determine to move the database to a memory platform if the input exceeds the threshold and to not move the database to the platform if the input does not exceed the threshold. In some embodiments, an input may not be required to move a database from a storage architecture to a platform. Alternatively, an input may be required to move a database between locations other than a storage architecture and memory platform, such as, for example, different locations within a target system. In other embodiments, no input may be required for movement of a database during the data migration process.

In some embodiments, a system for migrating and integrating data files comprises at least one processor configured to: extract the data files from a source; request a permission to access an account on a target system; upon a grant of the permission, access the account and calculate a first capacity associated with the target system; convert the data files to an archive file; calculate a second capacity associated with the archive file; identify a location on the target system based on a comparison of the first capacity and the second capacity; enable an input of metadata associated with the archive file; and transfer the archive file to the location on the target system. Data files may comprise, for example, sets or collections of data. Extracting data files from a source may comprise, for example, reading or acquiring them from the source and placing them into a separate location for subsequent processing. Alternatively, the data files may be written from the source to a new location for subsequent processing. Requesting permission to access an account on a target system may entail, for example, requesting permission to log into a target system. By way of example, requesting permission may entail inputting a username and password to access the account, or, alternatively, employing some other form of authentication such as a public key or other encryption key. Granting permission may entail authorizing access to the account by, for example, verifying a password or authentication key or, alternatively, allowing read/write access to the account. Calculating a capacity of a target system may comprise, for example, determining how much space is occupied by the target system versus how much space is free or available. Alternatively, capacity of the target system may be measured in some other fashion such as, for example, the number of records or the amount of data in the system at a given moment. In some embodiments, a system may be overloaded and unable to handle additional data files. In other embodiments, a system may have capacity and space to handle additional data files. An archive file may entail, for example, a computer file composed of one or more data files along with metadata. Alternatively, archive files may comprise combining multiple data files together into a single file for easier portability and storage, or to compress them to use less storage space. Alternatively, archive files may comprise converting combined data files together to a format that reduces space. The processor may then calculate a second capacity associated with an archive file. Calculating a capacity associated with the archive file may comprise determining the overall size of the archive file when at maximum capacity, or, alternatively, calculating the amount of space an archive file occupies within a given system when at maximum capacity. The processor may then identify a location in a target system based on a comparison of the first and second capacities. By way of example, the processor may compare the first capacity—or amount of free/available space in the target system—with the second capacity—or amount of space a given archive file occupies in a system when at maximum capacity—to determine whether any locations in the target system have the space available to store the archive file. If the first capacity is greater than the second capacity, the processor may move forward with identifying a location in the target system. If, on the other hand, the first capacity is smaller than the second capacity, the processor may not move forward with identifying a location in the target system. If the processor moves forward with identifying a target system location, the processor may then enable an input of metadata associated with the archive file. This input of metadata may come from the processor itself or, alternatively, from an external user of the system. As discussed above, metadata may comprise, a set of data that describes and provides information about the archive file, such as, for example, its name, its date of creation, its size, or key words to describe it. Following the input of metadata, the processor may then transfer the archive file to the location on the target system with space available to store it.

Figure 16:
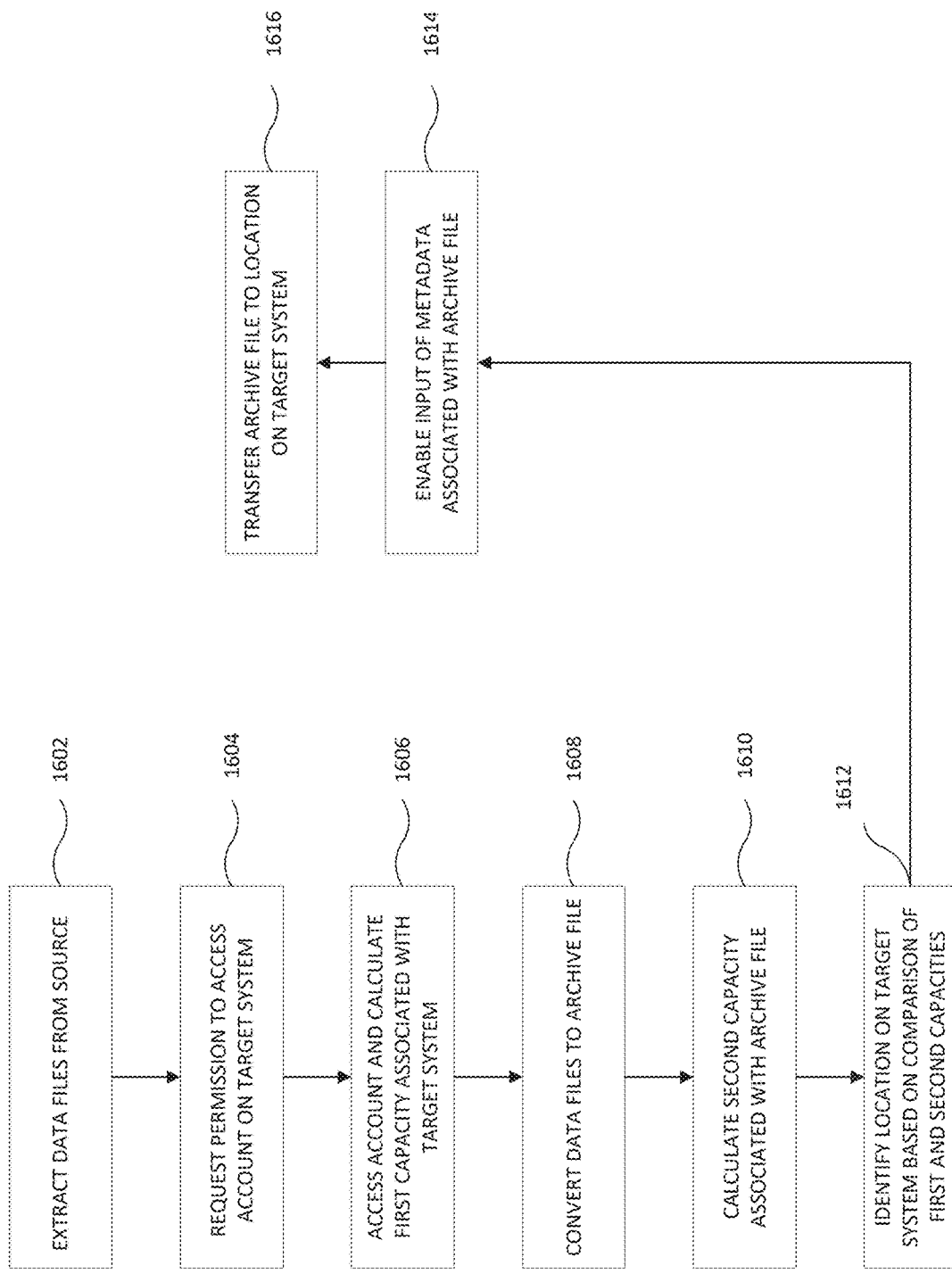
FIG. 16 is a flowchart of an exemplary system for migrating and integrating data files.

FIG. 16 illustrates a flowchart of example system 1600 for migrating and integrating data files. In some embodiments, system 1600 may be performed by at least one processor (e.g., 210, 332) to perform operations or functions described herein. In some embodiments, some aspects of system 1600 may be implemented as software (e.g., program codes or instructions) that are stored in a memory (e.g., 220) of computing device 200 or a non-transitory computer readable medium. In some embodiments, some aspects of system 1600 may be implemented as hardware (e.g., a specific-purpose circuit). In some embodiments, system 1600 may be implemented as a combination of software and hardware.

Referring to FIG. 16, system 1600 may include a processor configured to 1602 extract data files from a source. The processor May 1604 request permission to access an account on a target system. Upon grant of the permission, the processor may then 1606 access the account and calculate a first capacity associated with the target system. The processor May 1608 convert the data files to an archive file and, subsequently, 1610 calculate a second capacity associated with the archive file. The processor May 1612 identify a location on the target system based on a comparison of the first capacity and the second capacity, 1614 enable an input of metadata associated with the archive file, and 1616 transfer the archive file to the location on the target system.

In some embodiments, the input of metadata is based on a criteria. Criteria may comprise, for example, a principle or standard by which something is judged or decided. By way of example, the input of metadata may depend on whether the archive file satisfies such criteria as validity, consistency, or conformity. Validity may comprise, for example, data that is correctly formatted and stored. Consistency may comprise, for example, data that does not conflict. Conformity may comprise, for example, data that is uniform in format and/or style. In some embodiments, input of metadata may be enabled by the processor if one or more of the above criteria is satisfied. Alternatively, input of metadata may depend on satisfaction of all relevant criteria of a particular archive file. In some embodiments, if one or more of the above criteria is not satisfied, input of metadata associated with an archive file may not occur, and the archive file will not be transferred to a location within the target system.

In some embodiments, the criteria for metadata input is associated with the source. Criteria, as discussed above, may be associated with, for example, the source from which data files are originally extracted. By way of example, if the source/original data files do not satisfy such criteria as validity, consistency, and/or conformity, input of metadata associated with an archive file may not occur.

In some embodiments, the criteria for metadata input is associated with the second capacity. By way of example, input of metadata may depend on the particular capacity of the archive file. If the archive file does not satisfy a certain threshold capacity, input of metadata may not occur.

In some embodiments, the criteria is associated with a location on the target system. By way of example, input of metadata may depend on whether the location on the target system has the capacity to store an archive file with associated metadata. If the target system location does not satisfy a certain threshold capacity, input of metadata may not occur.

In some embodiments, a system for controlling the migration and integration of data, comprises at least one processor configured to: access data from a source; assign first control parameters to the data; provide the first control parameters to a reconciliation dashboard; transfer the data to a first location; assign second control parameters to the transferred data; provide the second control parameters to the reconciliation dashboard; transform the data at the first location based on transformation rules; assign third control parameters to the transformed data; provide the third control parameters to the reconciliation dashboard; load the data from the first location to a second location; assign fourth control parameters to the loaded data; provide the fourth control parameters to the reconciliation dashboard; and compare the first control parameters, the second control parameters, the third control parameters, and the fourth control parameters. In some embodiments, the processor may access data from a source system and assign first control parameters to the data. Assigning control parameters may comprise, for example, allocating or setting criteria to the data to, for example, regulate its progression as it migrates and becomes integrates into a target system. Such control parameters may comprise, for example, regulating data migration and integration by, among other things, data size, format, organization, or structure. By way of example, a particular dataset may be assigned first control parameters, i.e., related to size restrictions, such that the dataset must meet certain size limitations to, for example, be transferred to a first location in a system. The processor may provide the control parameters to a reconciliation dashboard. As previously discussed, a dashboard may comprise, for example, a visual system that allows for display of data. A reconciliation dashboard may comprise, for example, a dashboard that reconciles and organizes data undergoing migration and integration into a target system such that changes in the data can be readily viewed and appreciated. By way of example, the processor may provide size control parameters to the reconciliation dashboard such that a viewer may visualize the size limitations necessary for data to embark on a first step of migration, i.e., its transfer to a first location. If the data meets the size limitations, it may be then transferred to the first location. If the data does not meet the size limitations, it may not be transferred. The processor may then assign second control parameters to the transferred data, and, again, provide the second control parameters to the reconciliation dashboard for external view. The second control parameters may, for example, comprise size limitations that allow for progression to the next step of migration and integration, i.e., transformation of the data at the first location based on transformation rules. The size limitations of the second control parameters may be the same or different as the size limitations of the first control parameters. Providing the second control parameters to the reconciliation dashboard may enable visualization of the size limitations necessary to proceed to the transformation step for data migration and integration. The processor may then transform the data at the first location based on transformation rules. Such transformation rules may entail, for example, rules that ensure that transformed data will comport with the data in the target system where the transformed data is being integrated. Transformation rules may relate, for example, to properly formatting, organizing, and structuring data to comply with that of the target system such that the transformed data may readily integrate into the target system. The processor may then assign third control parameters to the transformed data and, again, provide the third control parameters to the reconciliation dashboard for external view. The third control parameters may, for example, comprise size limitations that allow for progression to the next step of migration and integration, i.e., loading of the data from the first location to a second location. The size limitations of the third control parameters may be the same or different as the size limitations of the first and second control parameters. Providing the third control parameters to the reconciliation dashboard may enable visualization of the size limitations necessary to proceed to the loading step for data migration and integration. The processor may then load the data from the first location to a second location. Loading the data may entail, for example, writing or storing it in the second location. The processor may then assign fourth control parameters to the loaded data and, again, provide the fourth control parameters to the reconciliation dashboard for external view. The fourth control parameters may, for example, comprise size limitations that allow for progression to a next step of migration and integration. This next step may entail, for example, integration into a target system. The size limitations of the fourth control parameters may be the same or different as the size limitations of the first, second, and third control parameters. Providing the fourth control parameters to the reconciliation dashboard may enable visualization of the size limitations necessary to proceed to a next step of migration and integration, such as, for example, integration into a target system. The processor may then compare the first, second, third, and fourth control parameters to track a particular control parameter's progression as data is migrated and integrated into a target system. By way of example, the processor may track data size restrictions as (1) data is transferred to a first location, (2) data is transformed at the first location, (3) data is loaded onto a second location, and (4) data progresses to a next step such as integration into a target system to provide perspective on how data size restrictions change during the data migration and integration process.

Figure 17:
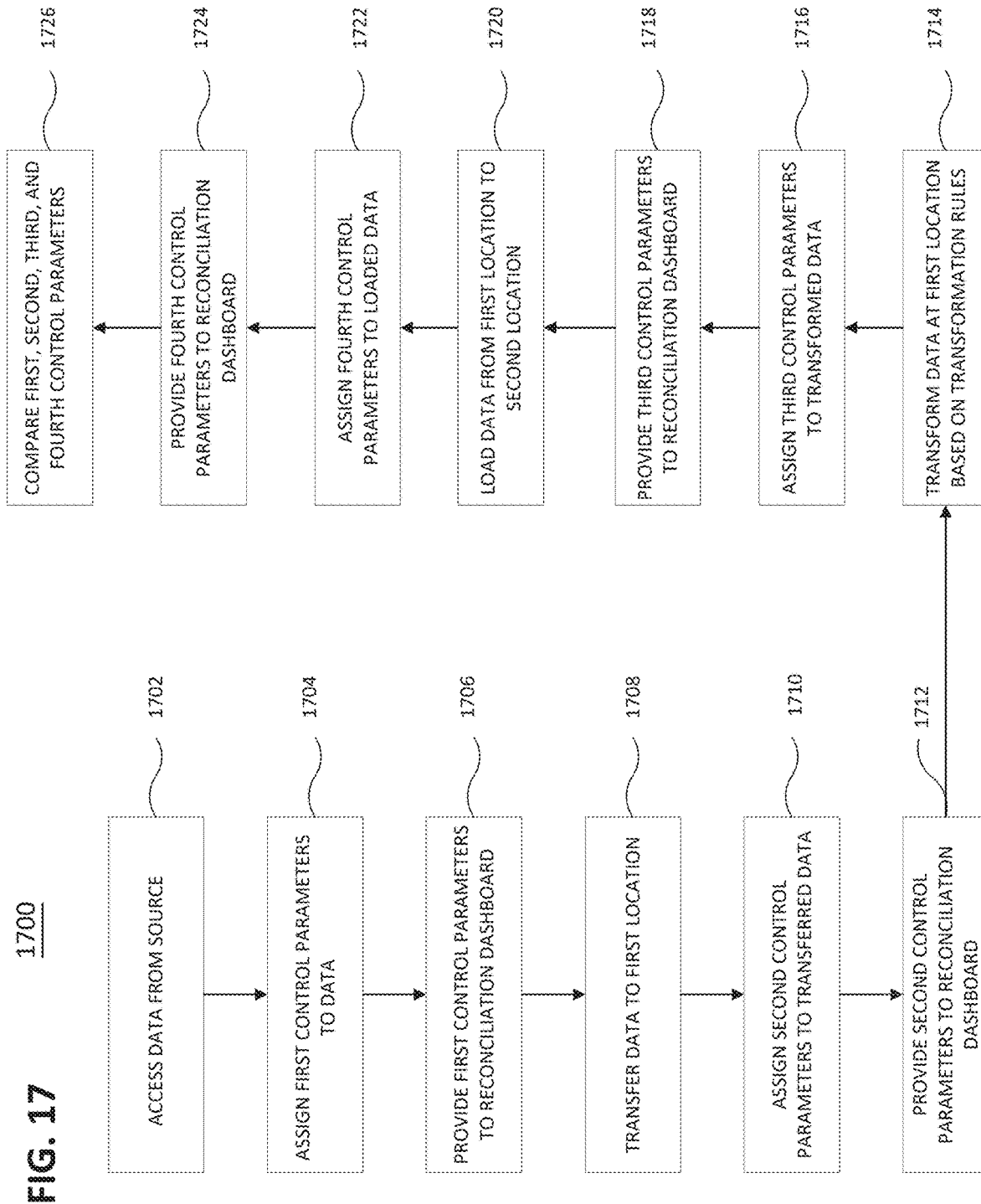
FIG. 17 is a flowchart of an exemplary system for controlling the migration and integration of data.

FIG. 17 illustrates a flowchart of example system 1700 for migrating and integrating data files. In some embodiments, system 1700 may be performed by at least one processor (e.g., 210, 332) to perform operations or functions described herein. In some embodiments, some aspects of system 1700 may be implemented as software (e.g., program codes or instructions) that are stored in a memory (e.g., 220) of computing device 200 or a non-transitory computer readable medium. In some embodiments, some aspects of system 1700 may be implemented as hardware (e.g., a specific-purpose circuit). In some embodiments, system 1700 may be implemented as a combination of software and hardware.

Referring to FIG. 17, system 1700 may include a processor configured to 1702 access data from a source, 1704 assign first control parameters to the data, and 1706 provide the first control parameters to a reconciliation dashboard. The processor may then 1708 transfer the data to a first location, 1710 assign second control parameters to the transferred data, and 1712 provide the second control parameters to the reconciliation dashboard. The processor may then 1714 transform data at the first location based on transformation rules, 1716 assign third control parameters to the transformed data, and 1718 provide the third control parameters to the reconciliation dashboard. The processor may then 1720 load the data from the first location to a second location, 1722 assign fourth control parameters to the loaded data, and 1724 provide the fourth control parameters to the reconciliation dashboard. The processor May 1726 compare the first control parameters, the second control parameters, the third control parameters, and the fourth control parameters.

In some embodiments, a system for controlling the migration and integration of data comprises at least one processor configured to: establish a first control associated with data; accept the data to a first location; record a second control associated with the data at the first location; enable a first comparison based on the first control and the second control; transform the data; record a third control associated with the transformed data; enable a second comparison based on the second control and the third control; move the transformed data to storage; record a fourth control associated with the transformed data in storage; enable a third comparison based on the third control and the fourth control; and display a reporting of the first comparison, the second comparison, and the third comparison. Establishing control associated with data may entail, for example, limiting or restricting its availability or access unless a particular condition is satisfied. Such conditions may relate to data quality or size, among other things. In some embodiments, the processor may establish data size restriction as a first control associated with a particular dataset. Under the first control, if the data either does not meet a certain size threshold or exceeds an upper limit, it may not be accepted at the first location. If the first control is satisfied, the processor may accept the data at a first location. Accepting data may comprise, for example, writing it to the first location, reading it from the first location, or storing it in the first location. The processor may then record a second control associated with the data at the first location. The second control may typically be the same as the first control or may be different. By way of example, if the second control comprises data restriction, if the data either does not meet a certain size threshold or exceeds an upper limit, the processor may not enable a first comparison. If the second control is satisfied, the processor may then enable a first comparison based on the first and second controls. Enabling a first comparison based on the first and second controls may comprise, for example, allowing the processor to compare and contrast the two controls, if, as discussed above, the second control is satisfied (i.e., the data meets a certain size threshold or remains within an upper limit). In some embodiments, the processor may compare the two controls to determine whether the data size changed following acceptance of the data to the first location. The processor may then transform the data and, subsequently, record a third control associated with the transformed data. The third control may typically be the same as the first and second controls or may be different. By way of example, if the third control comprises data restriction, if the data either does not meet a certain size threshold or exceeds an upper limit, the processor may not enable a second comparison. If the third control is satisfied, the processor may then enable a second comparison based on the second control and the third control to determine whether the data size changed following transformation. The processor may then move the transformed data to a storage location and, subsequently, record a fourth control associated with the transformed data in storage. The fourth control may typically be the same as the first, second, and third controls or may be different. By way of example, if the fourth control comprises data restriction, if the data either does not meet a certain size threshold or exceeds an upper limit, the processor may not enable a third comparison. If the fourth control is satisfied, the processor may then enable a third comparison based on the third control and the fourth control to determine whether the data size changed following movement of the transformed data to a storage location. The processor may then display a reporting of the first, second, and third comparisons. Displaying a reporting of the comparisons may enable external users to track any changes to a particular control following the above steps, namely data acceptance, transformation, and movement to a storage location. External users may then determine whether any of the above steps affects a particular control, such as, for example, the size of a dataset.

Figure 18:
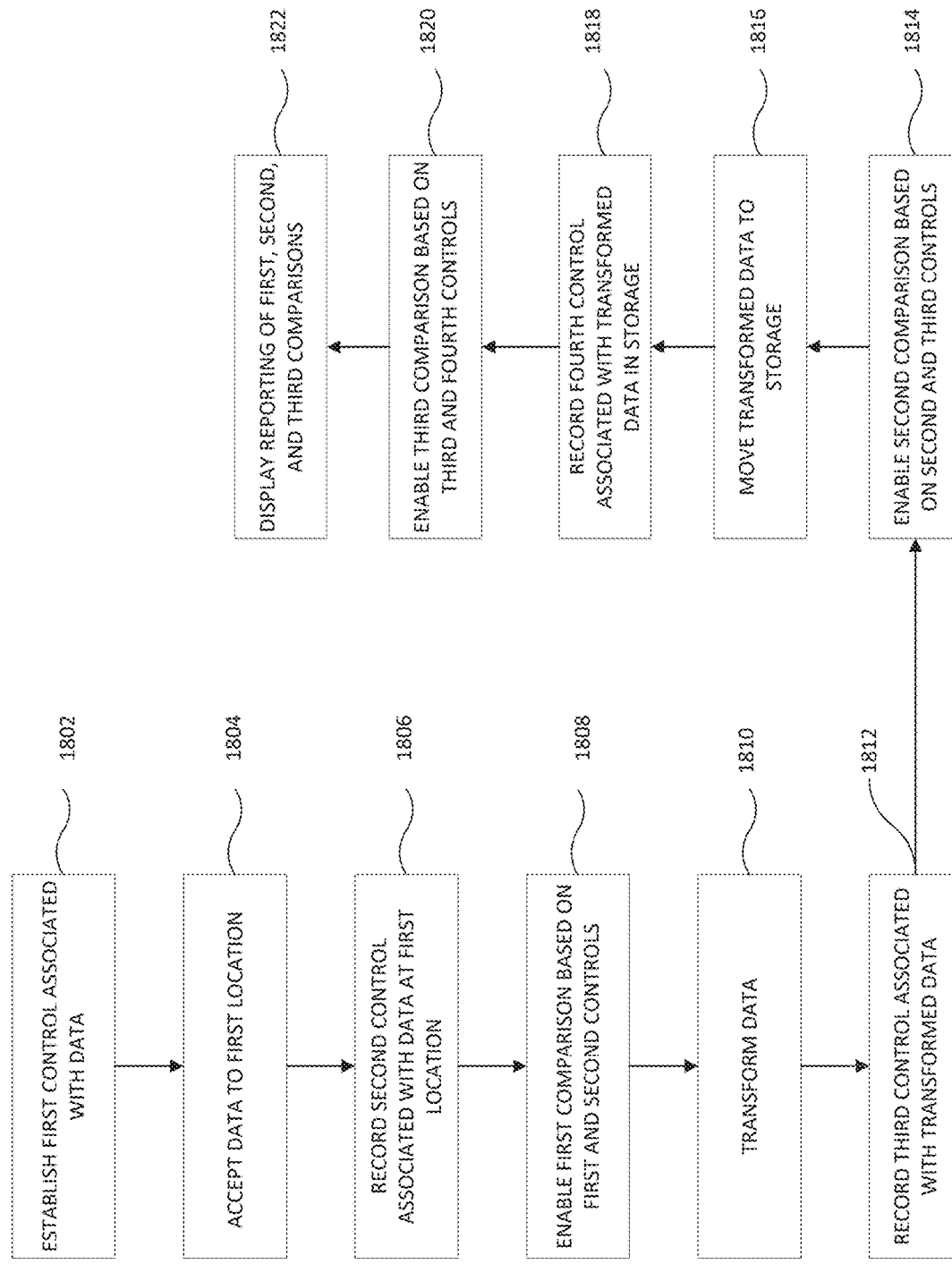
FIG. 18 is a flowchart of an exemplary system for controlling the migration and integration of data.

FIG. 18 illustrates a flowchart of example system 1800 for controlling the migration and integration of data. In some embodiments, system 1800 may be performed by at least one processor (e.g., 210, 332) to perform operations or functions described herein. In some embodiments, some aspects of system 1800 may be implemented as software (e.g., program codes or instructions) that are stored in a memory (e.g., 220) of computing device 200 or a non-transitory computer readable medium. In some embodiments, some aspects of system 1800 may be implemented as hardware (e.g., a specific-purpose circuit). In some embodiments, system 1800 may be implemented as a combination of software and hardware.

Referring to FIG. 18, system 1800 may include a processor configured to 1802 establish a first control associated with data and 1804 accept the data to a first location. The processor may then 1806 record a second control associated with the data at the first location and 1808 enable a first comparison based on the first control and the second control. The processor may then 1810 transform the data. The processor May 1812 record a third control associated with the transformed data and 1814 enable a second comparison based on the second control and the third control. The processor may then 1816 move the transformed data to storage. The processor May 1818 record a fourth control associated with the transformed data in storage and 1820 enable a third comparison based on the third control and the fourth control. The processor may then 1822 display a reporting of the first comparison, the second comparison, and the third comparison.

In some embodiments, the first control, the second control, the third control, and the fourth control are financial categories. Financial categories may comprise, for example, classifications or groupings of control based on monetary or economic considerations. Such considerations may include an amount of revenue generated, an amount of capital spent, an amount of debt, or any other monetary/economic consideration. In some embodiments, controls may not be financial categories. As discussed above, controls may instead relate to data quality or size. Alternatively, in other embodiments, some controls may be financial categories while others may not.

In some embodiments, the financial categories include at least one of an outstanding balance, a line of credit, an accrued interest, and a charge off amount. An outstanding balance may comprise, for example, an amount a borrower is obliged to pay on any debt or an amount remaining to be repaid on a loan. A line of credit may comprise, for example, a flexible loan from a bank or financial institution or a defined amount of money that is accessible as needed. An accrued interest may entail, for example, unpaid interest related to credit cards, loans, investments, and savings. Such interest may be owed if on a loan or credit card or earned if on a savings account or investment. A charge off amount may comprise, for example, a creditor considering a debt uncollectable because, for instance, of an agreement not to collect, a debt being several months past due, or failure to perform a settlement agreement. In some embodiments, the financial categories may include more than one of the above. Alternatively, in other embodiments, the financial categories may include economic/monetary considerations other than those listed above, such as, for example, an amount of revenue generated or an amount of capital spent.

In some embodiments, a system for monitoring data migration and integration, comprises at least one processor configured to: move data from a first location to a second location; display a dashboard, the dashboard containing at least one option corresponding to the data; enable a first selection of the at least one option, the first selection causing the dashboard to present a first set of information related to the data and the selection; enable a second selection of at least one detail associated with the presented information, the second selection causing the dashboard to present a second set of information related to the at least one detail; and allow a third selection of at least one filter, the at least one filter causing the presentation of information to change. Monitoring data migration and integration may comprise, for example, keeping an eye on or keeping track of data migration and integration. Displaying a dashboard may comprise, for example, exhibiting or presenting a control panel, indicator panel, or instrument board with options, choices, or courses of action related to data. Alternatively, a dashboard may serve to display different aspects of data, such as, for example, its quality, its size, or the degree to which it has been modified. In some embodiments, the different aspects of data may serve as options corresponding to the data for presentation on a dashboard. For example, the dashboard may be configured to present several aspects—or options corresponding to a database—such as, for instance, its size, the date of its creation, or the degree to which it has been modified. The processor may enable a first selection of such aspects/options such that a first set of information (e.g., a database's size) is presented on the dashboard. A selection may entail, for example, a choice or preference. Enabling a first selection may comprise, for example, allowing either an external user or the internal software to choose what information about a particular database will be presented on the dashboard. The processor may then enable a second selection of at least one detail associated with the presented information. A detail may comprise, for example, a particular feature, characteristic, or attribute of the option or aspect being presented on the dashboard as a result of the first selection. For example, if a database's size comprises the first selection, the processor may enable presentation of specific details related to the database's size, such as, for example, the overall size of the database or, alternatively, the size of particular files within the database. The processor may then allow a third selection of at least one filter. A filter may comprise, for example, a mechanism for presenting specific information and excluding other available information. In some embodiments, selecting a filter may change the information being presented on the dashboard. For example, the processor may elect to only present the information in the first selection, not the second selection, or, alternatively, vice versa. In essence, the processor may "filter out" the information no longer being presented on the dashboard.

Figure 19:
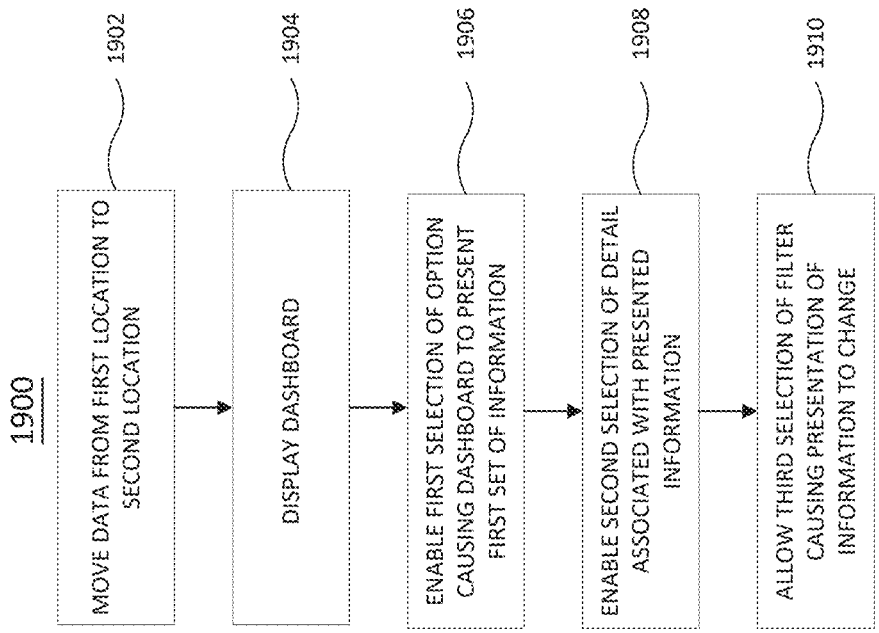
FIG. 19 is a flowchart of an exemplary system for monitoring data migration and integration.

FIG. 19 illustrates a flowchart of example system 1900 for monitoring data migration and integration. In some embodiments, system 1900 may be performed by at least one processor (e.g., 210, 332) to perform operations or functions described herein. In some embodiments, some aspects of system 1900 may be implemented as software (e.g., program codes or instructions) that are stored in a memory (e.g., 220) of computing device 200 or a non-transitory computer readable medium. In some embodiments, some aspects of system 1900 may be implemented as hardware (e.g., a specific-purpose circuit). In some embodiments, system 1900 may be implemented as a combination of software and hardware.

Referring to FIG. 19, system 1900 may include a processor configured to 1902 move data from a first location to a second location. The processor May 1904 display a dashboard, the dashboard containing at least one option corresponding to the data and May 1906 enable a first selection of the at least one option, the first selection causing the dashboard to present a first set of information related to the data and the selection. The processor May 1908 enable a second selection of at least one detail associated with the presented information, the second selection causing the dashboard to present a second set of information related to the at least one detail. The processor May 1910 allow a third selection of at least one filter, the at least one filter causing the presentation of information to change.

In some embodiments, the second selection enables a comparison of the data in the first location and the second location. In some embodiments, the processor may be configured to enable a comparison of data as it moves between locations. By way of example, the processor may facilitate presentation on a dashboard of the size of a particular dataset at a first location and at a second location such that a comparison of the size at the two locations is enabled.

In some embodiments, a system for data migration and integration, comprises at least one processor configured to: transfer data from an external location to a temporary location; sort the data; transform the sorted data in a transformation, the transformation enabling the transformed data to apply to an application; enter the transformed data into the application; and store the transformed data in a memory. Sorting data may entail, for example, organizing it in a particular fashion. As discussed above, sorting data into one or more defined categories may, for example, entail organizing it into one or more established groups or classifications. When sorted, data may be arranged in some meaningful order that makes it easier to understand, analyze, or visualize. Sorting may serve to help visualize data in a form that makes it easier to comprehend a story the data may be telling. By way of example, data may be sorted alphabetically, by day of the week, by month, or by value (e.g., largest to smallest or smallest to largest). Transforming data to apply it to an application may comprise, for example, modifying or changing it to a format, type, or sequence that allows a particular computer program to access and read the data and to perform one or more operations on the data. The processor may then enter the transformed data into the application or particular computer program. Entering the transformed data may comprise, for example, reading or writing it into the application or particular computer program for subsequent processing or use. As discussed above, the instructions executed by at least one processor may, for example, be pre-loaded into a memory integrated with or embedded into the controller or may be stored in a separate memory.

Figure 20:
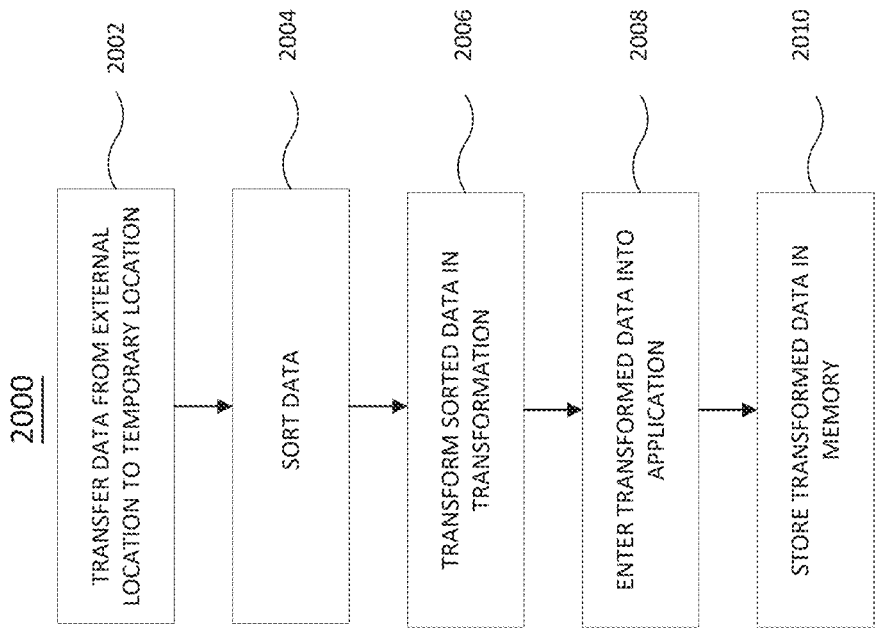
FIG. 20 is a flowchart of an exemplary system for data migration and integration.

FIG. 20 illustrates a flowchart of example system 2000 for data migration and integration. In some embodiments, system 2000 may be performed by at least one processor (e.g., 210, 332) to perform operations or functions described herein. In some embodiments, some aspects of system 2000 may be implemented as software (e.g., program codes or instructions) that are stored in a memory (e.g., 220) of computing device 200 or a non-transitory computer readable medium. In some embodiments, some aspects of system 2000 may be implemented as hardware (e.g., a specific-purpose circuit). In some embodiments, system 2000 may be implemented as a combination of software and hardware.

Referring to FIG. 20, system 2000 may include a processor configured to 2002 transfer data from an external location to a temporary location, 2004 sort the data, and 2006 transform the sorted data in a transformation, the transformation enabling the transformed data to apply to an application. The processor may then 2008 enter the transformed data into the application and 2010 store the transformed data in a memory.

In some embodiments, a system for data migration and integration, comprises at least one processor configured to: access data at a first location; record the data at the first location; transfer the data from the first location to a second location, the second location restricting access to the data; record the data at the second location; load the data to a third location, the third location restricting access to the data; transform the data in a transformation, the transformation enabling the data to implement to an application; record the data at the third location; store the data in a memory; and record the data at a warehouse. In some embodiments, the processor may access data at a first location and, subsequently, record the data. Recording data may comprise, for example, storing and writing data to a particular location. Additionally, recording data may comprise documenting information and observations related to a particular dataset. The processor may then transfer the data from the first location to a second location that restricts access to the data. By way of example, access may only be permitted to those with a particular username and password, or, alternatively, some other form of authentication such as a public key or other encryption key. The processor may then record the data at the second location to document any changes in the data following its transfer from the first location to the second location. The processor may then load—or write or, alternatively, store—the data to a third location, which, again, restricts access to those with proper form of authentication, as discussed above. The processor may then transform data such that it comports with that of a target system and, accordingly, can implement to an application—or program—of the target system, for example. The processor may record the data at the third location to document any changes in the data following its load onto and transformation at the third location. The processor may then store the data in a memory, as discussed above, and, subsequently, record or write the data to a warehouse for future processing and analysis, as discussed above.

Figure 21:
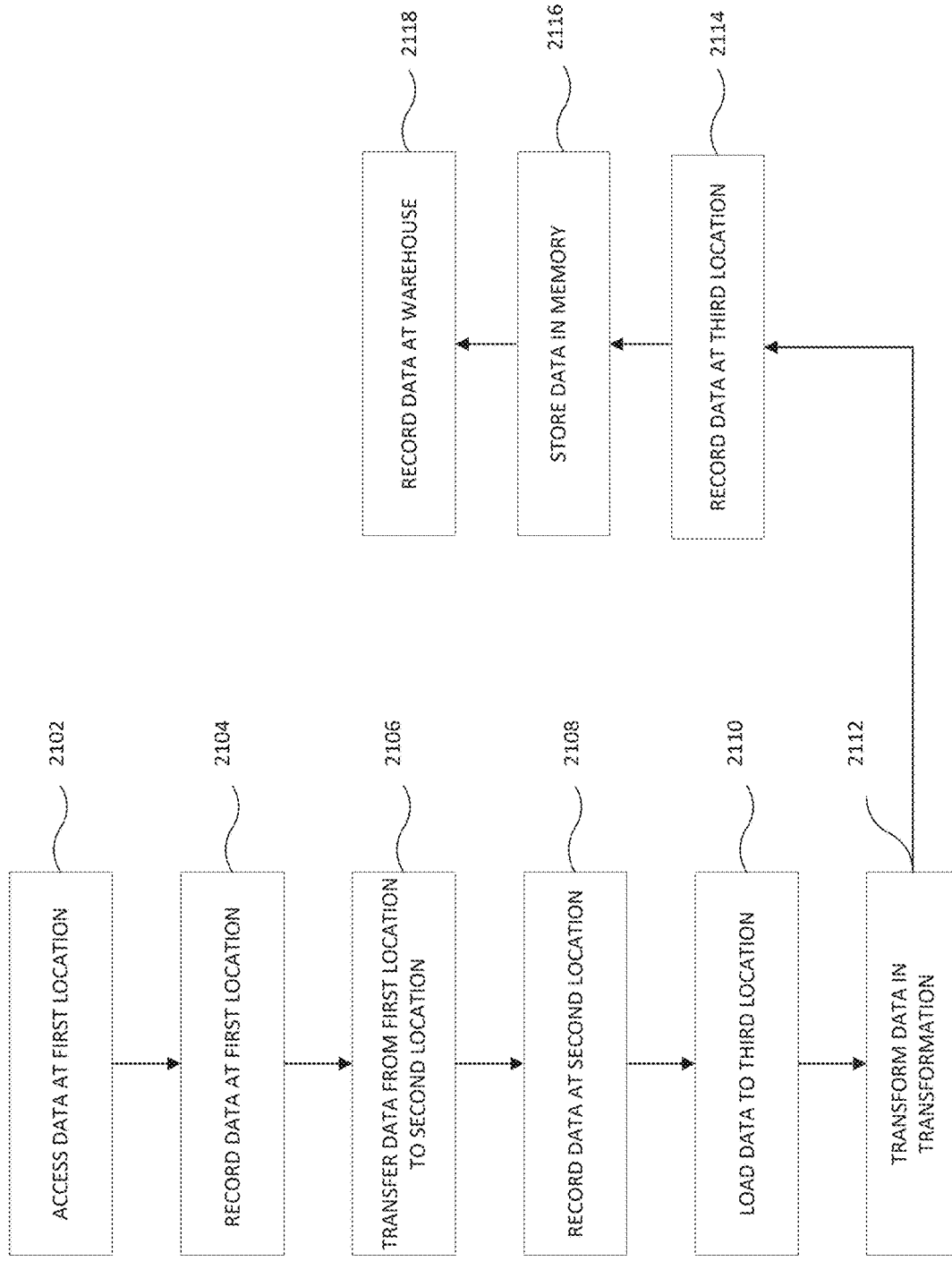
FIG. 21 is a flowchart of an exemplary system for data migration and integration.

FIG. 21 illustrates a flowchart of example system 2100 for data migration and integration. In some embodiments, system 2100 may be performed by at least one processor (e.g., 210, 332) to perform operations or functions described herein. In some embodiments, some aspects of system 2100 may be implemented as software (e.g., program codes or instructions) that are stored in a memory (e.g., 220) of computing device 200 or a non-transitory computer readable medium. In some embodiments, some aspects of system 2100 may be implemented as hardware (e.g., a specific-purpose circuit). In some embodiments, system 2100 may be implemented as a combination of software and hardware.

Referring to FIG. 21, system 2100 may include a processor configured to 2102 access data at a first location and 2104 record the data at the first location. The processor May 2106 transfer the data from the first location to a second location, the second location restricting access to the data. The processor may then 2108 record the data at the second location. The processor May 2110 load the data to a third location, the third location restricting access to the data. The processor May 2112 transform the data in a transformation, the transformation enabling the data to implement to an application and 2114 record the data at the third location. The processor May 2116 store the data in a memory and 2118 record the data at a warehouse.

In some embodiments, a system for data migration and integration, comprises at least one processor configured to: extract historical data from a source location; load the historical data to a cluster location; analyze the historical data in the cluster location, the analyzing including comparing reference data to the historical data, and the analyzing enabling the historical data to correspond to at least one application; and add the historical data to the at least one application. Extracting historical data may comprise, for example, retrieving or obtaining data about events and circumstances from the past that pertain to a particular subject. Such data may include data generated either manually or automatically within an enterprise. Examples of historical data include press releases, log files, financial reports, project and product documentation, and email and other communications. Historical data may then be loaded onto a cluster location. A cluster location may entail, for example, a particular location within a target system where related or similar data has been clustered or grouped together. By way of example, if historical data pertains to financial reports, it may be clustered together at a particular location within a target system with similar data pertaining to financial reports. The historical data in the cluster location may be analysed and compared against reference data. Analysing data may entail, for example, examining, evaluating, or interpreting data. As discussed above, reference data may comprise, for example, data used to classify or categorize other data. Examples of reference data may comprise financial hierarchies, state or country codes, currencies, organizational unit types, or language codes. In some embodiments, reference data may be employed to classify or categorize data as historical data. Historical data may additionally be analysed to determine whether it corresponds to or complies with an application or program within a target system. If historical data complies with a target system application or program, it may then be added to the application or program, thus becoming integrated into the target system. In some embodiments, data to be clustered, analysed, and integrated may not be limited to historical data but, alternatively, may comprise other types of data, such as present or current data or future data.

Figure 22:
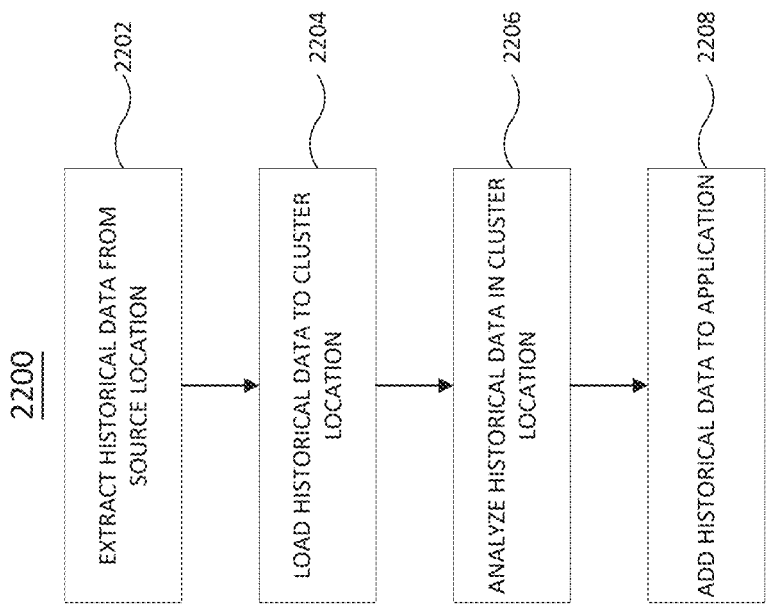
FIG. 22 is a flowchart of an exemplary system for data migration and integration.

FIG. 22 illustrates a flowchart of example system 2200 for data migration and integration. In some embodiments, system 2200 may be performed by at least one processor (e.g., 210, 332) to perform operations or functions described herein. In some embodiments, some aspects of system 2200 may be implemented as software (e.g., program codes or instructions) that are stored in a memory (e.g., 220) of computing device 200 or a non-transitory computer readable medium. In some embodiments, some aspects of system 2200 may be implemented as hardware (e.g., a specific-purpose circuit). In some embodiments, system 2200 may be implemented as a combination of software and hardware.

Referring to FIG. 22, system 2200 may include a processor configured to 2202 extract historical data from a source location and 2204 load the historical data to a cluster location. The processor may then 2206 analyze the historical data in the cluster location, the analyzing including comparing reference data to the historical data and the analyzing enabling the historical data to correspond to at least one application. The processor may then 2208 add the historical data to the at least one application.

In some embodiments, a system for tracking data migration and integration, comprises at least one processor configured to: record source data at a source location; move the source data from the source location to a target location, the move causing the source data to change to transformed data; record the transformed data at the target location; load target data; compare the source data with the transformed data; and compare the target data with the transformed data. In some embodiments, the processor may record source data at a source location in order to document information about and the status of the source data when at the source location. Source data may comprise data that originates from a source system. In some embodiments, the source data may be written to and stored in a particular location in the source system for recordation. The processor may then move the source data from the source location to a target location. This move may cause the source data to change to transformed data because, in some embodiments, in order for the source data to be moved to the target location, it must be transformed into data that comports with the data of the target location. The processor may then record the transformed data at the target location to document information about and the status of the transformed data when at the target location. The processor may additionally compare source data with transformed data to quantify how much change source data undergoes when transformed to comport with a target location. The processor may then load actual target data that is already part of a target system onto a target location for subsequent comparison with the transformed data. The processor may compare the target data with the transformed data to determine whether transformation results in data that comports with the data of the target system.

In some embodiments, the at least one processor is further configured to identify required data, the identification corresponding to the target data; and compare the required data with the transformed data. Identifying required data may comprise, for example, pinpointing particular data or information that is essential or necessary. The required data may, for example, comprise particular subject matter or content within a dataset. Comparison of the required data with the transformed data may be necessary to confirm the required data has not been lost during the transformation process. In some embodiments, required data may comprise sensitive or confidential data.

Figure 23:
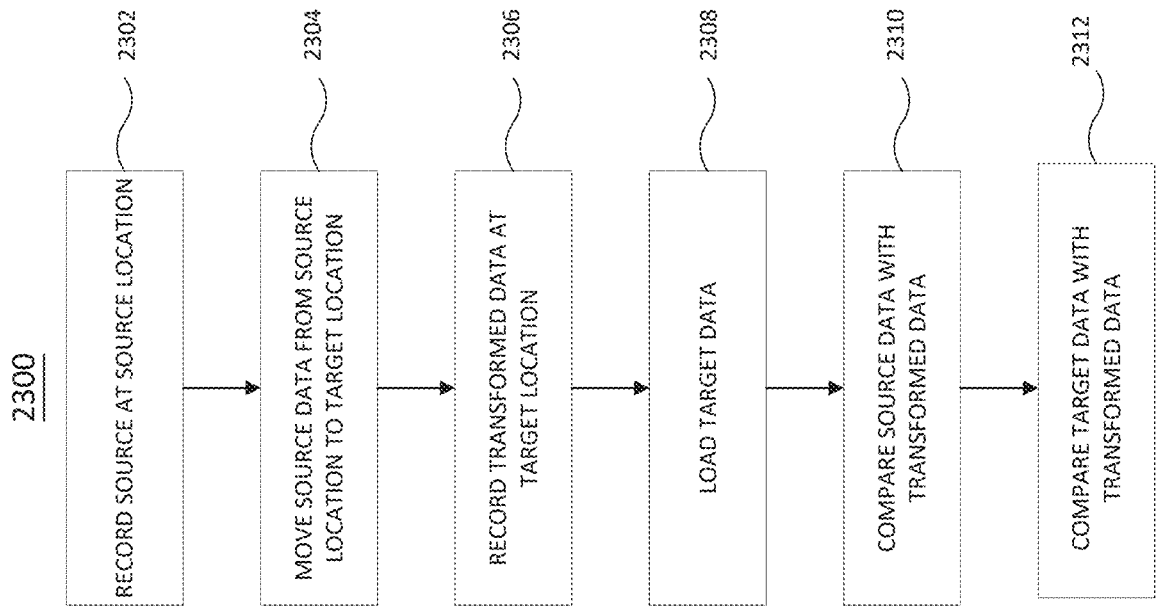
FIG. 23 is a flowchart of an exemplary system for tracking data migration and integration.

FIG. 23 illustrates a flowchart of example system 2300 for tracking data migration and integration. In some embodiments, system 2300 may be performed by at least one processor (e.g., 210, 332) to perform operations or functions described herein. In some embodiments, some aspects of system 2300 may be implemented as software (e.g., program codes or instructions) that are stored in a memory (e.g., 220) of computing device 200 or a non-transitory computer readable medium. In some embodiments, some aspects of system 2300 may be implemented as hardware (e.g., a specific-purpose circuit). In some embodiments, system 2300 may be implemented as a combination of software and hardware.

Referring to FIG. 23, system 2300 may include a processor configured to 2302 record source data at a source location and 2304 move the source data from the source location to a target location, the move causing the source data to change to transformed data. The processor may then 2306 record the transformed data at the target location and 2308 load target data. The processor may subsequently 2310 compare the source data with the transformed data and 2312 compare the target data with the transformed data.

In some embodiments, the at least one processor is further configured to identify required rules associated with the data; and determine if the transformed data meets the required rules. Identifying required rules associated with data may entail, for example, pinpointing user-defined essential and necessary regulations associated with data. Such rules may be pre-defined by an external user and programmed for use by the processor to determine if data has been correctly transformed for integration into a target system. As discussed above, such rules may pertain to data quality, size, or degree of modification within the data migration process. By way of example, if certain rules are satisfied, data may be allowed to continue through the migration process, or, alternatively, data may become accessible.

In some embodiments, a system for tracking data migration and integration, comprises at least one processor configured to: extract raw data from a source; determine a size of the raw data; identify a destination for the raw data, the destination having sufficient capacity to accommodate the determined size of the raw data; package the raw data, wherein the packaged raw data includes a control that is added to the raw data; and transfer the packaged data to a target. Tracking data migration and integration may entail, for example, monitoring data migration and integration. Extracting raw data may comprise, for example, retrieving or obtaining data that has not yet been processed for use. Examples of raw data may comprise financial transactions from a point of sale (POS) terminal, computer logs, or participant eye-tracking data in a research project. Identifying a destination may entail, for example, pinpointing a particular stop or landing place for raw data. Such destination may comprise, for example, a location in a source system, or, alternatively, a location within a target system. In some embodiments, a processor may identify a destination for any form of data, not necessarily just raw data. A destination with sufficient capacity to accommodate raw data based on determined size may entail, for example, a particular location capable of housing or taking in raw data depending on its size. In other embodiments, destinations may have sufficient capacity to accommodate data based on quality or degree of modification, among other characteristics. Packaging data may comprise, for example, employing data packaging tools to aggregate or combine data into a convenient format that is both human- and machine-readable. In some embodiments, packaging data may comprise combining data with all its required metadata in a convenient format that is both human- and machine-readable. In other embodiments, data may be packaged either on its own or with other materials, such as, for example, raw data or reference data. Data including a control may entail, for example, data that has a restriction on it regulating its access. By way of example, data may be restricted because of its quality, size, or degree of modification. Once data reaches a certain threshold with respect to a particular restriction (e.g., data, size, degree of modification), it may become accessible.

Figure 24:
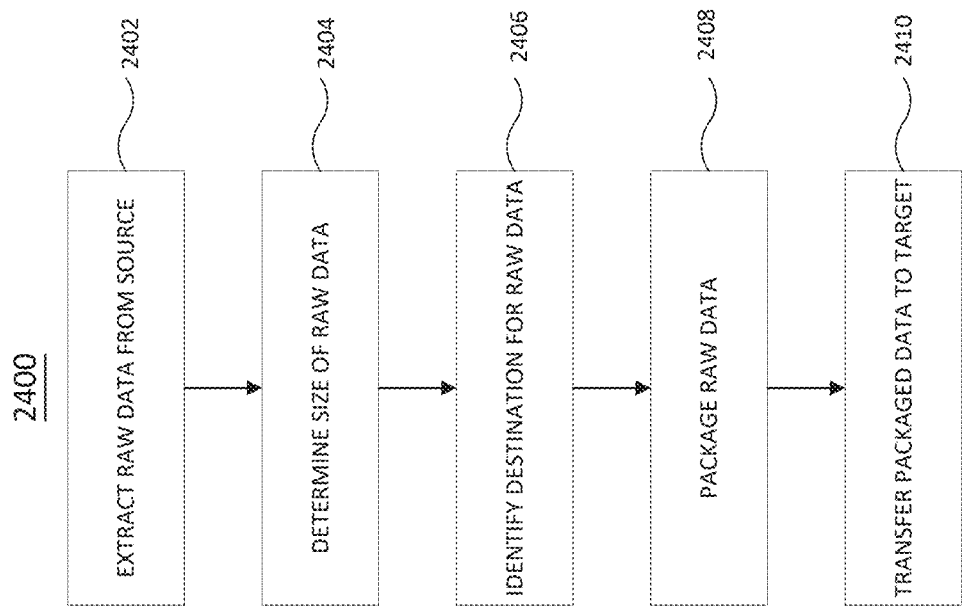
FIG. 24 is a flowchart of an exemplary system for tracking data migration and integration.

FIG. 24 illustrates a flowchart of example system 2400 for tracking data migration and integration. In some embodiments, system 2400 may be performed by at least one processor (e.g., 210, 332) to perform operations or functions described herein. In some embodiments, some aspects of system 2400 may be implemented as software (e.g., program codes or instructions) that are stored in a memory (e.g., 220) of computing device 200 or a non-transitory computer readable medium. In some embodiments, some aspects of system 2400 may be implemented as hardware (e.g., a specific-purpose circuit). In some embodiments, system 2100 may be implemented as a combination of software and hardware.

Referring to FIG. 24, system 2400 may include a processor configured to 2402 extract raw data from a source, 2404 determine a size of the raw data, and 2406 identify a destination for the raw data, the destination having sufficient capacity to accommodate the determined size of the raw data. The processor may then 2408 package the raw data, the packaged raw data including a control that is added to the raw data. The processor may subsequently 2410 transfer the packaged data to a target.

In some embodiments, a system for tracking data migration and integration, comprises at least one processor configured to: maintain a dashboard for tracking data, within the dashboard, define rules, the rules corresponding to data quality; enable a first reporting of the data at a first location to the dashboard; transfer the data to a second location; enable a second reporting of the data at the second location to the dashboard; transfer the data to a third location; enable a third reporting of the data at the third location to the dashboard; transfer the data to a fourth location; enable a fourth reporting of the data at a fourth location to the dashboard; and in response to the first reporting, the second reporting, the third reporting, and the fourth reporting, apply the rules to process a result, the result comparing the data quality at the first reporting, the second reporting, the third reporting, and the fourth reporting. Maintaining a dashboard for tracking data may entail, for example, providing a comprehensive overview or surveillance system of a particular dataset. By way of example, the dashboard may track or monitor the quality of the dataset at different locations as the dataset progresses through the migration process and is integrated into a target system. The quality of the dataset at different locations may be reported for presentation by the dashboard. Data quality may comprise, for example, measuring how well a dataset meets criteria for accuracy, completeness, validity, consistency, uniqueness, timeliness, and/or fitness for purpose. Data quality may be assessed internally by software at different locations within the integration process or, alternatively, by reviewer personnel who monitor the process externally. A reporting may entail, for example, an account or record of data that includes particular information about the data, such as its date of creation or, alternatively, statistical information (mean, median, or range). The reporting may comprise a textual report or, alternatively, a graphical illustration. A result may comprise, for example, a consequence, outcome, or conclusion. By way of example, the quality of a dataset at four separate locations along the migration process may be assessed and reported on a dashboard. The data quality at each location may then be compared and presented on the dashboard and, additionally, a final result—or determination—about the overall quality of a particular dataset may be made by the processor and presented on the dashboard. In some embodiments, a particular dataset will meet minimal data quality requirements and, thus, will ultimately be determined to be of poor quality. Alternatively, a dataset may satisfy certain requirements for data quality, such as accuracy and completeness but not others (such as timeliness), and, thus, will ultimately be determined to be of average quality. In other embodiments, a dataset may satisfy all requirements for data quality and, thus, will ultimately be determined to be of high quality. In some embodiments, rules may not depend on data quality. Rules may correspond to other characteristics related to data, such as size or degree modification.

Figure 25:
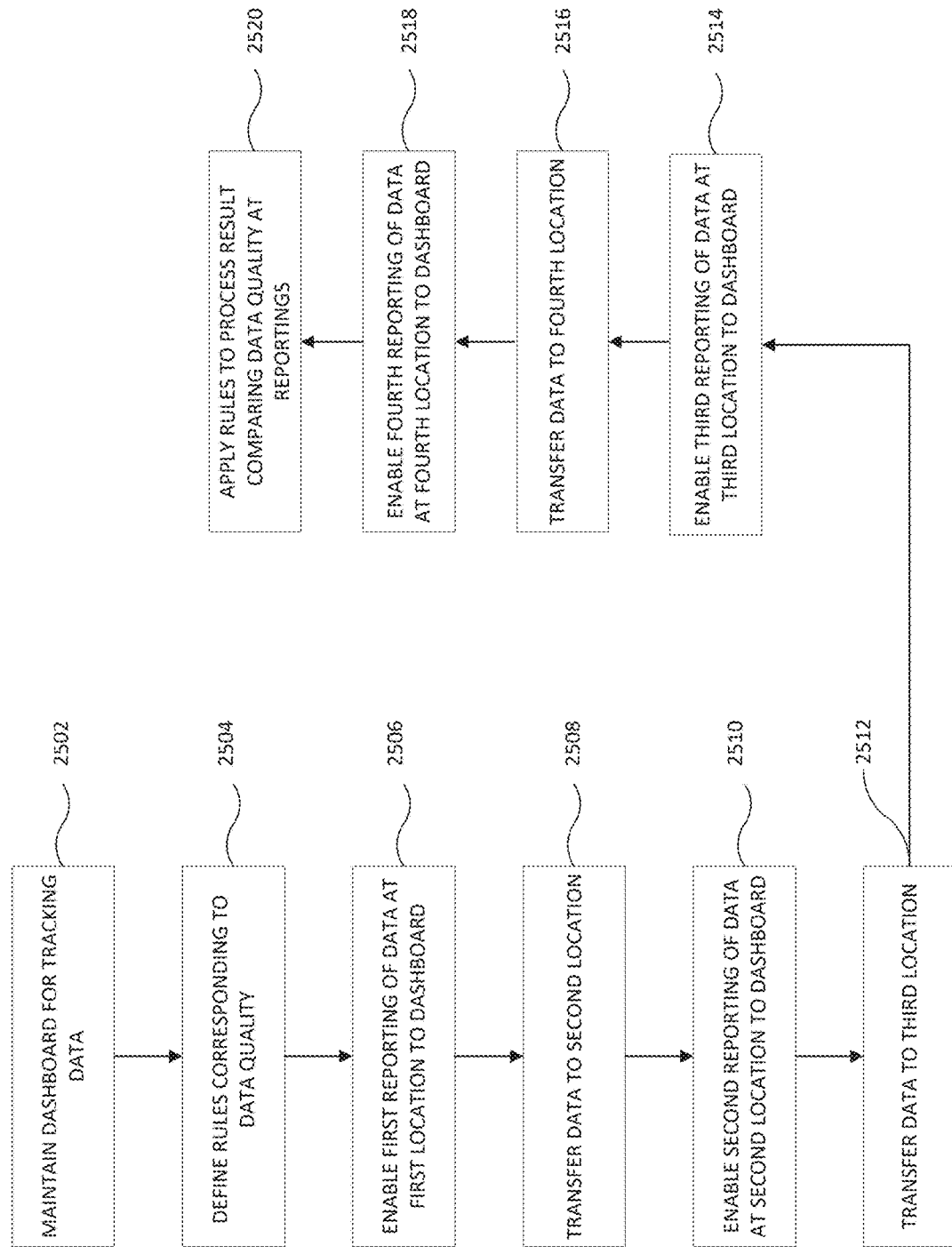
FIG. 25 is a flowchart of an exemplary system for tracking data migration and integration.

FIG. 25 illustrates a flowchart of example system 2500 for tracking data migration and integration. In some embodiments, system 2500 may be performed by at least one processor (e.g., 210, 332) to perform operations or functions described herein. In some embodiments, some aspects of system 2500 may be implemented as software (e.g., program codes or instructions) that are stored in a memory (e.g., 220) of computing device 200 or a non-transitory computer readable medium. In some embodiments, some aspects of system 2500 may be implemented as hardware (e.g., a specific-purpose circuit). In some embodiments, system 2500 may be implemented as a combination of software and hardware.

Referring to FIG. 25, system 2500 may include a processor configured to 2502 maintain a dashboard for tracking data and 2504, within the dashboard, define rules corresponding to data quality. The processor may then 2506 enable a first reporting of the data at a first location to the dashboard and 2508 transfer the data to a second location. The processor may subsequently 2510 enable a second reporting of the data at the second location to the dashboard and 2512 transfer the data to a third location. The processor may then 2514 enable a third reporting of the data at the third location to the dashboard and 2516 transfer the data to a fourth location. The processor may subsequently 2518 enable a fourth reporting of the data at a fourth location to the dashboard and 2520, in response to the first reporting, the second reporting, the third reporting, and the fourth reporting, apply rules to process a result, the rules comparing the data quality at the first reporting, the second reporting, the third reporting, and the fourth reporting. Each location may be unique within the data migration system and represent a particular stage of the migration process. By reporting data at each location, a user may be able to confirm that data is migrating completely and accurately to a target system. In some embodiments as described herein, the first location may correspond to a landing zone, the second location may correspond to a staging layer, the third location may correspond to a transformation layer, and the fourth location may correspond to an enterprise data warehouse.

In some embodiments, the at least one processor is further configured to send an alert, the alert depending on the result. An alert may comprise, for example, a warning, caution, notification, or signal. By way of example, a processor may send an alert if data fails to achieve a certain quality. Alternatively, a processor may send an alert if data fails to achieve a necessary size or degree of modification. In other embodiments, a processor may send an alert if data successfully achieves a certain threshold for criteria, such as quality, size, or degree of modification. In some embodiments, a processor may send an alert if data progresses through the data migration process.

In some embodiments, the at least one processor is further configured to define at least one alert, wherein each defined alert corresponds to data quality. Defining an alert may entail, for example, stipulating, establishing, or delineating conditions that trigger an alert. As discussed above, by way of example, an alert may be defined by whether data achieves a certain threshold for criteria. Alternatively, an alert may be defined by whether data progresses through the data migration process. In some embodiments, an alert may be defined generally if a certain condition is met.

In some embodiments, a system for tracking the migration and integration of data comprises at least one processor configured to: maintain a dashboard for tracking data movement, access source data; enable an input of a control file, the control file based on the source data; link the control file to the source data to create linked data; and transmit the linked data to the dashboard. A data dashboard may comprise a tool employed to track, analyse, and display data. In some embodiments, the processor may be configured to maintain a dashboard that tracks data as it migrates or is transformed from an external server to target server. The processor may be configured to provide such a dashboard that enables tracking of data transformation. Source data may comprise, for example, a location where data originates from. The processor may access source data and subsequently enable input of a control file based on the source data. A control file may comprise a small binary file that records the physical structure of a particular database and includes, among other things, the database name, a timestamp of the database creation, the size of the database, and the names and locations of datafiles within the database. Alternatively, the binary file may store information about other characteristics of the database, such as, for example, its quality or content. The processor may link a control file to the source data, thus creating linked data. The linking of the control file to the source data may be performed either by an external user who reviews the source data and creates the control file based on the review. Alternatively, the control file may be linked via internal software that assesses the source data. By way of example, by enabling input of the control file based on the source data, the processor may enable certain characteristics about the source data to be defined and established, such as, for example its name, its size, or the date of its creation. By enabling definition of such characteristics, the source data may become linked to or associated with the control file. The processor may then transmit the linked data to a dashboard being maintained by the processor such that the data's characteristics may be displayed and monitored on the dashboard, and potentially analysed. Displaying linked data that includes such information as a database name, a timestamp of database creation, the size of a database, and the names and locations of datafiles within a database may provide context to the data being presented on the dashboard, thereby facilitating its review and analysis. In some embodiments, data may be transmitted elsewhere, such as, for example, to other systems, warehouses, or storage locations.

Figure 26:
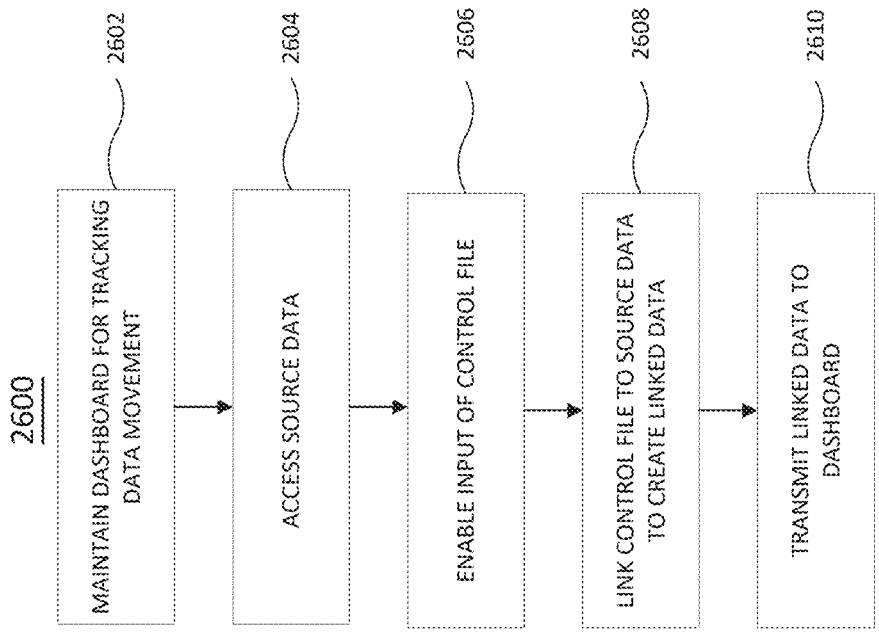
FIG. 26 is a flowchart of an exemplary system for tracking the migration and integration of data.

FIG. 26 illustrates a flowchart of example system 2600 for tracking data migration and integration. In some embodiments, system 2600 may be performed by at least one processor (e.g., 210, 332) to perform operations or functions described herein. In some embodiments, some aspects of system 2600 may be implemented as software (e.g., program codes or instructions) that are stored in a memory (e.g., 220) of computing device 200 or a non-transitory computer readable medium. In some embodiments, some aspects of system 2600 may be implemented as hardware (e.g., a specific-purpose circuit). In some embodiments, system 2600 may be implemented as a combination of software and hardware.

Referring to FIG. 26, system 2600 may include a processor configured to 2602 maintain a dashboard for tracking data movement and 2604 access source data. The processor may then 2606 enable an input of a control file, the control filed based on the source data. The processor may subsequently 2608 link the control file to the source data to created linked data and 2610 transmit the linked data to the dashboard.

In some embodiments, transmitting the linked data to the dashboard includes uploading the linked data to a portal tool. A portal tool may comprise, for example, an online platform that holds data from different sources and organizes it for user accessibility. Such portals may create accessible and centralized platforms for data and dashboards. In certain embodiments, the portal tool may facilitate user access to data by presenting it in organized and user-friendly fashion. Uploading data to a portal tool may comprise, for example, transmitting or passing it to such portals. In some embodiments, data may be transmitted to a dashboard without the need for a portal tool. In some embodiments, a portal tool may be employed to provide access to data not necessarily through a dashboard.

In some embodiments, the input of a control file is based on a template, and wherein the input is manual. By way of example, the processor may rely on a template, or example/guide, to input control file characteristics about source data, such as its date of creation or size. In some embodiments, the template may provide guidance to a user as to how to input a control file or, alternatively, what type of information to include in a control file. In certain further embodiments, an external user of the processor may manually input the characteristics about a particular source dataset, relying on a template for guidance. In alternative embodiments, input of a control file may not be template-driven.

In some embodiments, a system for tracking data migration and integration, comprises at least one processor configured to: maintain a dashboard, as described above, for tracking source data movement from at least a first location to a second location; access the source data; create a control file, as described above, the control file based on a template, as described above, and the control file associated with the source data; load the source data to the first location; upon completion of the load to the first location, transmit the control file to the dashboard, the transmission based on a first write; load the source data to the second location; and upon completion of the load to the second location, transmit the control file to the dashboard, the transmission based on a second write. In some embodiments, the processor may load source data onto a first location and, upon completion of the load, transmit a control file associated with the source data to a dashboard for presentation of characteristics related to the source data, including, among other things, the name of the source data, a timestamp of the creation of the source data, the size of the source data, and the names and locations of source datafiles. Transmission of the control file to the dashboard may depend on a first write, or set of computer code instructions that enable transmission of the control file to the dashboard, for example, for presentation or display to a user. In some embodiments, the first location where source data is stored may be responsible for reformatting or reorganizing the source data. Following transmission of the control file based on the first write, the source data may subsequently be loaded onto a second location responsible, for example, for conversion or transformation of data for compliance with a target system. The control file associated with the source data may then be updated to reflect any changes that may have occurred following upload to the second location and, subsequently, may be transmitted to the dashboard based on a second write or set of computer code instructions. Transmission of the control file to the dashboard following upload at both the first and second locations may serve to provide information on the source data following various forms of manipulation (e.g., reformatting/reorganization at the first location and conversion/transformation at the second location) at different locations. In some embodiments, transmission may be based on more than one write, such as, for example, two writes, three writes, four writes, five writes, n writes. In some embodiments, data may be moved between more than two locations, such as, for example, three locations, four locations, five locations, n locations, within a data migration process.

Figure 27:
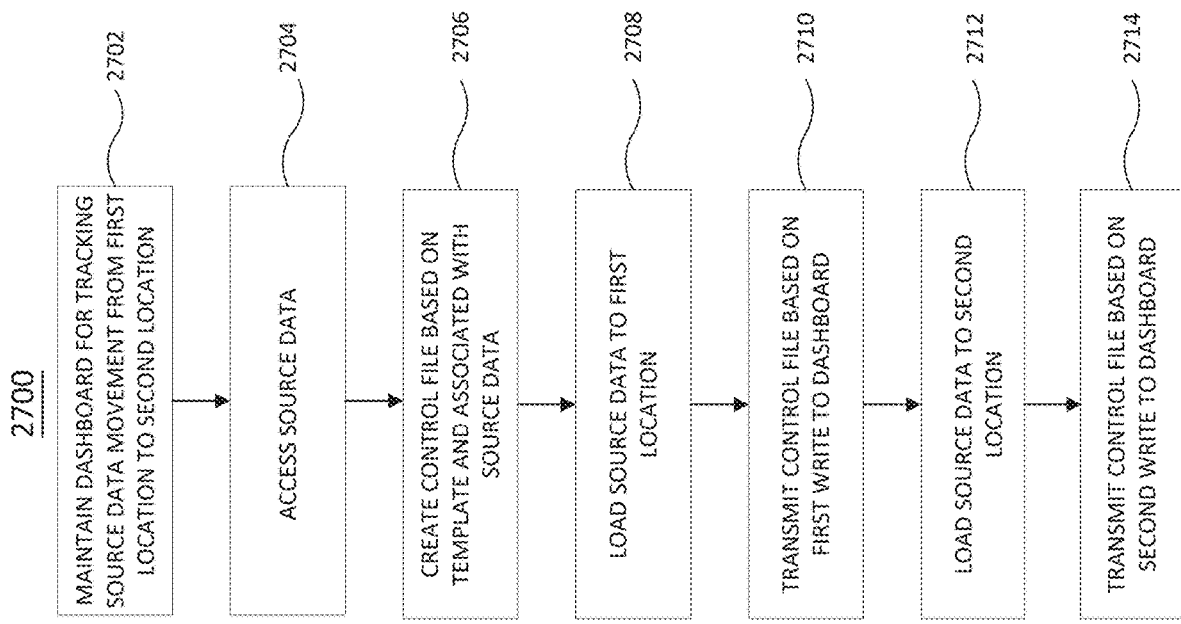
FIG. 27 is a flowchart of an exemplary system for tracking data migration and integration.

FIG. 27 illustrates a flowchart of example system 2700 for tracking data migration and integration. In some embodiments, system 2700 may be performed by at least one processor (e.g., 210, 332) to perform operations or functions described herein. In some embodiments, some aspects of system 2700 may be implemented as software (e.g., program codes or instructions) that are stored in a memory (e.g., 220) of computing device 200 or a non-transitory computer readable medium. In some embodiments, some aspects of system 2700 may be implemented as hardware (e.g., a specific-purpose circuit). In some embodiments, system 2700 may be implemented as a combination of software and hardware.

Referring to FIG. 27, system 2700 may include a processor configured to 2702 maintain a dashboard for tracking source data movement from at least a first location to a second location and 2704 access the source data. The processor may then 2706 create a control file, the control file based on a template and associated with the source data. The processor may subsequently 2708 load the source data to the first location and 2710 transmit the control file to the dashboard, the transmission being based on a first write. The processor may then 2712 load the source data to the second location and 2714 transmit the control file to the dashboard, the transmission being based on a second write.

In some embodiments, a system for tracking the migration and integration of data comprises at least one processor configured to: maintain a dashboard for tracking attributes; access source data; define at least one attribute associated with the source data; track, at a first time, the at least one attribute; transfer the source data to a landing zone; track, at a second time, the at least one attribute of the transferred source data; transform the source data into transformed data; track, at a third time, the at least one attribute of the transformed source data; load the transformed source data into a target application; track, at a fourth time, the at least one attribute of the transformed source data in the target application; compare the at least one attribute at the first time, the second time, the third time, and the fourth time; and display the comparison via the dashboard. As discussed above, an attribute may entail, for example, a certain characteristic or trait of data and may comprise data accuracy, completeness, reliability, relevance, and timeliness. In some embodiments, the processor may define an attribute of the source data. By way of example, the processor may describe the source data as "accurate". The processor may then track the "accurate" designation at a first instance before transferring the source data to a landing zone. A landing zone may serve as an intermediate storage area for data processing, which sits in between a source system and target system. Upon transfer of the source data to the landing zone, the processor may then, once again, track the source data's "accurate" attribute. The processor may then facilitate transformation of the source data to transformed data and, subsequently, track the "accurate" designation for a third time. The processor may then load the transformed source data into a target application or program and, once again, track its "accurate" designation. The processor may then compare the attribute at each tracked instance and display the comparison on a dashboard. Displaying the comparison on the dashboard may facilitate confirmation that the data's accuracy has not changed following transfer to the landing zone, transformation, and load onto a target application. Should it be determined that the data's accuracy has changed or been lost at any of the above steps, an external user or the processor may act to remedy such changes. Such comparisons may apply to any data attributes, including, for example, completeness, relevance, and reliability.

Figure 28:
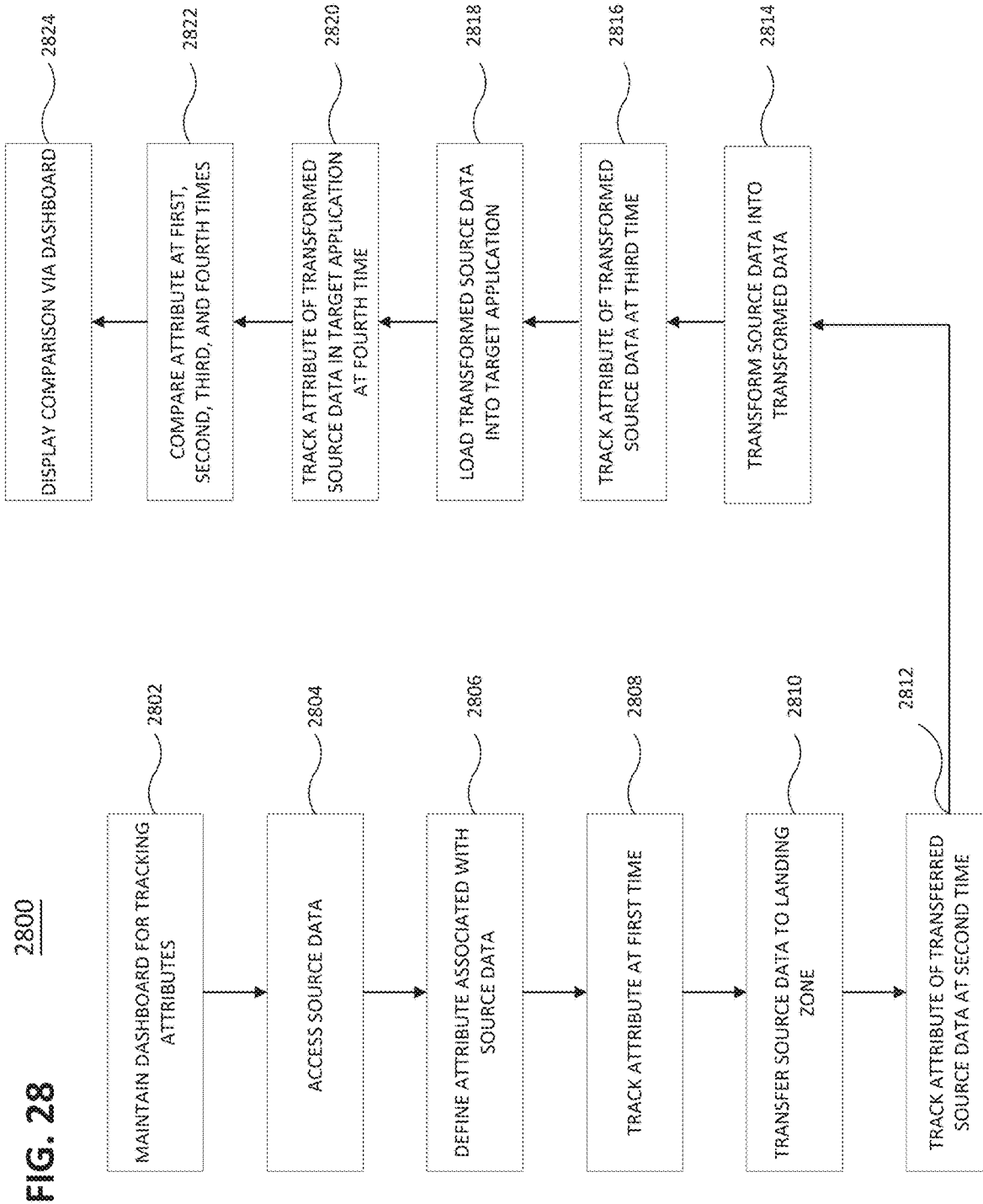
FIG. 28 is a flowchart of an exemplary system for tracking the migration and integration of data.

FIG. 28 illustrates a flowchart of example system 2800 for tracking data migration and integration. In some embodiments, system 2800 may be performed by at least one processor (e.g., 210, 332) to perform operations or functions described herein. In some embodiments, some aspects of system 2800 may be implemented as software (e.g., program codes or instructions) that are stored in a memory (e.g., 220) of computing device 200 or a non-transitory computer readable medium. In some embodiments, some aspects of system 2800 may be implemented as hardware (e.g., a specific-purpose circuit). In some embodiments, system 2800 may be implemented as a combination of software and hardware.

Referring to FIG. 28, system 2800 may include a processor configured to 2802 maintain a dashboard for tracking attributes and 2804 access source data. The processor may then 2806 define at least one attribute associated with the source data and 2808 track, at a first time, the at least one attribute. The processor may subsequently 2810 transfer the source data to a landing zone and 2812 track, at a second time, the at least one attribute of the transferred source data. The processor may then 2814 transform the source data into transformed data and 2816 track, at a third time, the at least one attribute of the transformed source data. The processor may subsequently 2818 load the transformed source data into a target application and 2820 track, at a fourth time, the at least one attribute of the transformed source data in the target application. The processor then 2822 compare the at least one attribute at the first time, the second time, the third time, and the fourth time, and 2824 display the comparison via the dashboard.

In some embodiments, the at least one attribute includes a count and a balance. A count may comprise, for example, a total number of some characteristic or trait. By way of example, a count may comprise the number of times a particular dataset has been modified or, alternatively, the number of stops for a particular dataset during the data migration process. A balance may comprise, for example, a figure representing the difference between credits and debits in an account or, alternatively, the amount of money held in an account.

In some embodiments, the at least one attribute includes at least one of a job status, a row count, and a sum amount. A job status may comprise, for example, a nature of an employment relationship, whether direct or contract, full-time, part-time, partial, casual, or temporary agency. Alternatively, a job status may comprise a status of a computer program execution. A row count may comprise, for example, a function that counts rows in a table. A sum amount may comprise, for example, a whole number or amount of numbers or amounts added together.

In some embodiments, comparing the at least one attribute at the first time, the second time, the third time, and the fourth time includes showing a variance across the first time, the second time, the third time, and the fourth time. A variance may entail, for example, the differences, divergences, or inconsistencies when comparing an attribute at different timepoints. By way of example, at different timepoints, the quality or size of a particular dataset may differ. In some embodiments, comparing attributes at different timepoints may not require showing a variance. In some embodiments, attributes may be compared at some timepoints but not others. In some embodiments, more than one attribute may be compared, such as, for example, two attributes, three attributes, four attributes, n attributes. In some embodiments, attributes may be compared at one time, two times, three times, four times, five times, n times.

In some embodiments, a system for tracking data migration and integration, comprises at least one processor configured to: maintain a dashboard for tracking attributes; access source data; define at least one attribute associated with the source data; track, at a first time, the at least one attribute; transfer the source data to a landing zone; after transferring the source data, track, at a second time, the at least one attribute; transform the source data into transformed data; upon transformation, track, at a third time, the at least one attribute; load the transformed data into a target application; upon loading, track, at a fourth time, the at least one attribute; and compare, via the dashboard, the at least one attribute at the first time, the second time, the third time, and the fourth time.

Figure 29:
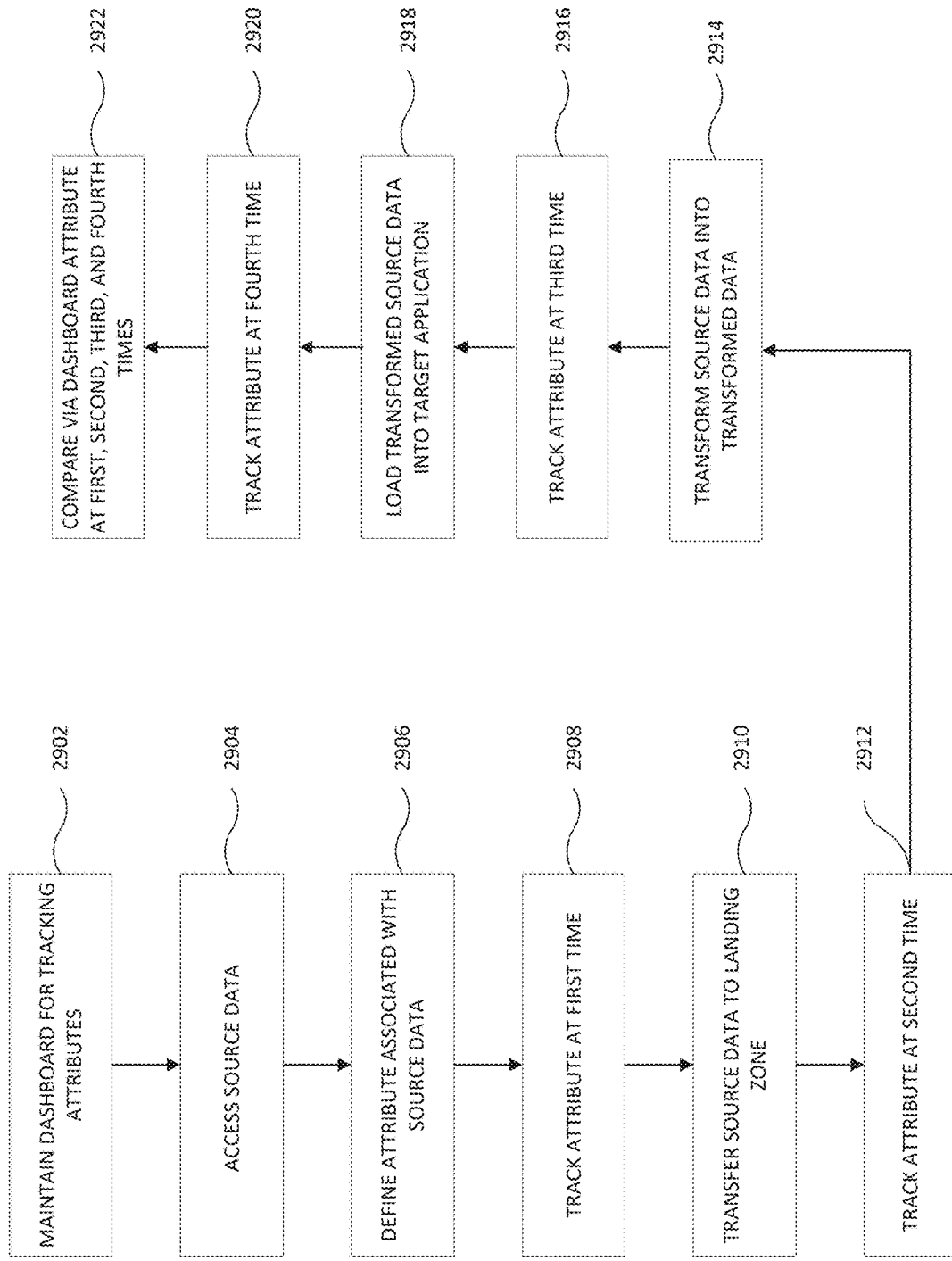
FIG. 29 is a flowchart of an exemplary system for tracking data migration and integration.

FIG. 29 illustrates a flowchart of example system 2900 for tracking data migration and integration. In some embodiments, system 2900 may be performed by at least one processor (e.g., 210, 332) to perform operations or functions described herein. In some embodiments, some aspects of system 2900 may be implemented as software (e.g., program codes or instructions) that are stored in a memory (e.g., 220) of computing device 200 or a non-transitory computer readable medium. In some embodiments, some aspects of system 2900 may be implemented as hardware (e.g., a specific-purpose circuit). In some embodiments, system 2900 may be implemented as a combination of software and hardware.

Referring to FIG. 29, system 2900 may include a processor configured to 2902 maintain a dashboard for tracking attributes and 2904 access source data. The processor may then 2906 define at least one attribute associated with the source data and 2908 track, at a first time, the at least one attribute. The processor may subsequently 2910 transfer the source data to a landing zone and 2912 track, at a second time, the at least one attribute. The processor may then 2914 transform the source data into transformed data and 2916 track, at a third time, the at least one attribute. The processor may subsequently 2918 load the transformed data into a target application and 2920 track, at a fourth time, the at least one attribute. The processor May 2922 compare, via the dashboard, the at least one attribute at the first time, the second time, the third time, and the fourth time.

In some embodiments, a system for tracking data migration and integration, comprises at least one processor configured to: establish a connection between a source database and a destination; over the connection, access data in the source database, assign an identifier to the data based on unique parameters, wherein the unique parameters are assigned based on the data, the source database, and the destination; transmit the data with the identifier to the destination; and store the data in distributed storage at the destination. A connection may comprise, for example, a relationship or association between a source database and a destination. In some embodiments, connections may form between other aspects of the data migration process, such as, for example, between particular locations within a target system, or, alternatively, between systems (e.g., source system, intermediate system, target system). Assigning an identifier may entail, for example, appointing or designating an identifier to a particular dataset. Identifiers may, for example, relate to the quality, size, or content of data. In some embodiments, identifiers may not be based on unique parameters, but, rather more conventional or standard parameters. In other embodiments, identifiers may not be based on parameters at all. A destination may comprise, for example, a location or place where data is to be sent. An identifier may comprise, for example, a sequence of characters used to identify or refer to a program or an element. Examples of identifiers may include variables, particular datasets, or characteristic descriptions. A unique parameter may comprise, for example, a distinctive or uncommon characteristic or trait. By way of example, unique parameters may pertain to uncommon or rare dataset sizes. As discussed above, in some embodiments, parameters may not be unique but, rather, more conventional or standard. In some embodiments, assignment of parameters may not depend on data, a source database, or a destination. In other embodiments, parameter assignment may depend on some combination of data, a source database, or a destination, but not all three together. Distributed storage may entail, for example, storage on different disks or memory devices, or different computers connected to each other via a network. In some embodiments, data may not be stored in distributed storage, but, rather, at another storage in a target system. In other embodiments, data may not be stored at all.

In some embodiments, the at least one processor is further configured to transform the stored data, without changing the assigned identifier. Changing an identifier may entail, for example, modifying an identifier or making it different. In some embodiments, an assigned identifier may be changed in order to transform data. In some embodiments, an identifier may be adjusted to be shorter or longer in length. Alternatively, an identifier may be adjusted to be more or less descriptive of the particular dataset it is identifying. Or an identifier may be adjusted based on the particular content it is describing. In other embodiments, an identifier may be modified in a fashion different than those provided above.

Figure 30:
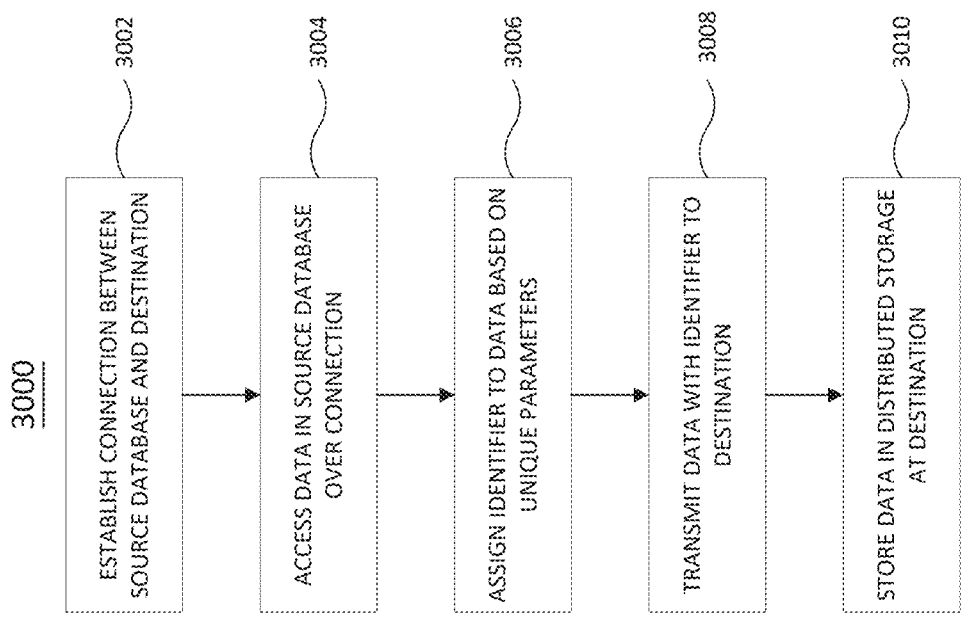
FIG. 30 is a flowchart of an exemplary system for tracking data migration and integration.

FIG. 30 illustrates a flowchart of example system 3000 for tracking data migration and integration. In some embodiments, system 3000 may be performed by at least one processor (e.g., 210, 332) to perform operations or functions described herein. In some embodiments, some aspects of system 3000 may be implemented as software (e.g., program codes or instructions) that are stored in a memory (e.g., 220) of computing device 200 or a non-transitory computer readable medium. In some embodiments, some aspects of system 3000 may be implemented as hardware (e.g., a specific-purpose circuit). In some embodiments, system 3000 may be implemented as a combination of software and hardware.

Referring to FIG. 30, system 3000 may include a processor configured to 3002 establish a connection between a source database and a destination and 3004, over the connection, access data in the source database. The processor may then 3006 assign an identifier to the data based on unique parameters, the unique parameters being assigned based on the data, the source database, and the destination. The processor may subsequently 3008 transmit the data with the identifier to the destination and 3010 store the data in distributed storage at the destination.

The present disclosure also provides an apparatus for migrating and integrating data, the apparatus comprising one or more modules configured to perform the methods as described herein.

The present disclosure further provides a computer program product storing executable instructions, which when executed by a computer, cause the computer to perform the method as described herein.

What is claimed is:

1. A system for migrating data from a legacy system to one or more target systems, the system comprising:
   a memory storing instructions; and
   at least one processor configured to execute the instructions to:
   request data from the legacy system is via a data request feature, the data being requested by the one or more target systems;
   package and move the requested data to a first landing zone specific to the legacy system via a data packaging feature;
   receive a copy of the packaged data in the first landing zone at a second landing zone specific to the one or more target systems;
   generate control counts and balances related to the packaged data at the second landing zone;
   ingest the packaged data from the second landing zone in a staging layer;
   map the packaged data received from the second landing zone in the staging layer to data expected to be migrated to the one or more target systems;
   establish data transformation rules in the staging layer for transforming the packaged data into data that is compliant with the data requirements of the one or more target systems;
   load general enterprise reference data and reference data specific to the one or more target systems in the staging layer to facilitate the data transformation process;
   perform a completeness check in the staging layer against the originally requested data to confirm all requested data remains present;
   if determined to be complete, transform the packaged data in a transformation layer to data that is compliant with the data requirements of the one or more target systems;
   run data quality and identification rules in the transformation layer to identify any data gaps that arise during transformation;
   if no data gaps are identified, load the transformed data via a first loading feature into applications specific to the one or more target systems;
   validate the loaded data via a validation feature to confirm the loaded data is both complete and accurate;
   if determined to be complete and accurate, load the data via a second loading feature to such downstream systems as an enterprise data storeroom or advanced analytical systems; and
   publish the status of the data via a migration reconciliation dashboard as it is migrated from the legacy system to the one or more target systems.

2. The system of claim 1, wherein the data is migrated via a customized path that bypasses one or more features of the system.

3. The system of claim 2, wherein the one or more bypassed features comprises the first and second landing zones or other components of data migration.

4. The system of claim 3, wherein the customized migration path is associated with such special use cases as acquisition, realty, or provider uses.

5. The system of claim 4, wherein the provider use comprises a customized migration path specific to a particular provider.

6. The system of claim 5, wherein the provider-specific migration path comprises a neutral environment for data migration in between the legacy system and the one or more target systems.

7. The system of claim 4, wherein the legacy system comprises a cloud-based platform.

8. The system of claim 7, wherein the cloud-based platform comprises cloud computing and collaboration tools, a cloud-based storage system, and a network attached storage (NAS).

9. The system of claim 2, wherein the customized migration path comprises database server to database server migration.

10. The system of claim 9, wherein the database server to database server migration is subjected to size restrictions.

11. The system of claim 9, wherein security concerns are flagged during the database server to database server migration and migration is paused until the security concerns are resolved.

12. The system of claim 9, wherein the database server to database server migration comprises a retention policy on highly confidential regulatory data.

13. The system of claim 9, wherein the database server to database server migration comprises backup and restore functionality.

14. The system of claim 9, wherein the database server to database server migration comprises NAS-to-NAS migration.

15. The system of claim 14, wherein the NAS-to-NAS migration is subjected to data controls provided by the legacy system and one or more target systems and executed by a provider.

16. The system of claim 15, wherein the data controls comprise metadata that facilitates identification of data during NAS-to-NAS migration.

17. The system of claim 1, wherein the migrated data comprises security application data.

18. The system of claim 17, wherein migration of imaging data includes a document classification approach that identifies signature card images from multi-page tiff documents.

19. The system of claim 1, wherein the migrated data is associated with metadata that facilitates control, audit, and compliance of the data as it migrates from the legacy system to the one or more target systems and is transformed and loaded into the one or more target systems.

20. The system of claim 19, wherein the metadata automates data migration and transformation such that it is scalable to voluminous amounts of data.

21. The system of claim 1, wherein the data is migrated physically.

22. The system of claim 1, wherein the data is migrated over a network or wire.

23. The system of claim 1, wherein the data is migrated via cloud environments.

24. The system of claim 1, wherein the migrated data is subjected to one or more checkpoints to ensure complete migration from the legacy system to the one or more target systems.

25. The system of claim 24, wherein the one or more checkpoints comprise one or more of data quality and profile, quality assurance, final inspection, or the migration reconciliation dashboard.

* * * * *

UNITED STATES PATENT AND TRADEMARK OFFICE
CERTIFICATE OF CORRECTION

| | | |
|---|---|---|
| PATENT NO. | : 12,321,323 B1 | Page 1 of 1 |
| APPLICATION NO. | : 18/582301 | |
| DATED | : June 3, 2025 | |
| INVENTOR(S) | : Bobby Melvin Underwood, Jr. et al. | |

It is certified that error appears in the above-identified patent and that said Letters Patent is hereby corrected as shown below:

In the Claims

Claim 1, Column 74, Line 18:
"request data from the legacy system is via a data request"
Should read:
--request data from the legacy system via a data request--.

Signed and Sealed this
Eighth Day of July, 2025

Coke Morgan Stewart
*Acting Director of the United States Patent and Trademark Office*